United States Patent [19]

Kato

[11] Patent Number: 5,135,831
[45] Date of Patent: Aug. 4, 1992

[54] ELECTROPHOTOGRAPHIC LIGHT-SENSITIVE MATERIAL

[75] Inventor: Eiichi Kato, Shizuoka, Japan

[73] Assignee: Fuji Photo Film Co., Ltd., Kanagawa, Japan

[21] Appl. No.: 657,001

[22] Filed: Feb. 15, 1991

[30] Foreign Application Priority Data

Feb. 16, 1990 [JP] Japan .................................. 2-33958
May 25, 1990 [JP] Japan .................................. 2-133963

[51] Int. Cl.$^5$ .............................................. G03G 5/00
[52] U.S. Cl. ...................................... 430/96; 430/127
[58] Field of Search ................................ 430/127, 96

[56] References Cited

U.S. PATENT DOCUMENTS 5,021,311  6/1991  Kato et al. ........................... 430/96

FOREIGN PATENT DOCUMENTS 0361063  4/1990  European Pat. Off. .............. 430/96

Primary Examiner—Marion E. McCamish
Assistant Examiner—Rosemary Ashton
Attorney, Agent, or Firm—Sughrue, Mion, Zinn, Macpeak & Seas

[57] ABSTRACT

An electrophotographic light-sensitive material comprising a support having provided thereon a photoconductive layer containing an inorganic photoconductive substance and a binder resin, wherein the binder resin contains at least one graft type copolymer (Resin (A)) comprising an AB block copolymer being composed of an A block comprising at least one polymer component containing at least one acidic group selected from $-PO_3H_2$, $-COOH$, $-SO_3H$, a phenolic hydroxyl group,

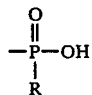

(wherein R represents a hydrocarbon group or $-OR'$ (wherein R' represents a hydrocarbon group)) and a cyclic acid anhydride-containing group, and a B block containing at least one polymer component represented by the genral formula (I)

(I)

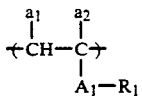

and (B) at least one copolymer (Resin (B)) comprising at least a monofunctional macromonomer (MB) and a monomer represented by the general formula (II)

(II)

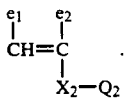

11 Claims, No Drawings

ELECTROPHOTOGRAPHIC LIGHT-SENSITIVE MATERIAL

FIELD OF THE INVENTION

The present invention relates to an electrophotographic light-sensitive material, and more particularly to an electrophotographic light sensitive material which is excellent in electrostatic characteristics and moisture resistance.

BACKGROUND OF THE INVENTION

An electrophotographic light-sensitive material may have various structures depending upon the characteristics required or an electrophotographic process to be employed.

An electrophotographic system in which the light-sensitive material comprises a support having thereon at least one photoconductive layer and, if necessary, an insulating layer on the surface thereof is widely employed. The electrophotographic light-sensitive material comprising a support and at least one photoconductive layer formed thereon is used for the image formation by an ordinary electrophotographic process including electrostatic charging, imagewise exposure, development, and, if desired, transfer.

Furthermore, a process using an electrophotographic light-sensitive material as an offset master plate precursor for direct plate making is widely practiced. In particular, a direct electrophotographic lithographic plate has recently become important as a system for printing in the order of from several hundreds to several thousands prints having a high image quality.

Binders which are used for forming the photoconductive layer of an electrophotographic light-sensitive material are required to be excellent in the film-forming properties by themselves and the capability of dispersing photoconductive powder therein. Also, the photoconductive layer formed using the binder is required to have satisfactory adhesion to a base material or support. Further, the photoconductive layer formed by using the binder is required to have various excellent electrostatic characteristics such as high charging capacity, small dark decay, large light decay, and less fatigue due to prior light-exposure and also have an excellent image forming properties, and the photoconductive layer stably maintains these electrostatic properties in spite of the change of humidity at the time of image formation.

Further, extensive studies have been made for lithographic printing plate precursors using an electrophotographic light-sensitive material, and for such a purpose, binder resins for a photoconductive layer which satisfy both the electrostatic characteristics as an electrophotographic light-sensitive material and printing properties as a printing plate precursor are required.

However, conventional binder resins used for electrophotographic light-sensitive materials have various problems particularly in electrostatic characteristics such as a charging property, dark charge retention characteristics and photosensitivity, and smoothness of the photoconductive layer.

In order to overcome the above problems, JP-A-63-217354, JP-A-1-70761 and JP-A-2-67563 (the term "JP-A" as used herein means an "unexamined Japanese patent application") disclose improvements in the smoothness of the photoconductive layer and electrostatic characteristics by using, as a binder resin, a resin having a low molecular weight and containing from 0.05 to 10% by weight of a copolymerizable component containing an acidic group in a side chain of the polymer or a resin having a low molecular weight (i.e., a weight average molecular weight (Mw) of from $1 \times 10^3$ to $1 \times 10^4$) and having an acidic group bonded at the terminal of the polymer main chain thereby obtaining an image having no background stains. Also, JP-A-1-100554 and JP-A-1-214865 disclose a technique using, as a binder resin, a resin containing a polymerizable component containing an acidic group in a side chain of the copolymer or at the terminal of the polymer main chain and also containing a polymerizable component having a heat- and/or photocurable functional group; JP-A-1-102573 and JP-A-2-874 disclose a technique using a resin containing an acidic group in a side chain of the copolymer or at the terminal of the polymer main chain and a crosslinking agent in combination; JP-A-64-564, JP-A-63 220149, JP-A-63-220148, JP-A-1-280761, JP-A-1-116643 and JP-A-1-169455 disclose a technique using a resin having a low molecular weight (i.e., a weight average molecular weight of from $1 \times 10^3$ to $1 \times 10^4$) and a resin having a high molecular weight (i.e., a weight average molecular weight of $1 \times 10^4$ or more) in combination; JP A-1-211766 and JP-A-2-34859 disclose a technique using the above described low molecular weight resin and a heat- and/or photo-curable resin in combination; and JP-A-2-53064, JP-A-2-56558 and JP-A-2-103056 disclose a technique using the above described low molecular weight resin and a comb-like polymer in combination. These references disclose that, according to the proposed technique, the film strength of the photoconductive layer can be sufficiently increased and also the mechanical strength of the light-sensitive material can be improved without adversely affecting the above-described electrostatic characteristics owing to the use of a resin containing an acidic group in a side chain or at the terminal of the polymer main chain.

However, it has been found that, even in the case of using these resins, it is yet insufficient to keep the stable performance in the case of greatly changing the environmental conditions from high-temperature and high-humidity to low-temperature and low-humidity. In particular, in a scanning exposure system using a semiconductor laser beam, the exposure time becomes longer and also there is a restriction on the exposure intensity as compared to a conventional overall simultaneous exposure system using a visible light, and hence a higher performance has been required for the electrostatic characteristics, in particular, the dark charge retention characteristics and photosensitivity.

Further, when the scanning exposure system using a semiconductor laser beam is applied to hitherto known light-sensitive materials for electrophotographic lithographic printing plate precursors, various problems may occur in that the difference between $E_{1/8}$ and $E_{1/10}$ is particularly large and the contrast of the reproduced image is decreased, in addition to the insufficient electrostatic characteristics described above. Thus, it is difficult to reduce the remaining potential after exposure, which results in severe fog formation in duplicated images, and when employed as offset masters, edge marks of originals pasted up appear on the prints.

SUMMARY OF THE INVENTION

The present invention has been made for solving the problems of conventional electrophotographic light-sensitive materials as described above and meeting the requirement for the light-sensitive materials.

An object of the present invention is to provide an electrophotographic light-sensitive material having stable and excellent electrostatic characteristics and giving clear good images even when the environmental conditions at the formation of duplicated images are changed to a low-temperature and low-humidity or to high-temperature and high-humidity.

Another object of the present invention is to provide a CPC electrophotographic light-sensitive material having excellent electrostatic characteristics and showing less environmental dependency.

A further object of the present invention is to provide an electrophotographic light-sensitive material effectively employed for a scanning exposure system using a semiconductor laser beam.

A still further object of the present invention is to provide an electrophotographic lithographic printing plate precursor having excellent electrostatic characteristics (in particular, dark charge retention characteristics and photosensitivity), capable of reproducing faithful duplicated images to original, forming neither overall background stains nor dotted background stains of prints, and showing excellent printing durability.

Other objects of the present invention will become apparent from the following description and examples.

It has been found that the above described objects of the present invention are accomplished by an electrophotographic light-sensitive material comprising a support having provided thereon a photoconductive layer containing an inorganic photoconductive substance and a binder resin, wherein the binder resin contains at least one graft type copolymer (Resin (A)) having a weight average molecular weight of from $1 \times 10^3$ to $2 \times 10^4$ and formed from, as a copolymerizable component, at least one monofunctional macromonomer (MA) comprising an AB block copolymer being composed of an A block comprising at least one polymer component containing at least one acidic group selected from —PO$_3$H$_2$, —COOH, —SO$_3$H, a phenolic hydroxyl group, $$-\overset{\overset{\displaystyle O}{\|}}{\underset{\underset{\displaystyle R}{|}}{P}}-OH$$

(wherein R represents a hydrocarbon group or —OR' (wherein R' represents a hydrocarbon group)) and a cyclic acid anhydride-containing group, and a B block containing at least one polymer component represented by the general formula (I) described below and having a polymerizable double bond group bonded to the terminal of the main chain of the B block polymer:

(I)

$$+CH-\underset{\underset{\displaystyle A_1-R_1}{|}}{\overset{\overset{\displaystyle a_2}{|}}{C}}\!\!\!\!\!\overset{\displaystyle a_1}{|}\!\!\!+$$

wherein $a_1$ and $a_2$ each represents a hydrogen atom, a halogen atom, a cyano group, a hydrocarbon group, —COOZ$_1$ or —COOZ$_1$ bonded via a hydrocarbon group (wherein Z$_1$ represents a hydrocarbon group); A$_1$ represents —COO—, —OCO—, $+CH_2\!\!+_{\!\!\!l_1}\!OCO$—, $+CH_2\!\!+_{\!\!\!l_2}\!COO$— (wherein $l_1$ and $L_2$ each represents an integer of from 1 to 3), —O—, —SO$_2$—,

(wherein P$_1$ represents a hydrogen atom or a hydrocarbon group), —CONHCOO—, —CONHCONH—, or

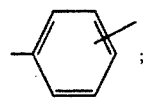

and R$_1$ represents a hydrocarbon group, provided that when A$_1$ represents

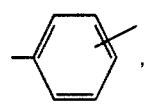

R$_1$ represents a hydrogen atom or a hydrocarbon group; and (B) at least one copolymer (Resin (B)) having a weight average molecular weight of not less than 3-10$^4$ and formed from at least a monofunctional macromonomer (MB) having a weight average molecular weight of not more than $2\times10^4$ and a monomer represented by the general formula (V) described below, the macromonomer (MB) comprising at least a polymer component corresponding to a repeating unit represented by the general formula (IVa) or (IVb) described below, and the macromonomer (MB) having a polymerizable double bond group represented by the general formula (III) described below bonded to only one terminal of the main chain thereof.

(III)

$$\overset{\overset{\displaystyle c_1}{|}}{CH}=\overset{\overset{\displaystyle c_2}{|}}{\underset{\underset{\displaystyle X_0-}{|}}{C}}$$

wherein X$_0$ represents —COO—, —OCO—, —CH$_2$OCO—, —CH$_2$COO—, —O—, —SO$_2$—, —CO—, —CONHCOO—, —CONHCONH—, —CONHSO$_2$—,

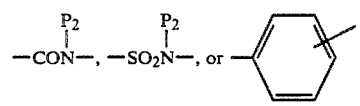

(wherein P$_2$ represents a hydrogen atom or a hydrocarbon group), and $c_1$ and $c_2$, which may be the same or different, each represents a hydrogen atom, a halogen atom, a cyano group, a hydrocarbon group, —COO—Z$_3$ or —COO—Z$_3$ bonded via a hydrocarbon group (wherein Z$_3$ represents a hydrocarbon group which may be substituted);

(IVa)

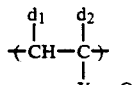

(IVb)

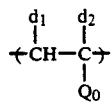

wherein $X_1$ has the same meaning as $X_0$ in the general formula (III); $Q_1$ represents an aliphatic group having from 1 to 18 carbon atoms or an aromatic group having from 6 to 12 carbon atoms; $d_1$ and $d_2$, which may be the same or different, each has the same meaning as $c_1$ or $c_2$ in the general formula (III); and $Q_0$ represents —CN, —CONH$_2$, or

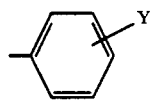

(wherein Y represents a hydrogen atom, a halogen atom, a hydrocarbon group, an alkoxy group or —COOZ$_4$ (wherein Z$_4$ represents an alkyl group, an aralkyl group, or an aryl group));

(V)

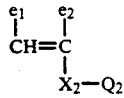

wherein $X_2$ has the same meaning as $X_1$ in the general formula (IVa); $Q_2$ has the same meaning as $Q_1$ in the general formula (IVa); and $e_1$ and $e_2$, which may be the same of different, each has the same meaning as $c_1$ or $c_2$ in the general formula (III).

DETAILED DESCRIPTION OF THE INVENTION

The binder resin which can be used in the present invention is characterized by comprising at least a graft type copolymer (hereinafter referred to as resin (A)) formed from, as a copolymerizable component, at least one monofunctional macromonomer (MA) comprising an AB block copolymer being composed of an A block comprising at least one polymer component containing the specific acidic group and a B block comprising a polymerizable component represented by the general formula (I), and having a polymer double bond group bonded to the terminal of the main chain of the B block polymer, and a high-molecular weight resin (hereinafter referred to as resin (B)) composed of a graft type copolymer formed from at least a monofunctional macromonomer (MB) which comprises at least a polymer component corresponding to a repeating unit represented by the above described general formula (IVa) or (IVb) and has a polymerizable double bond group bonded to only one terminal of the main chain thereof and a monomer represented by the general formula (V).

The resin (B) according to the present invention can further be formed of a polymerizable component containing at least one acidic group selected from —COOH, —PO$_3$H$_2$, —SO$_3$H, —OH,

(wherein R$_0$ represents a hydrocarbon group or —OR$_0'$ (wherein R$_0'$ represents a hydrocarbon group)), —CHO and a cyclic acid anhydride containing group in addition to the copolymer component corresponding to a repeating unit represented by the general formula (IVa) or (IVb), as a component constituting the macromonomer (MB). Specifically, such type of a resin (hereinafter sometime referred to as resin (BX)) is a copolymer having a weight average molecular weight of not less than 3—10$^4$ and formed from at least a monofunctional macromonomer (MBX) having a weight average molecular weight of not more than $2 \times 10^4$ and a monomer represented by the general formula (V) described above, the macromonomer (MBX) comprising at least one polymer component corresponding to a repeating unit represented by the general formula (IVa) or (IVb) described above, and at least one polymer component containing at least one acidic group selected from —COOH, —PO$_3$H$_2$, —SO$_3$, H —OH,

(wherein R$_0$ represents a hydrocarbon group or —OR$_0'$ (wherein R$_0'$ represents a hydrocarbon group)), —CHO, and a cyclic acid anhydride-containing group, and the macromonomer (MBX) having a polymerizable double bond group represented by the general formula (III) described above bonded to only one terminal of the main chain thereof.

The low molecular weight resin of acidic group-containing binder resins which are known to improve the smoothness of the photoconductive layer and the electrostatic characteristics described above is a resin wherein acidic group-containing polymer components exist at random in the polymer main chain, or a resin wherein an acidic group is bonded to only one terminal of the polymer main chain.

On the other hand, the graft type copolymer (resin (A)) used as the binder resin according to the present invention has a chemical structure of the polymer chain which is specified in such a manner that the acidic groups contained in the resin exist as a block (i.e., the A block) in the graft portion apart from the copolymer main chain.

It is presumed that, in the graft type copolymer (resin (A)) used in the present invention, the acidic groups maldistributed at the terminal portion of the graft part of the polymer are sufficiently adsorbed on the stoichiometric defect of the inorganic photoconductive substance and the other block portions of the graft part of the polymer mildly but sufficiently cover the surface of the photoconductive substance. Also, it is presumed that, even when the stoichiometric defect portion of the inorganic photoconductive substance varies to some extents, it always keeps the stable interaction with the copolymer (resin (A)) used in the present invention since the resin has the above described sufficiently adsorbed domain by the function and mechanism of the sufficient adsorption onto the surface of the photoconductive substance and the mild covering as described above as compared with known resins. Thus, it has been found that, according to the present invention, the traps of the inorganic photoconductive substance are more effectively and sufficiently compensated and the humidity characteristics of the photoconductive substance are improved as compared with conventionally known acidic group-containing resins. Further, in the present invention, particles of the inorganic photoconductive substance are sufficiently dispersed in the binder to restrain the occurrence of the aggregation of the particles of the photoconductive substance.

If an electrophotographic light-sensitive material having a photoconductive layer of a coarse surface is used as a lithographic printing plate precursor by an electrophotographic system, the photoconductive layer is formed in a state that the dispersion state of the particles of an inorganic photoconductive substance such as zinc oxide particles and a binder resin is improper and aggregates of the particles exist. When an oil-desensitizing treatment with an oil-desensitizing solution is applied thereto, the non-image areas are not uniformly and sufficiently rendered hydrophilic to cause attaching of a printing ink at printing, which results in the formation of background stains at the non-image areas of the prints obtained.

On the other hand, the resin (B) serves to sufficiently heighten the mechanical strength of a photoconductive layer, which may be insufficient in case of using the resin (A) alone, without damaging the excellent electrophotographic characteristics attained by the use of the resin (A). Further, the excellent image forming performance can be maintained even when the environmental conditions are greatly changed as described above or in the case of conducting a scanning exposure system using a laser beam of low power.

It is believed that the excellent characteristics of the electrophotographic light-sensitive material may be obtained by employing the resin (A) and the resin (B) as binder resins for the inorganic photoconductive substance, wherein the weight average molecular weight of the resins, and the content and position of the acidic groups therein are specified, whereby the strength of interactions between the inorganic photoconductive substance and the resins can be appropriately controlled. More specifically, it is believed that the electrophotographic characteristics and mechanical strength of the layer as described above can be greatly improved by the fact that the resin (A) having a relatively strong interaction to the inorganic photoconductive substance selectively adsorbs thereon; whereas, in the resin (B) which has a weak activity compared with the resin (A), the acidic group bonded to the specific position mildly interacts with the inorganic photoconductive substance to a degree which does not damage the electrophotographic characteristics.

According to the present invention, the interaction of adsorption and covering between the inorganic photoconductive substance and the binder resins is suitably performed, and the sufficient mechanical strength of the photoconductive layer is achieved by the combination of the resins described above.

If the low molecular weight resin (A) according to the present invention is used alone as the binder resin, the resin can sufficiently adsorb onto the photoconductive substance and cover the surface thereof and thus, the photoconductive layer formed is excellent in the surface smoothness and electrostatic characteristics, provides images free from background fog and maintains a sufficient film strength for a CPC light-sensitive material or for an offset printing plate precursor giving several thousands of prints. When the resin (B) is employed together with the resin (A) in accordance with the present invention, the mechanical strength of the photoconductive layer, which may be yet insufficient by the use of the resin (A) alone, can be further increased without damaging the above-described high performance of the electrophotographic characteristics due to the resin (A). Therefore, the electrophotographic light-sensitive material of the present invention can maintain the excellent electrostatic characteristics even when the environmental conditions are widely changed, possess a sufficient film strength and form a printing plate which provides more than 10,000 prints under severe printing conditions, for example, when high printing pressure is applied in a large size printing machine.

The polymerizable components of the macromonomer (MA) in the resin (A) are composed of the A block and the B block as described above, and the ratio of A block/B block is preferably 1 to 70/99 to 30 by weight, and more preferably 3 to 50/97 to 50 by weight.

The ratio of the macromonomer (MA) to other monomers (for example, monomer represented by the general formula (II) described below) in the graft type copolymer (resin (A)) according to the present invention is preferably 1 to 60/90 to 40 by weight, and more preferably 5 to 40/95 to 60 by weight.

The content of the acidic group-containing component present in the macromonomer (MA) of the graft type copolymer (resin (A)) according to the present invention is preferably from 1 to 30 parts by weight, and more preferably from 3 to 20 parts by weight per 100 parts by weight of the resin (A).

The content of the acidic group present in the resin (A) described above can be adjusted to a preferred range by appropriately selecting the ratio of the A block present in the macromonomer (MA) and the ratio of the macromonomer (MA) in the resin (A).

In the resin (A), a component copolymerizable with the macromonomer (MA) is preferably a monomer represented by the following general formula (II):

wherein $R_2$ represents a hydrocarbon group.

In the present invention, of the monomers represented by the general formula (II) which is a component copolymerizable with the macromonomer (MA), a monomer represented by the following general formula (IIa) or (IIb) is more preferred.

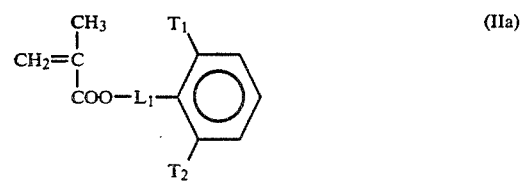

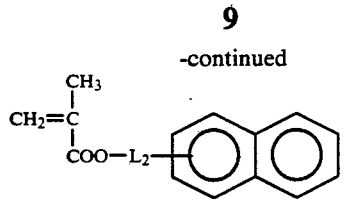

-continued (IIb) 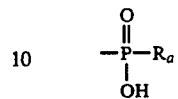

wherein $T_1$ and $T_2$ each, independently, represents a hydrogen atom, a hydrocarbon group having from 1 to 10 carbon atoms, a chlorine atom, a bromine atom, —$COZ_5$ or —$COOZ_5$ (wherein $Z_5$ represents a hydrocarbon group having from 1 to 10 carbon atoms); and $L_1$ and $L_2$ each represents a single bond or a linkage group having from to 4 linking atoms, each connecting —COO— and the benzene ring.

In case of using the resin (A) containing the methacrylate monomer component having a substituted benzene or naphthalene ring-containing substituent represented by the general formula (IIa) or (IIb) as a monomer component copolymerizable with the macromonomer (MA), the electrophotographic characteristics, particularly, $V_{10}$, DRR and $E_{1/10}$ of the electrophotographic material can be furthermore improved. The above described type of the resin (A) is hereinafter referred to as resin (A') sometime. While the reason of this fact is not fully clear, it is believed that the polymer molecular chain of the resin (A') suitably arranges on the surface of inorganic photoconductive substance such as zinc oxide in the layer depending on the plane effect of the benzene ring having a substituent at the ortho position or the naphthalene ring which is an ester component of the methacrylate whereby the above described improvement is achieved.

If the molecular weight of the resin (A) is less than $1 \times 10^3$, the film-forming ability thereof is undesirably reduced, whereby the photoconductive layer formed cannot keep a sufficient film strength. On the other hand, if the molecular weight thereof is larger than $2 \times 10^4$, the fluctuations of electrophotographic characteristics (in particular, initial potential and dark decay retention rate) of the photoconductive layer become somewhat large and thus the effect for obtaining stable duplicated images according to the present invention becomes smaller under severe conditions of high temperature and high humidity or low temperature and low humidity.

Further, if the content of the macromonomer (MA) in the resin (A) is less than 1% by weight, electrophotographic characteristics (particularly dark decay retention rate and photosensitivity) may be reduced and the fluctuations of electrophotographic characteristics of the photoconductive layer, particularly that containing a spectral sensitizing dye for the sensitization in the range of from near-infrared to infrared become large under severe conditions. The reason therefor is considered to be that the construction of the polymer becomes similar to that of a conventional homopolymer or random copolymer resulting from the slight amount of macromonomer constituting the graft portion present therein.

On the other hand, the content of the macromonomer (MA) in the resin (A) is more than 60% by weight, the copolymerizability of the macromonomer with other monomers corresponding to other copolymerizable components may become insufficient, and the sufficient electrophotographic characteristics can not be obtained as the binder resin.

According to another preferred embodiment of the present invention, the resin (B) (including the resin (BX)) is a high molecular weight resin (hereinafter referred to as resin (B')) of a graft copolymer further having at least one acidic group selected from —$PO_3H_2$, —$SO_3H$, —COOH, —OH, —SH,

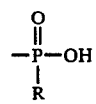

(wherein $R_a$ has the same meaning as R defined above) and a cyclic acid anhydride-containing group bonded to the only one terminal of the main chain of the polymer.

When the resin (B') is employed, the electrostatic characteristics, particularly, DRR and $E_{1/10}$ of the electrophotographic material are further improved without damaging the excellent characteristics due to the resin (A), and these preferred characteristics are almost maintained in the case of greatly changing the environmental conditions from high temperature and high humidity to low temperature and low humidity. Moreover, the film strength is further improved and the printing durability is also increased.

The ratio of the resin (A) to resin (B) to be used is preferably 5 to 80/95 to 20 by weight, and more preferably 10 to 60/90 to 40 by weight.

Now, the resin (A) to resin (B) which can be employed in the present invention will be described in more detail hereinafter.

The mono-functional macromonomer (MA) which can be employed in the graft type copolymer (resin (A)) according to the present invention is described in greater detail below.

The acidic group contained in a component which constitutes the A block of the macromonomer (MA) includes —$PO_3H_2$, —COOH, —$SO_3H$, a phenolic hydroxy group,

(R represents a hydrocarbon group or —OR' (wherein R' represents a hydrocarbon group)), and a cyclic acid anhydride-containing group, and the preferred acidic groups are —COOH, —$SO_3H$, a phenolic hydroxy group and

In the acidic group $$-\overset{\overset{\displaystyle O}{\|}}{\underset{R}{P}}-OH$$

above, R represents a hydrocarbon group or OR', wherein R' represents a hydrocarbon group. The hydrocarbon group represented by R or R' preferably includes an aliphatic group having from 1 to 22 carbon atoms (e.g., methyl, ethyl, propyl, butyl, hexyl, octyl, decyl, dodecyl, octadecyl, 2-chloroethyl, 2-methoxyethyl, 3-ethoxypropyl, allyl, crotonyl, butenyl, cyclohexyl, benzyl, phenethyl, 3-phenylpropyl, methylbenzyl, chlorobenzyl, fluorobenzyl, and methoxybenzyl) and a substituted or unsubstituted aryl group (e.g., phenyl, tolyl, ethylphenyl, propylphenyl, chlorophenyl, fluorophenyl, bromophenyl, chloromethylphenyl, dichlorophenyl, methoxyphenyl, cyanophenyl, acetamidophenyl, acetylphenyl, and butoxyphenyl).

The cyclic acid anhydride-containing group is a group containing at least one cyclic acid anhydride. The cyclic acid anhydride to be contained includes aliphatic dicarboxylic acid anhydrides and aromatic dicarboxylic acid anhydrides.

Specific examples of the aliphatic dicarboxylic acid anhydrides include succinic anhydride ring, glutaconic anhydride ring, maleic anhydride ring, cyclopentane-1,2-dicarboxylic acid anhydride ring, cyclohexane-1,2-dicarboxylic acid anhydride ring, cyclohexene-1,2-dicarboxylic acid anhydride ring, and 2,3-bicyclo[2,2,-2]octanedicarboxylic acid anhydride. These rings may be substituted with, for example, a halogen atom (e.g., chlorine and bromine) and an alkyl group (e.g., methyl, ethyl, butyl, and hexyl).

Specific examples of the aromatic dicarboxylic acid anhydrides include phthalic anhydride ring, naphtnalene-dicarboxylic acid anhydride ring, pyridine-dicarboxylic acid anhydride ring and thiophenedicarboxylic acid anhydride ring. These rings may be substituted with, for example, a halogen atom (e.g., chlorine and bromine), an alkyl group (e.g., methyl, ethyl, propyl, and butyl), a hydroxyl group, a cyano group, a nitro group, and an alkoxycarbonyl group (e.g., methoxycarbonyl and ethoxycarbonyl).

Examples of the phenolic hydroxy group described above include a hydroxy group of hydroxy-substituted aromatic compounds containing a polymerizable double bond and a hydroxy group of (meth)acrylic acid esters and amides each having a hydroxyphenyl group as a substituent.

The polymerizable corresponding to the polymer component containing the specific acidic group may be any of acidic group-containing vinyl compounds copolymerizable with a monomer corresponding to a co-polymer component constituting the B block of the macromonomer (MA), for example, the polymer component represented by the general formula (I). Examples of such vinyl compounds are described, e.g., in Kobunshi Gakkai (ed.), *Kobunshi Data Handbook* (*Kiso-hen*), Baifukan (1986). Specific examples of these vinyl monomers include acrylic acid, α- and/or β-substituted acrylic acids (e.g., α-acetoxy, α-acetoxymethyl, α-(2-amino)ethyl, α-chloro, α-bromo, α-fluoro, α-tributylsilyl, α-cyano, β-chloro, β-bromo, α-chloro-α-methoxy, and α,β-dichloro compounds), methacrylic acid, itaconic acid, itaconic half esters, itaconic half amides, crotonic acid, 2-alkenylcarboxylic acids (e.g., 2-pentenoic acid, 2-methyl-2-hexenoic acid, 2-octenoic acid, 4-methyl-2-hexenoic acid, and 4-ethyl-2-octenoic acid), maleic acid, maleic half esters, maleic half amides, vinylbenzenecarboxylic acid, vinylbenzenesulfonic acid, vinylsulfonic acid, vinylphosphonic acid, dicarboxylic acid vinyl or allyl half esters, and ester or amide derivatives of these carboxylic acids or sulfonic acids containing the acidic group in the substituent thereof.

Specific examples of the acidic group-containing copolymerizable components are set forth below, but the present invention should not be construed as being limited thereto. In the following examples, a represents —H, —CH$_3$, —Cl, —Br, —CN, —CH$_2$COOCH$_3$, or —CH$_2$COOH; b represents —H or —CH$_3$, n represents an integer of from 2 to 18; m represents an integer of from 1 to 12; and l represents an integer of from 1 to 4.

(a-1)

(a-2)

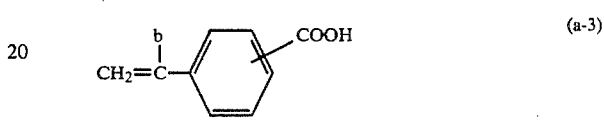
(a-3)

(a-4)

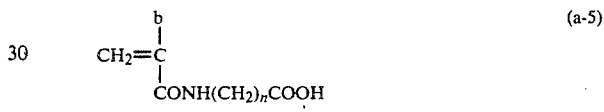
(a-5)

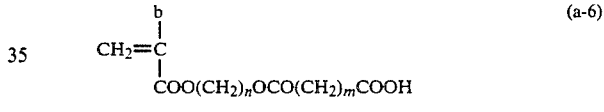
(a-6)

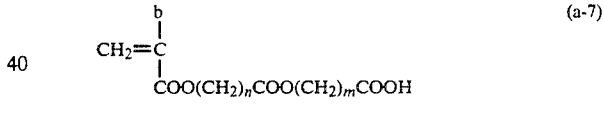
(a-7)

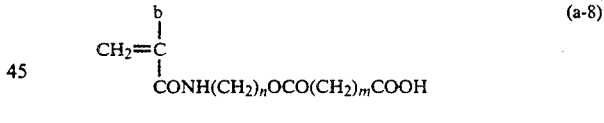
(a-8)

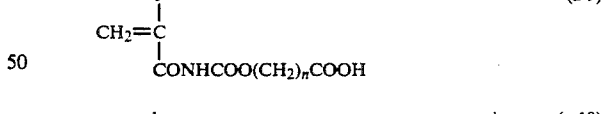
(a-9)

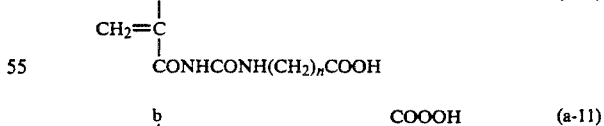
(a-10)

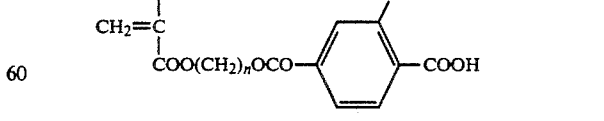
(a-11)

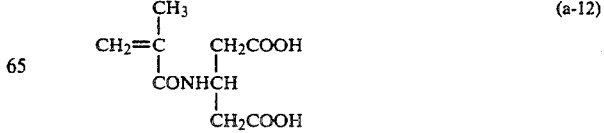
(a-12)

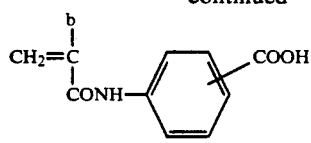 (a-13)
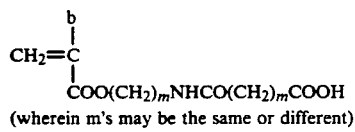 (a-14)
(wherein m's may be the same or different)
CH₂=CH—CH₂OCO(CH₂)ₘCOOH (a-15)
CH₂=CH(CH₂)ₙCOOH (a-16)
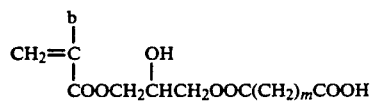 (a-17)
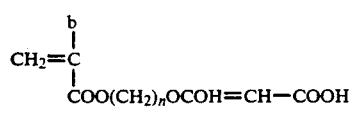 (a-18)
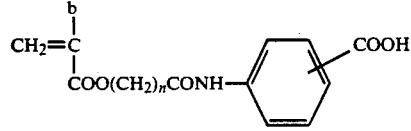 (a-19)
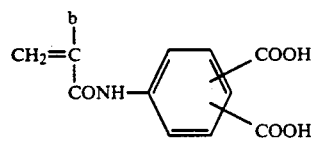 (a-20)
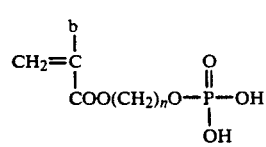 (a-21)
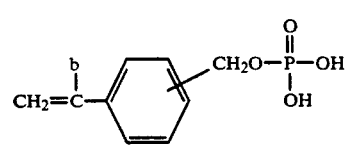 (a-22)
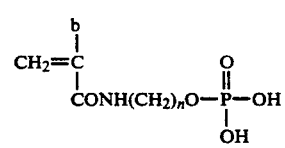 (a-23)
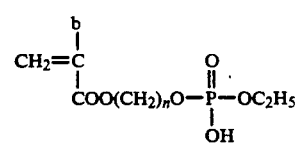 (a-24)
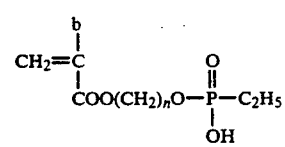 (a-25)
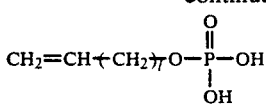 (a-26)
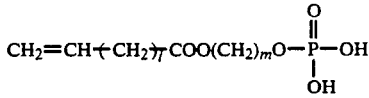 (a-27)
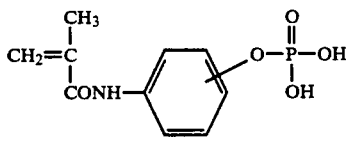 (a-28)
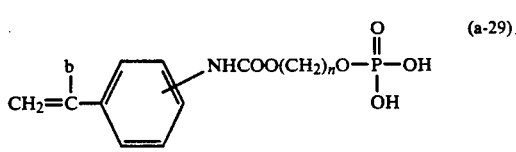 (a-29)
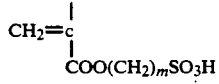 (a-30)
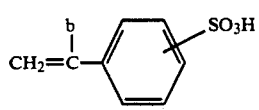 (a-31)
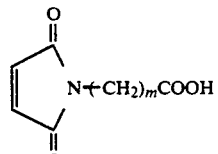 (a-32)
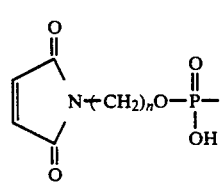 (a-33)
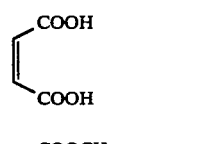 (a-34)
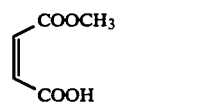 (a-35)
 (a-36)
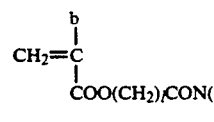 (a-37)

-continued

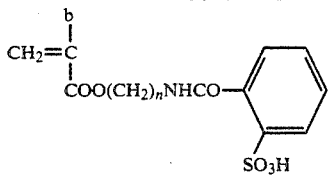 (a-38)

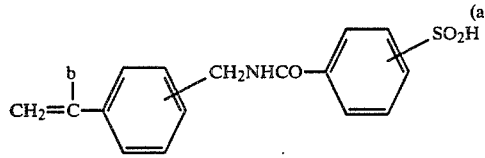 (a-39)

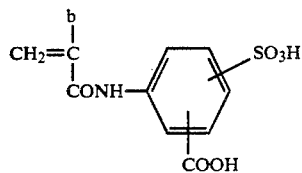 (a-40)

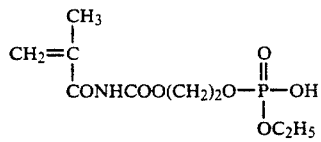 (a-41)

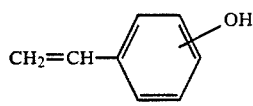 (a-42)

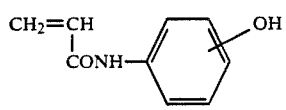 (a-43)

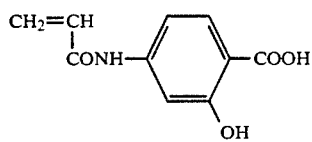 (a-44)

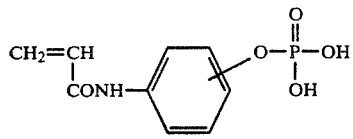 (a-45)

Two or more kinds of the above-described polymerizable components each containing the specific acidic group can be used in forming the A block. In such a case, two or more kinds of these acidic group-containing polymer components may be present in the form of a random copolymer or a block copolymer.

Also, other components having no acidic group may be contained in the A block, and examples of such components include the components represented by the general formula (I) described in detail below. The content of the component having the acidic group in the A block is preferably from 30 to 100% by weight.

Now, the polymer component represented by the general formula (I) constituting the B block in the mono-functional macromonomer (MA) of the graft type copolymer used in the present invention will be explained in more detail below.

In the general formula (I), $A_1$ represents —COO—, —OCO—, —$(CH_2)_{l_1}$OCO—, —$(CH_2)_{l_2}$CO— (wherein $l_1$ and $l_2$ each represents an integer of from 1 to 3), —O—, —$SO_2$—, —CO—,

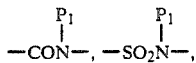

—CONHCOO—, —CONHCONH—, or

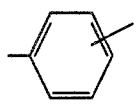

(wherein $P_1$ represents a hydrogen atom or a hydrocarbon group).

Preferred examples of the hydrocarbon group represented by $P_1$ include an alkyl group having from 1 to 18 Carbon atoms which may be substituted (e.g., methyl, ethyl, propyl, butyl, pentyl, hexyl, heptyl octyl, decyl, dodecyl, hexadecyl, octadecyl, 2-chloroethyl, 2-bromoethyl, 2-cyanoethyl, 2-methoxycarbonylethyl, 2-methoxyethyl, and 3-bromopropyl), an alkenyl group having from 4 to 18 carbon atoms which may be substituted (e.g., 2-methyl-1-propenyl, 2-butenyl, 2-pentenyl, 3-methyl-2-pentenyl, 1-pentenyl, 1-hexenyl, 2-hexenyl, and 4-methyl-2-hexcenyl), an aralkyl group having from 7 to 12 carbon atoms which may be substituted (e.g., benzyl, phenethyl, 3-phenylpropyl, naphthyl methyl, 2-naphthylethyl, chlorobenzyl, bromobenzyl, methylbenzyl, ethylbenzyl, methoxybenzyl, dimethylbenzyl, and dimethoxybenzyl), an alicyclic group having from 5 to 8 carbon atoms which may be substituted (e.g., cyclohexyl, 2-cyclohexylethyl, and 2-cyclopentylethyl), and an aromatic group having from 6 to 12 carbon atoms which may be substituted (e.g., phenyl, naphthyl, tolyl, xylyl, propylphenyl, butylphenyl, octylphenyl, dodecylphenyl, methoxyphenyl, ethoxyphenyl, butoxyphenyl, decyloxyphenyl, chlorophenyl, dichlorophenyl, bromophenyl, cyanophenyl, acetylphenyl, methoxycarbonylphenyl, ethoxycarbonylphenyl, butoxycarbonylphenyl, acetamidophenyl, propioamidophenyl, and dodecyloylamidophenyl).

In the general formula (I), $R_1$ represents a hydrocarbon group, and preferred examples thereof include those described for $P_1$ above. When $A_1$ represents

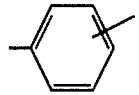

in the general formula (I), $R_1$ represents a hydrogen atom or a hydrocarbon group.

When $A_1$ represents

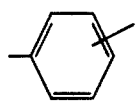, the benzene ring may be further substituted. Suitable examples of the substituents include a halogen atom (e.g., chlorine, and bromine), an alkyl group (e.g., methyl, ethyl, propyl, butyl, chloromethyl, and methoxymethyl), and an alkoxy group (e.g., methoxy, ethoxy, propoxy, and butoxy).

In the general formula (I), $a_1$ and $a_2$, which may be the same or different, each preferably represents a hydrogen atom, a halogen atom (e.g., chlorine, and bromine), a cyano group, or an alkyl group having from 1 to 4 carbon atoms (e.g., methyl, ethyl, propyl, and butyl), $-COO-Z_1$ or $-COO-Z_1$ bonded via a hydrocarbon group, wherein $Z_1$ represents a hydrocarbon group (preferably an alkyl group, an alkenyl group, an aralkyl group, an alicyclic group or an aryl group, each of which may be substituted). More specifically, the examples of the hydrocarbon groups for $Z_1$ are those described for $P_1$ above. The hydrocarbon group via which $-COO-Z_1$ is bonded includes, for example, a methylene group, an ethylene group, and a propylene group.

More preferably, in the general formula (I), Al represents $-COO-$, $-OCO-$, $-CH_2OCO-$, $-CH_2COO-$, $-O-$, $-CONH-$, $-SO_2NH-$ or

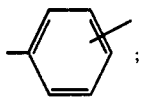

and $a_1$ and $a_2$, which may be the same or different, each represents a hydrogen atom, a methyl group, $-COOZ_3$, or $-CH_2COOZ_3$, wherein $Z_3$ represents an alkyl group having from 1 to 6 carbon atoms (e.g., methyl, ethyl, propyl, butyl, and hexyl). Most preferably, either one of $a_1$ and $a_2$ represents a hydrogen atom.

Further, the B block may contain polymer components other than those represented by the general formula (I).

Suitable examples of monomers corresponding to the repeating unit copolymerizable with the polymerizable corresponding to the polymer component represented by the general formula (I), as a polymerizable component used in forming the B block include acrylonitrile, methacrylonitrile and heterocyclic vinyl compounds (e.g., vinylpyridine, vinylimidazole, vinylpyrrolidone, vinylthiophene, vinylpyrazole, vinyldioxane, and vinyloxazine). Such other monomers are employed in a range of not more than 20 parts by weight per 100 parts by weight of the total polymer components in the B block.

Further, it is preferred that the B block does not contain the polymer component containing an acidic group which is a component constituting the A block.

When the B block contains two or more kinds of the polymer components, these polymerizable components may be contained in the B block in the form of a random copolymer or a block copolymer, but are preferably contained at random therein in view of the simple synthesis thereof.

As described above, the macromonomer (MA) to be used in the present invention has a structure of the AB block copolymer in which a polymerizable double bond-containing group is bonded to one of the terminals of the B block composed of the polymer component represented by the general formula (I) and the other terminal thereof is connected to the A block composed of the polymer component containing the acidic group. Now, the polymerizable double bond-containing group will be described in detail below.

Suitable examples of the polymerizable double bond-containing group include those represented by the following general formula (VI):

wherein $A_2$ has the same meaning as $A_1$ defined in the general formula (I), and $b_1$ and $b_2$, which may be the same or different, each has the same meaning as $a_1$ or $a_2$ defined in the general formula (I).

Specific examples of the polymerizable double bond-containing group represented by the general formula

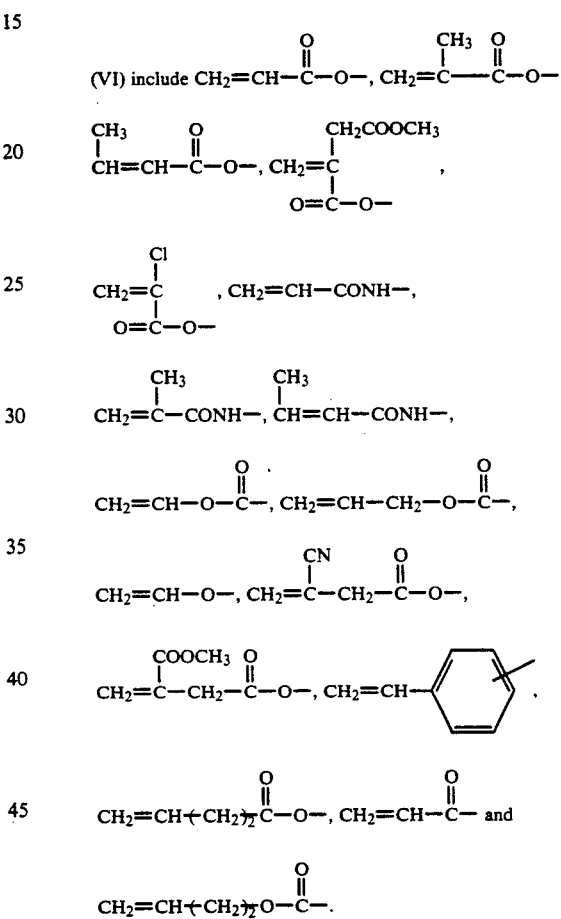

The macromonomer (MA) used in the present invention has a structure in which a polymerizable double bond-containing group preferably represented by the general formula (VI) above is bonded to one of the terminals of the B block either directly or through an appropriate linking group.

The linking group which can be used includes a carbon-carbon bond (either single bond or double bond), a carbon-hetero atom bond (the hetero atom includes, for example, an oxygen atom, a sulfur atom, a nitrogen atom, and a silicon atom), a hetero atom-hetero atom bond, and an appropriate combination thereof.

More specifically, the linkage between the polymerizable double bond-containing group and the terminal of the B block include a mere bond and a linking group selected from

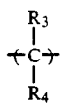

(wherein $R_3$ and $R_4$ each represents a hydrogen atom, a halogen atom (e.g., fluorine, chlorine, and bromine), a cyano group, a hydroxyl group, or an alkyl group (e.g., methyl, ethyl, and propyl),

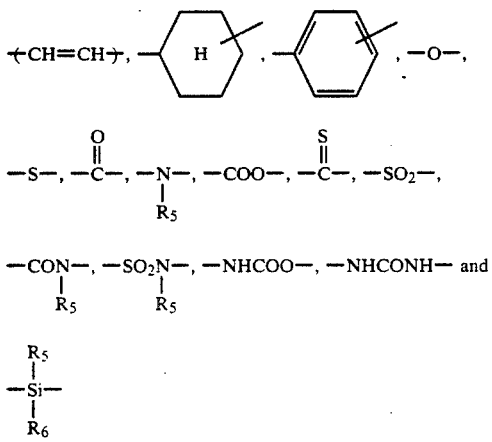

(wherein $R_5$ and $R_6$ each represents a hydrogen atom or a hydrocarbon group having the same meaning as defined for $R_1$ in the general formula (I) described above), and an appropriate combination thereof.

If the weight average molecular weight of the macromonomer (MA) exceeds $2 \times 10^4$, copolymerizability with other monomers, for example, those represented by the general formula (II) is undesirably reduced. If, on the other hand, it is too small, the effect of improving electrophotographic characteristics of the light-sensitive layer would be small. Accordingly, the macromonomer (MA) preferably has a weight average molecular weight of at least $1 \times 10^3$.

The macromonomer (MA) used in the present invention can be produced by a conventionally known synthesis method. More specifically, it can be produced by the method comprising previously protecting the acidic group of a polymerizable monomer corresponding to the polymer component having the specific acidic group to form a functional group, synthesizing an AB block copolymer by a so-called known living polymerization reaction, for example, an ion polymerization reaction with an organic metal compound (e.g., alkyl lithiums, lithium diisopropylamide, and alkylmagnesium halides) or a hydrogen iodide/iodine system, a photopolymerization reaction using a porphyrin metal complex as a catalyst, or a group transfer polymerization reaction, introducing a polymerizable double bond-containing group into the terminal of the resulting living polymer by a reaction with a various kind of reagent, and then conducting a protection-removing reaction of the functional group which has been formed by protecting the acidic group by a hydrolysis reaction, a hydrogenolysis reaction, an oxidative decomposition reaction, or a photodecomposition reaction to form the acidic group.

An example thereof is shown by the following reaction scheme (1):

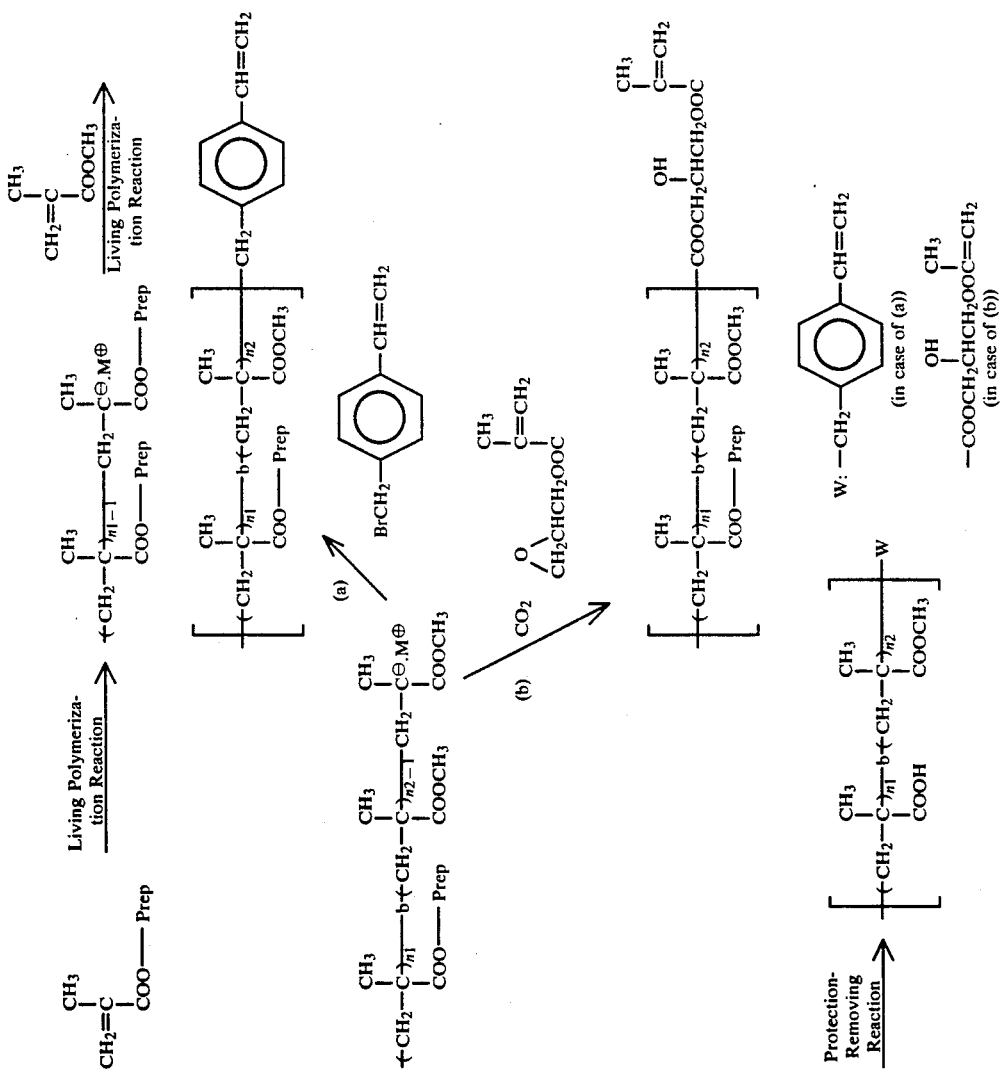

The living polymer can be easily synthesized according to synthesis methods as described, e.g., in P. Lutz, P. Masson et al, *Polym. Bull.*, 12, 79 (1984), B. C. Anderson, G. D. Andrews et al, *Macromolecules*, 14, 1601 (1981), K. Hatada, K. Ute et al, *Polym. J.*, 17, 977 (1985), ibid., 18, 1037 (1986), Koichi Migite and Koichi Hatada, *Kobunshi Kako (Polymer Processing)*, 36, 366 (1987), Toshinobu Higashimura and Mitsuo Sawamoto, *Kobunshi Ronbun Shu (Polymer Treatises)*, 46, 189 (1989), M. Kuroki and T. Aida, *J. Am. Chem. Soc.*, 109, 4737 (1987), Teizo Aida and Shohei Inoue, *Yuki Gosei Kagaku (Organic Synthesis Chemistry)*, 43, 300 (1985), and D. Y. Sogoh, W. R. Hertler et al, *Macromolecules*, 20, 1473 (1987).

In order to introduce a polymerizable double bond-containing group into the terminal of the living polymer, a conventionally known synthesis method for macromonomer can be employed.

For details, reference can be made, for example, to P. Dreyfuss and R. P. Quirk, *Encycl. Polym. Sci. Eng.*, 7, 551 (1987), P. F. Rempp and E. Franta, *Adv. Polym. Sci.*, 58, 1 (1984), V. Percec, *Appl. Polym. Sci.*, 285, 95 (1984), R. Asami and M. Takari, *Makromol. Chem. Suppl.*, 12, 163 (1985), P. Rempp et al., *Makromol. Chem. Suppl.*, 8, 3 (1984), Yushi Kawakami, *Kogaku Koqyo*, 38, 56 (1987), Yuya Yamashita, *Kobunshi*, 31, 988 (1982), Shiro Kobayashi, *Kobunshi*, 30, 625 (1981), Toshinobu Higashimura, *Nippon Secchaku Kyokaishi*, 18, 536 (1982), Koichi Itoh, *Kobunshi Kako*, 35, 262 (1986), Kishiro Higashi and Takashi Tsuda, *Kino Zairyo*, 1987, No. 10, 5, and references cited in these literatures.

Also, the protection of the specific acidic group of the present invention and the release of the protective group (a reaction for removing a protective group) can be easily conducted by utilizing conventionally known techniques. More specifically, they can be preformed by appropriately selecting methods as described, e.g., in Yoshio Iwakura and Keisuke Kurita, *Hannosei Kobunshi (Reactive Polymer)*, Kodansha (1977), T. W. Greene, *Protective Groups in Organic Synthesis*, John Wiley & Sons (1981), and J. F. W. McOmie, Protective Groups in Organic Chemistry, Plenum Press (1973), as well as methods as described in the above references.

Furthermore, the AB block copolymer can be also synthesized by a photoinitiation polymerization method using a dithiocarbamate compound as an initiator. For example, the block copolymer can be synthesized according to synthesis methods as described, e.g., in Takayuki Otsu, *Kobunshi (Polymer)*, 37, 248 (1988), Shunichi Himori and Ryuichi Ohtsu, *Polym. Rep. Jap.*, 37, 3508 (1988), JP-A-64-111, and JP-A-64-26619.

The macromonomer (MA) according to the present invention can be obtained by applying the above described synthesis method for macromonomer to the AB block copolymer.

Specific examples of the macromonomer (MA) which can be used in the present invention are set forth below, but the present invention should not be construed as being limited thereto. In the following formulae, c, d and e each represents —H, —CH$_3$ or —CH$_2$COOCH$_3$; f represents —H or —CH$_3$; R$_7$ represents —C$_p$H$_{2p+1}$ (wherein p represents an integer of from 1 to 18),

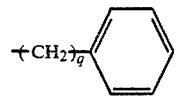

(wherein q represents an integer of from 1 to 3),

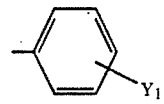

(wherein Y$_1$ represents —H, —Cl, —Br, —CH$_3$, —OCH$_3$ or —COCH$_3$) or

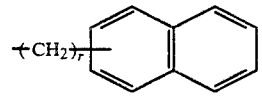

(wherein r represents an integer of from 0 to ); R$_8$ represents —C$_s$H$_{2s+1}$ (wherein s represents an integer of from 1 to 8) or

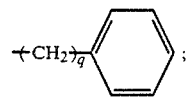

Y$_2$ represents —OH, —COOH, —SO$_3$H,

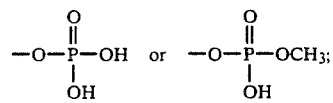

Y$_3$ represents —COOH, —SO$_3$H,

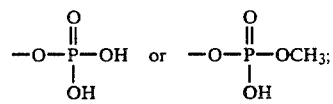

t represents an integer of from 2 to 12; and u represents an integer of from 2 to 6.

(MA-1)

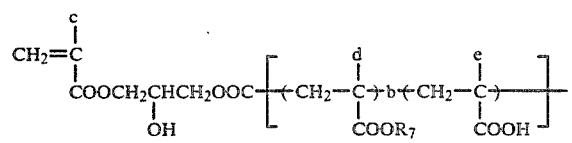

(MA-2)

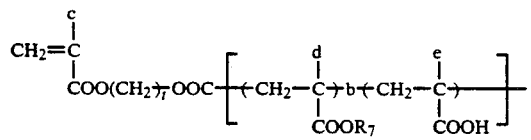
(MA-3)
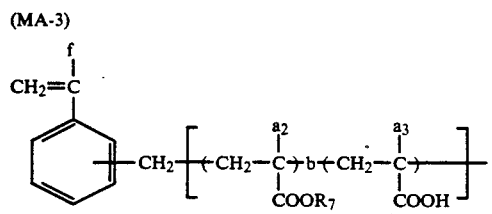
(MA-4)
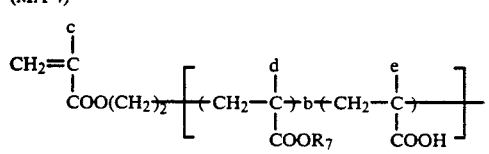
(MA-5)
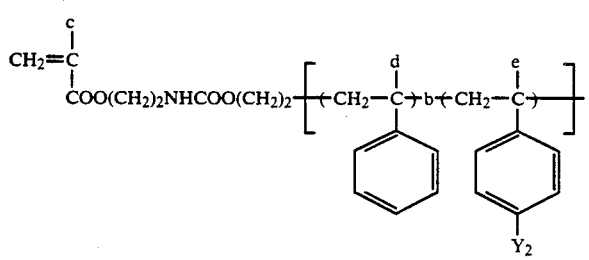
(MA-6)
(MA-7)
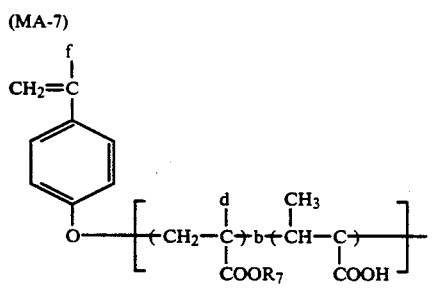
(MA-8)
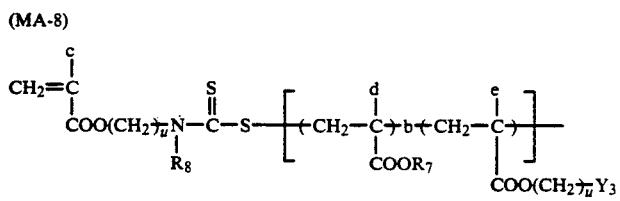
(MA-9)

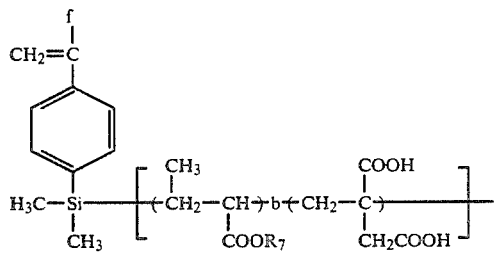
(MA-10)
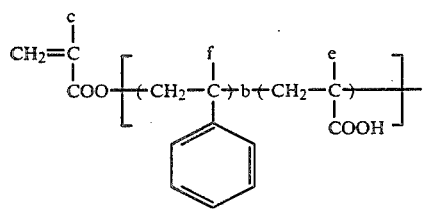
(MA-11)
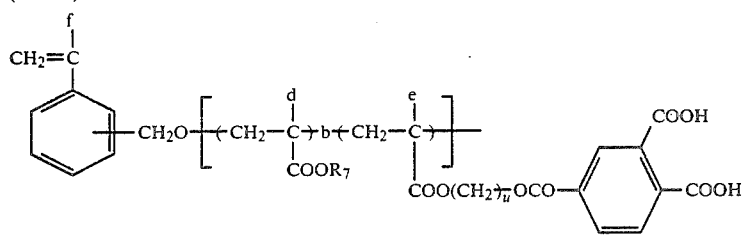
(MA-12)
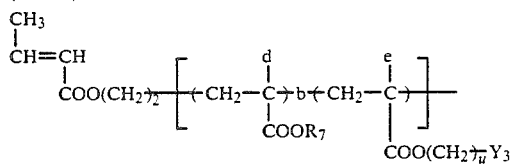
(MA-13)
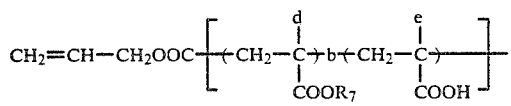
(MA-14)
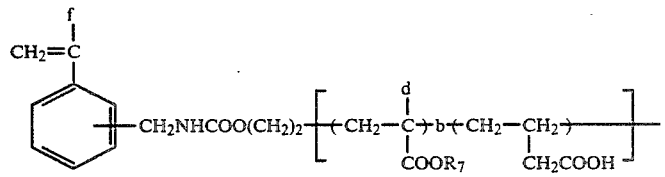
(MA-15)
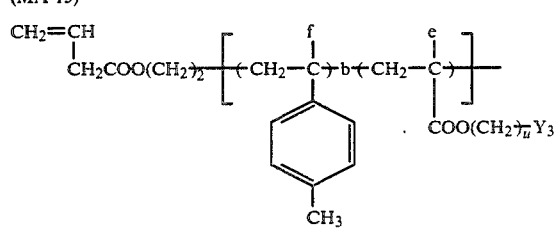
(MA-16)

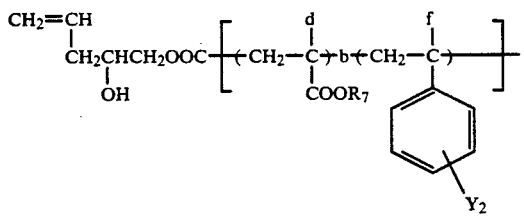

The monomer copolymerizable with the macromonomer (MA) described above is preferably selected from those represented by the general formula (II). In the general formula (II), $R_2$ has the same meaning as defined for $R_1$ in the general formula as described above.

As described above, the resin (A) of a low molecular weight according to the present invention preferably formed from, as a copolymerizable component, a methacrylate component having a specific substituent containing a benzene ring which has a specific substituent(s) at the 2-position or 2- and 6-positions thereof or a specific substituent containing an unsubstituted naphthalene ring represented by the general formula (IIa) or (IIb).

In the general formula (IIa), $T_1$ and $T_2$ each preferably represents a hydrogen atom, a chlorine atom, a bromine atom, an alkyl group having from 1 to 4 carbon atoms (e.g., methyl, ethyl, propyl, and butyl), an aralkyl group having from 7 to 9 carbon atoms (e.g., benzyl, phenethyl, 3-phenylpropyl, chlorobenzyl, dichlorobenzyl, bromobenzyl, methylbenzyl, methoxybenzyl, and chloromethylbenzyl), an aryl group (e.g., phenyl, tolyl, xylyl, bromophenyl, methoxyphenyl, chlorophenyl, and dichlorophenyl), or —$COZ_5$ or —$COOZ_5$, wherein $Z_5$ preferably represents any of the above-recited hydrocarbon groups.

In the general formula (IIa), $L_1$ is a mere bond or a linkage group containing from 1 to 4 linking atoms which connects between —COO— and the benzene ring, e.g., —($CH_2$)$m_1$ (wherein $m_1$ represents an integer of 1, 2 or 3, —$CH_2CH_2OCO$—, —($CH_2O$)$m_2$ (wherein $m_2$ represents an integer of 1 or 2, and —$CH_2CH_2O$—.

In the general formula (IIb), $L_2$ has the same meaning as $L_1$ in the general formula (IIa).

Specific examples of monomer represented by the general formula (IIa) or (IIb) which are used in the present invention are set forth below, but the present invention is not to be construed as being limited thereto.

II-1) 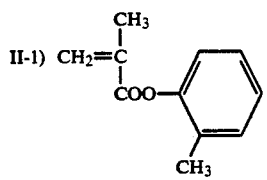

II-2) 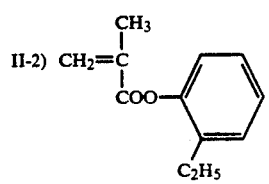

II-3) 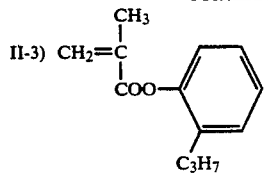

II-4) 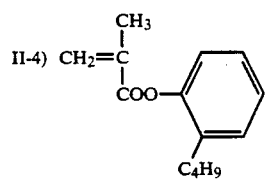

II-5) 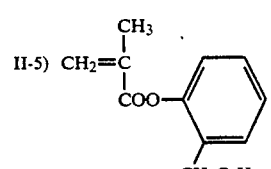

II-6) 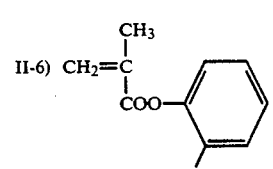

II-7) 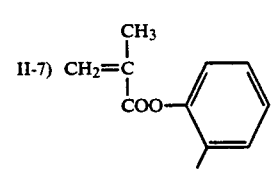

II-8) 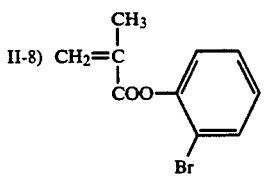

II-9) 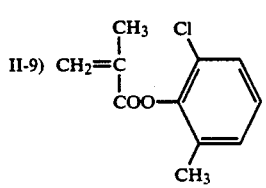

II-10) 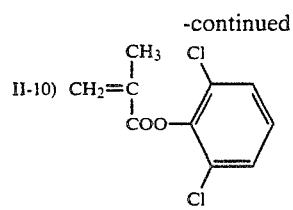
II-11) 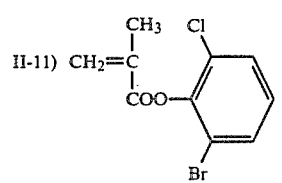
II-12) 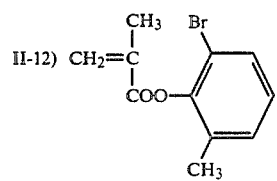
II-13) 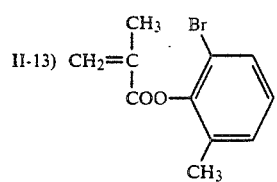
II-14) 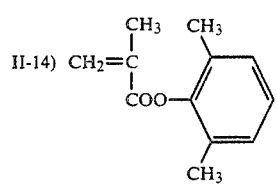
II-15) 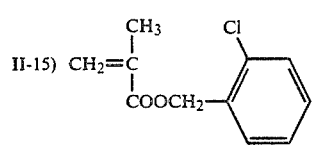
II-16) 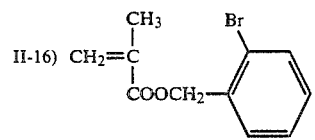
II-17) 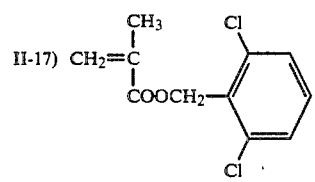
II-18) 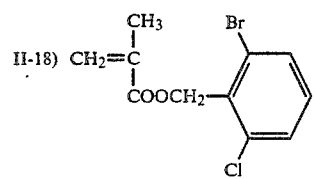
II-19) 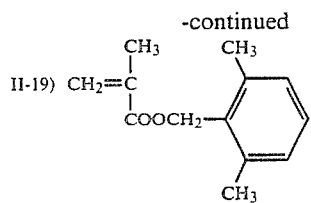
II-20) 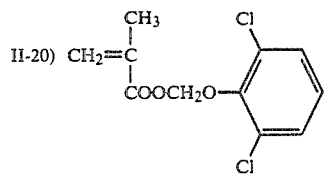
II-21) 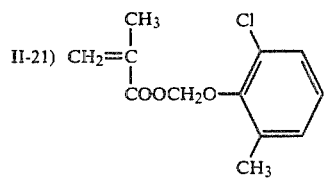
II-22) 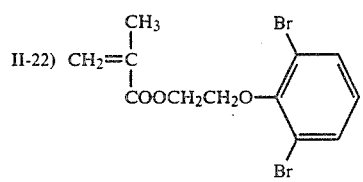
II-23) 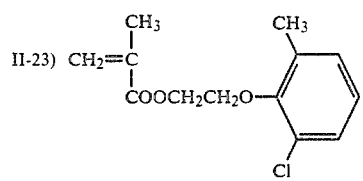
II-24) 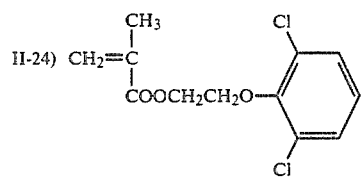
II-25) 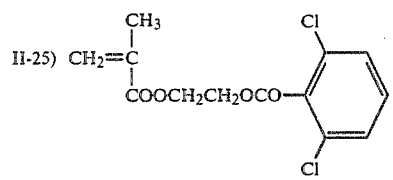
II-26) 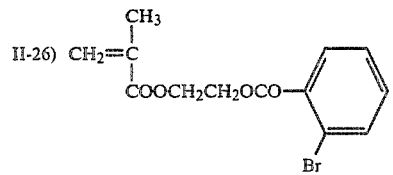
II-27) 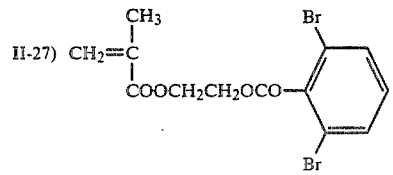

-continued

II-28) 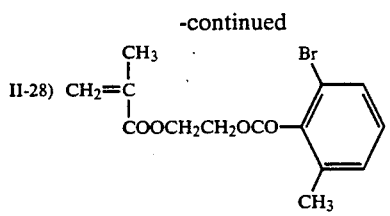

II-29) 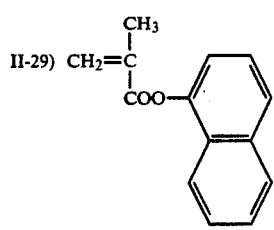

II-30) 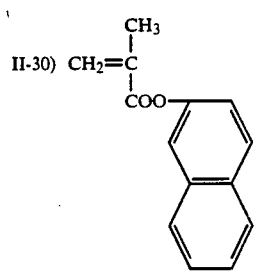

II-31) 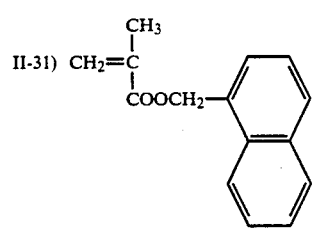

II-32) 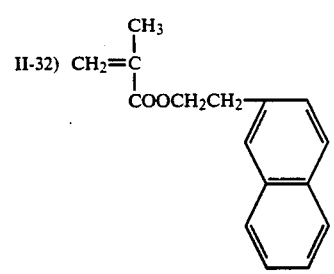

II-33) 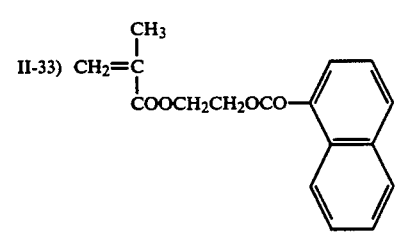

II-34) 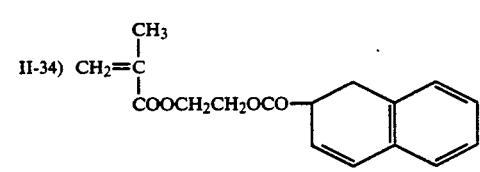

-continued

II-35) 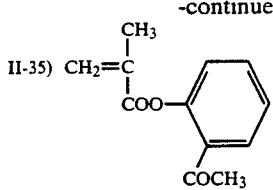

II-36) 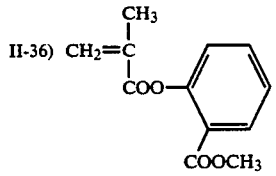

II-37) 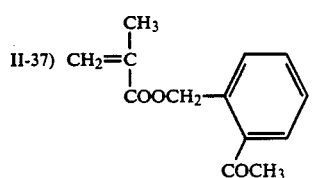

II-38) 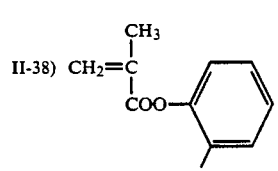

II-39) 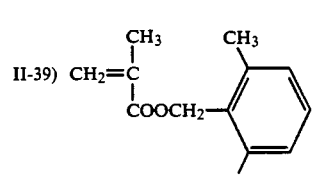

II-40) 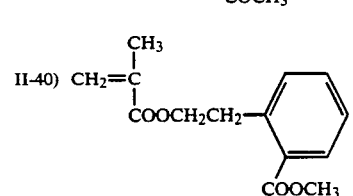

Monomers other than those represented by the general formula (II) (including those represented by the general formula (IIa) or (IIb)) may be employed as a component copolymerizable with the macromonomer (MA) in forming the graft type copolymer according to the present invention. Examples of such monomers include, α-olefins, vinyl or allyl esters of alkanoic acids, acrylonitrile, methacrylonitrile, vinyl ethers, acrylamides, methacrylamides, styrenes, and heterocyclic vinyl compounds (for example, those containing a 5-membered to 7-membered heterocyclic ring containing from 1 to 3 non-metallic atoms other than a nitrogen atom (e.g., oxygen, and sulfur), specifically including vinylthiophene, vinyldioxane, and vinylfuran). Preferred examples thereof include vinyl or allyl esters of alkanoic acid having from 1 to 3 carbon atoms, acrylonitrile, methacrylonitrile, styrene and styrene derivatives (e.g., vinyltoluene, butylstyrene, methoxystyrene, chlorostyrene, dichlorostyrene, bromostyrene, and ethoxystyrene).

The binder resin (A) according to the present invention can be produced by copolymerization of at least one compound each selected from the macromonomers (MA) and other monomers (for example, those represented by the general formula (II)) in the desired ratio. The copolymerization can be performed using a known polymerization method, for example, solution polymerization, suspension polymerization, precipitation polymerization, and emulsion polymerization. More specifically, according to the solution polymerization monomers are added to a solvent such as benzene or toluene in the desired ratio and polymerized with an azobis compound, a peroxide compound or a radical polymerization initiator to prepare a copolymer solution. The solution is dried or added to a poor solvent whereby the desired copolymer can be obtained. In case of suspension polymerization, monomers are suspended in the presence of a dispersing agent such as polyvinyl alcohol or polyvinyl pyrrolidone and copolymerized with a radical polymerization initiator to obtain the desired copolymer.

The content of the polymer component containing the specific acidic group in the macromonomer (MA) in the resin (A) of the present invention is preferably from 1 to 30 parts by weight, and more preferably from 3 to 20 parts by weight per 100 parts by weight of the resin (A).

The weight average molecular weight of the resin (A) is preferably from $3 \times 10^3$ to $1 \times 10^4$.

The glass transition point of the resin (A) is preferably from $-40°$ C. to $110°$ C., and more preferably from $-20°$ C. to $90°$ C.

The binder resin which can be used in the present invention may contain two or more kinds of the above described resins (A) (including the resin (A')).

Now, the resin (B) used in the present invention will be described in detail with reference to preferred embodiments below.

The resin (B) is a resin of a graft-type copolymer meeting the above described properties and formed from least one monofunctional macromonomer (MB) and at least one monomer represented by the general formula (V) described above.

The resin (B) is a graft-type copolymer resin having a weight average molecular weight of at least $3 \times 10^4$, and preferably from $5 \times 10^4$ to $3 \times 10^5$.

The glass transition point of the resin (B) is in the range of preferably from $0°$ C. to $120°$ C., and more preferably from $10°$ C. to $90°$ C.

The monofunctional macromonomer (MB) which is a copolymerizable component for forming of the resin (B) is described hereinafter in greater detail.

The monofunctional macromonomer (MB) is a macromonomer having a weight average molecular weight of not more than $2 \times 10^4$, comprising at least one polymer component corresponding to a repeating unit represented by the general formula (IVa) or (IVb) described above, and having a polymerizable double bond group bonded to only one terminal of the main chain thereof.

In the above described general formulae (III), (IVa), and (IVb), the hydrocarbon groups represented by or included in $c_1$, $c_2$, $X_0$, $d_1$, $d_2$, $X_1$, $Q_1$, and $Q_0$ each has the number of carbon atoms described above (as unsubstituted hydrocarbon group) and these hydrocarbon groups may have one or more substituents.

In the general formula (III), $X_0$ represents —COO—, —OCO—, —CH$_2$OCO—, —CH$_2$COO—, —O—, —SO$_2$—, —CO—, —CONHCOO—, —CONHCONH—, —CONHSO$_2$—

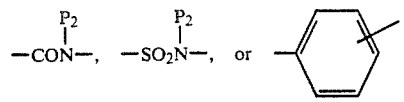

wherein P$_2$ represents a hydrogen atom or a hydrocarbon group, and preferred examples of the hydrocarbon group include an alkyl group having from 1 to 18 carbon atoms which may be substituted (e.g., methyl, ethyl, propyl, butyl, pentyl, hexyl, heptyl, octyl, decyl, dodecyl, hexadecyl, octadecyl, 2-chloroethyl, 2-bromoethyl, 2-cyanoethyl, 2-methoxycarbonylethyl, 2-methoxyethyl, and 3-bromopropyl), an alkenyl group having from 4 to 18 carbon atoms which may be substituted (e.g., 2-methyl-1-propenyl, 2-butenyl, 2-pentenyl, 3-methyl-2-pentenyl, 1-pentenyl, 1-hexenyl, 2-hexenyl, and 4-methyl-2-hexenyl), an aralkyl group having from 7 to 12 carbon atoms which may be substituted (e.g., benzyl, phenethyl, 3-phenylpropyl, naphthylmethyl, 2-naphthylethyl, chlorobenzyl, bromobenzyl, methylbenzyl, ethylbenzyl, methoxybenzyl, dimethylbenzyl and dimethoxybenzyl), an alicyclic group having from 5 to 8 carbon atoms which may be substituted (e.g., cyclohexyl, 2-cyclohexylethyl, and 2-cyclopentylethyl), and an aromatic group having from 6 to 12 carbon atoms which may be substituted (e.g., phenyl, naphthyl, tolyl, xylyl, propylphenyl, butylphenyl, octylphenyl, dodecyphenyl, methoxyphenyl, ethoxyphenyl, butoxyphenyl, decyloxyphenyl, chlorophenyl, dichlorophenyl, bromophenyl, cyanophenyl, acetylphenyl, methoxycarbonylphenyl, ethoxycarbonylphenyl, butoxycarbonylphenyl, acetamidophenyl, propionamidophenyl, and dodecyloylamidophenyl).

When $X_0$ represents

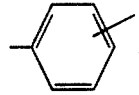

the benzene ring may have a substituent such as, for example, a halogen atom (e.g., chlorine and bromine), an alkyl group (e.g., methyl, ethyl, propyl, butyl, chloromethyl, methoxymethyl) and an alkoxy group (e.g., methoxy, ethoxy, propoxy, and butoxy).

In the general formula (III), $c_1$ and $c_2$, which may be the same or different, each preferably represents a hydrogen atom, a halogen atom (e.g., chlorine and bromide), a cyano group, an alkyl group having from 1 to 4 carbon atoms (e.g., methyl, ethyl, propyl, and butyl), —COO—$Z_3$, or —COO$Z_3$ bonded via a hydrocarbon group (wherein $Z_3$ represents preferably an alkyl group an alkenyl group, an aralkyl group, an alicyclic group or an aryl group, these groups may be substituted, and specific examples thereof are the same as those described above for P$_2$).

In the general formula (III), —COO—$Z_3$ may be bonded via a hydrocarbon group as above, and examples of such hydrocarbon groups include a methylene group, an ethylene group, and a propylene group.

In the general formula (III), $X_0$ is more preferably —COO—, —OCO—, —CH$_2$OCO—, —CH$_2$COO—, —O—, —CONHCOO—, —CONHCONH—, —CONH—, —SO$_2$NH—, or

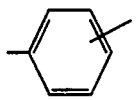

Also, $c_1$ and $c_2$, which may be the same or different, each represents more preferably a hydrogen atom, a methyl group, —COOZ$_5$, or —CH$_2$COOZ$_5$ (wherein Z$_5$ represents more preferably an alkyl group having from 1 to 6 carbon atoms (e.g., methyl, ethyl, propyl, butyl, and hexyl)). Most preferably, one of $c_1$ and $c_2$ represents a hydrogen atom.

Specific examples of the polymerizable double bond group represented by the general formula (III)

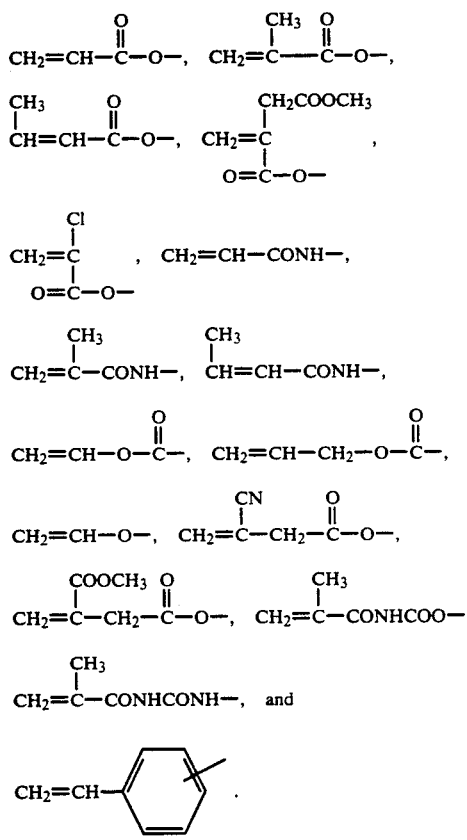

In the general formula (IVa), X$_1$ has the same meaning as X0 in the general formula (III) and d$_1$ and d$_2$, which may be the same or different, each has the same meaning as $c_1$ or $c_2$ in the general formula (III).

Q$_1$ represents an aliphatic group having from 1 to 18 carbon atoms or an aromatic group having from 6 to 12 carbon atoms.

Specific examples of the aliphatic group include an alkyl group having from 1 to 18 carbon atoms which may be substituted (e.g., methyl, ethyl, propyl, butyl, pentyl, hexyl, heptyl, octyl, decyl, dodecyl, tridecyl, hexadecyl, octadecyl, 2 chloroethyl, 2-bromoethyl, 2-hydroxyethyl, 2-methoxyethyl, 2-ethoxyethyl, 2-cyanoethyl, 3-chloropropyl, 2-(trimethoxysilyl)ethyl, 2-tetrahydrofuryl, 2-thienylethyl, 2-N,N-dimethylaminoethyl, and 2-N,N-diethylaminoethyl), a cycloalkyl group having from 5 to 8 carbon atoms (e.g., cyclopentyl, cyclohexyl, and cyclooctyl), an aralkyl group having from 7 to 12 carbon atoms which may be substituted (e.g., benzyl, phenethyl, 3-phenylpropyl, naphthylmethyl, 2-naphthylethyl, chlorobenzyl, bromobenzyl, dichlorobenzyl, methylbenzyl, chloromethylbenzyl, dimethylbenzyl, trimethylbenzyl, and methoxybenzyl). Also, specific examples of the aromatic group include an aryl group having from 6 to 12 carbon atoms which may be substituted (e.g., phenyl, tolyl, xylyl, chlorophenyl, bromophenyl, dichlorophenyl, chloromethylphenyl, methoxyphenyl, methoxycarbonylphenyl, naphthyl, and chloronaphthyl).

In the general formula (IVa), X$_1$ represents preferably —COO—, —OCO—, —CH$_2$COO—, —CH$_2$OCO—, —O—, —CO—, —CONHCOO—, —CONHCONH—, —CONH—, —SO$_2$NH—, or

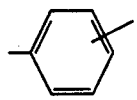

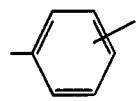

Also, preferred examples of d$_1$ and d$_2$ are same as those described above for $c_1$ and $c_2$ in the general formula (III).

In the general formula (IVb), Q$_0$ represents —CN, —CONH$_2$, or

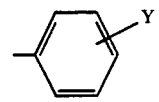

(wherein Y represents a hydrogen atom, a halogen atom (e.g., chlorine and bromine), a hydrocarbon group (e.g., methyl, ethyl, propyl, butyl, chloromethyl, and phenyl), an alkoxy group (e.g., methoxy, ethoxy, propoxy, and butoxy), or —COOZ$_4$ (wherein Z$_4$ preferably represents an alkyl group having from 1 to 8 carbon atoms, an aralkyl group having from 7 to 12 carbon atoms or an aryl group)).

The monofunctional macromonomer (MB) used in the present invention may have two or more polymer components represented by the general formula (IVa) and/or the polymer components represented by the general formula (IVb).

Furthermore, when X$_1$ in the general formula (IVa) is —COO—, it is preferred that the proportion of the polymerizable component represented by the general formula (IVa) is at least 30% by weight of the whole polymer components in the macromonomer (MB).

The macromonomer (MB) may further be formed of other copolymerizable component(s) in addition, to copolymerizable components corresponding to the polymer components represented by the general formula (IVa) and/or (IVb). Suitable examples of monomers corresponding to such copolymerizable components include acrylonitrile, methacrylonitrile, acrylamides, methacrylamides, styrene, styrene derivatives (e.g., vinyltoluene, chlorostyrene, dichlorostyrene, bromostyrene, hydroxymethylstyrene, and N,N-dimethylaminomethylstyrene), and heterocyclic vinyl compounds (e.g., vinylpyridine, vinylimidazole, vinylpyrrolidone, vinylthiophene, vinylpyrazole, vinyldioxane, and vinyloxazine).

The macromonomer (MB) which is used for the resin (B) in the present invention has a chemical structure that the polymerizable double bond group represented by the general formula (III) is bonded to only one terminal of the main chain of the polymer composed of the repeating unit represented by the general formula (IVa) and/or the repeating unit represented by the general (IVb) directly or by an appropriate linkage group.

The linkage group which connects the component represented by the general formula (III) with the component represented by the formula (IVa) or (IVb) is composed of an appropriate combination of the atomic groups such as a carbon-carbon bond (single bond or double bond), a carbon-hetero atom bond (examples of the hetero atom are oxygen, sulfur, nitrogen, and silicon), and a hetero atom-hetero atom bond.

Preferred macromonomers in the macromonomer (MB) for use in the present invention are represented by the following general formula (VIIa) or (VIIb):

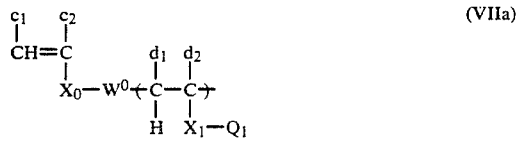

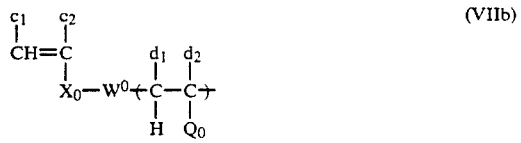

wherein $c_1$, $c_2$, $d_1$, $d_2$, $X_0$, $X_1$, $Q_1$, and $Q_0$ each has the same meaning as defined above for the general formulae (III), (IVa) and (IVb); $W^0$ represents a mere bond or a linkage group singly composed of the atomic group selected from

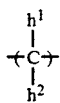

(wherein $h^1$ and $h^2$ each represents a hydrogen atom, a halogen atom (e.g., fluorine, chlorine, and bromine), a cyano group, a hydroxy group, or an alkyl group (e.g., methyl, ethyl, and propyl)),

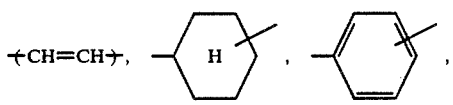

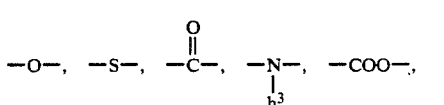

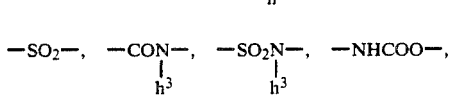
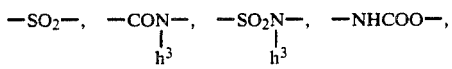

(wherein $h^3$ and $h^4$ each represents a hydrogen atom or the hydrocarbon group having the same meaning as $Q_1$ in the general formula (IVa) described above) or composed of an appropriate combination of these atomic groups.

If the weight average molecular weight of the macromonomer (MB) exceeds $2 \times 10^4$, the copolymerizability with the monomer represented by the general formula (V) is undesirably lowered. On the other hand, if the molecular weight thereof is too small, the effect for improving the electrophotographic characteristics of the photoconductive layer becomes smaller, and hence the molecular weight is preferably not less than $1 \times 10^3$.

The macromonomer (MB) which is used for the resin (B) in the present invention can be produced by a conventionally known method such as, for example, a method by an ion polymerization method, wherein a macromonomer is produced by reacting various reagents to the terminal of a living polymer obtained by an anion polymerization or a cation polymerization, a method by a radical polymerization, wherein a macromonomer is produced by reacting various reagents with an oligomer having a reactive group such as a carboxy group, a hydroxy group, or an amino group, at the terminal thereof obtained by a radical polymerization using a polymerization initiator and/or a chain transfer agent each having the reactive group in the molecule, and a method by a polyaddition condensation method of introducing a polymerizable double bond group into an oligomer obtained by a polycondensation reaction or a polyaddition reaction, in the same manner as the above described radical polymerization method.

Specific methods for producing the macromonomer (MB) are described, for example, in P. Dreyfuss & R. P. Quirk, *Encycl. Polym. Sci. Eng.*, 7, 551(1987), P. F. Rempp & E. Franta, *Adv. Polym. Sci.*, 58, 1(1984), V. Percec, *Appl. Polym. Sci.*, 285, 95(1984), R. Asami & M. Takaki, *Makromol. Chem. Suppl.*, 12, 163(1985), P. Rempp et al, *Makromol. Chem. Suppl.*, 8, 3(1984), Yusuke Kawakami, *Kagaku Kogyo (Chemical Industry)*, 38, 56(1987), Yuuya Yamashita, *Kobunshi (Macromolecule)*, 31, 988(1982), Shio Kobayashi, *Kobunshi (Macromolecule)*, 30, 625(1981), Toshinobu Higashimura, *Nippon Secchaku Kyokai Shi (Journal of Adhesive Society of Japan)*, 18, 536(1982), Koichi Ito, *Kobunshi Kako (Macromolecule Processing)*, 35, 262(1986), and Kishiro Higashi & Takashi Tsuda, *Kino Zairyo (Functional Materials)*, 1987, No. 10, 5, and the literatures and patents cited therein.

Now, specific examples of the macromonomer (MB) for use in the present invention are set forth below, but the present invention is not to be construed as being limited thereto In the following formulae, $c_1$ represents —H or —CH$_3$; $d_1$ represents —H or —CH$_3$; $d_2$ represents —H, —CH$_3$, or —CH$_2$COOCH$_3$; $R_{11}$ represents —C$_d$H$_{2d+1}$, —CH$_2$C$_6$H$_5$, —C$_6$H$_5$,

or $R_{12}$ represents $-C_dH_{2d+1}$, $-(CH_2)_eC_6H_5$, or

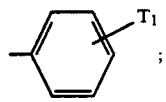

$R_{13}$ represents $-C_dH_{2d+1}$, $-CH_2C_6H_5$, or $-C_6H_5$; $R_{14}$ represents $-C_dH_{2d+1}$ or $-CH_2C_6H_5$; $R_{15}$ represents $-C_dH_{2d+1}$, $-CH_2C_6H_5$, or

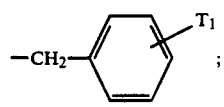

$R_{16}$ represents $-C_dH_{2d+1}$; $R_{17}$ represents $-C_dH_{2d+1}$, $-CH_2C_6H_5$, or

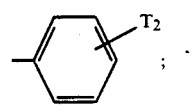

$R_{18}$ represents $-C_dH_{2d+1}$, $-CH_2C_6H_5$, or

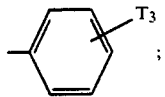

$V_1$ represents $-COOCH_3$, $-C_6H_5$, or $-CN$; $V_2$ represents $-OC_dH_{2d+1}$, $-OCOC_dH_{2d+1}$, $-COOCH_3$, $-C_6H_5$, or $-CN$; $V_3$ represents $-COOCH_3$, $-C_6H_5$,

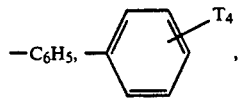

or $-CN$; $V_4$ represents $-OCOC_dH_2d+1$, $-CN$, $-CONH_2$, or $-C_6H_5$; $V_5$ represents $-CN$, $-CONH_2$, or $-C_6H_5$; $V_6$ represents $-COOCH_3$, $-C_6H_5$,

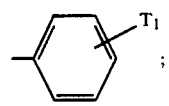

or $T_1$ represents $-CH_3$, $-Cl$, $-Br$, or $-OCH_3$; $T_2$ represents $-CH_3$, $-Cl$, or $-Br$; $T_3$ represents $-H$, $-Cl$, $-Br$, $CH_3$, $-CN$ or $-COOCH_3$; $T_4$ represents $-CH_3$, $-Cl$, or $-Br$; $T_5$ represents $-Cl$, $-Br$, $-F$, $-OH$, or $-CN$; $T_6$ represents $-H$, $-CH_3$, $-Cl$, $-Br$, $-OCH_3$, or $-COOCH_3$; d represents an integer of from 1 to 18; e represents an integer of from 1 to 3; f represents an integer of from 2 to 4; and the parenthesized group or the bracketed group shows a recurring unit.

(MB-1)
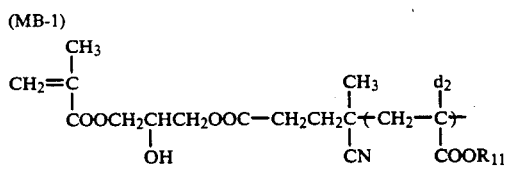

(MB-2)
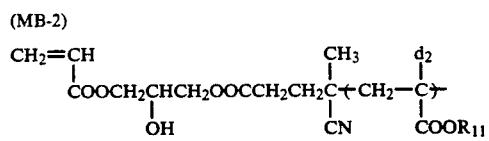

(MB-3)
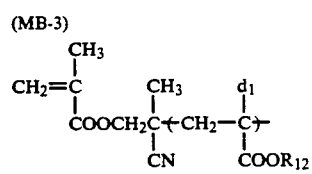

(MB-4)
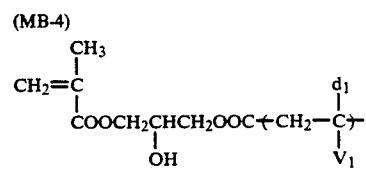

(MB-5)

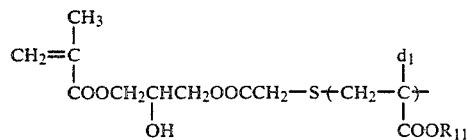
(MB-6)
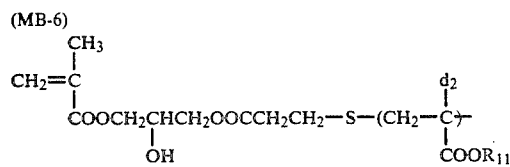
(MB-7)
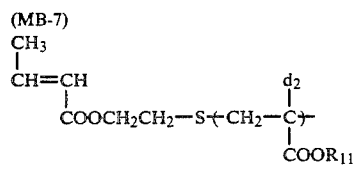
(MB-8)
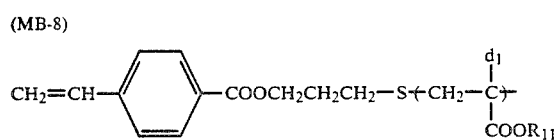
(MB-9)
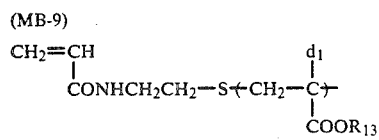
(MB-10)
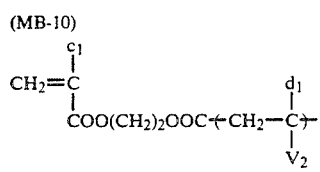
(MB-11)
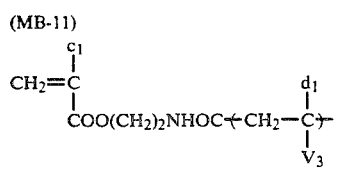
(MB-12)
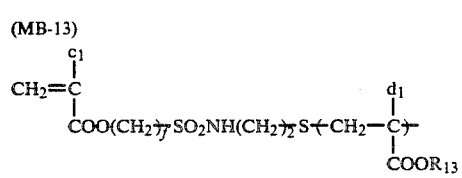
(MB-13)
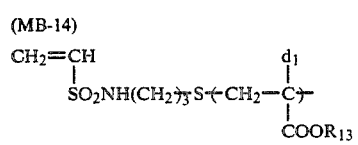
(MB-14)
(MB-15)

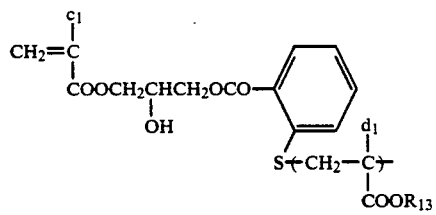
(MB-16)
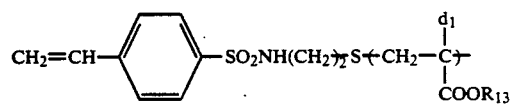
(MB-17)
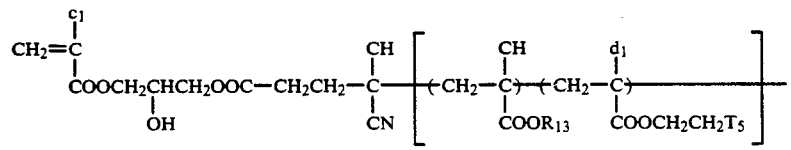
(MB-18)
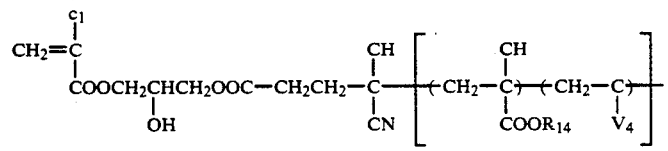
(MB-19)
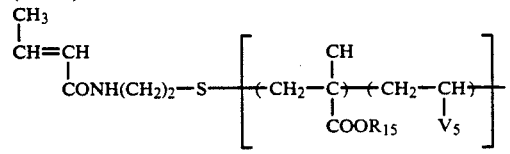
(MB-20)
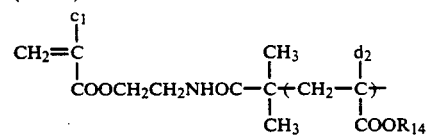
(MB-21)
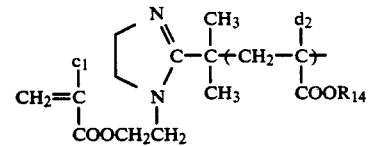
(MB-22)
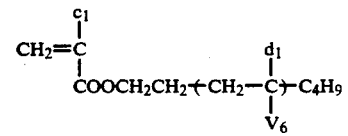
(MB-23)
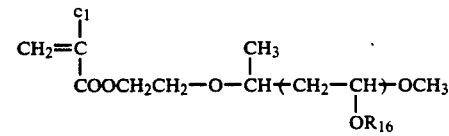
(MB-24)

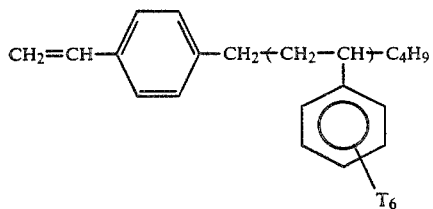

(MB-25)

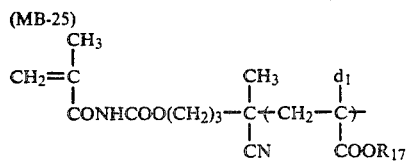

(MB-26)

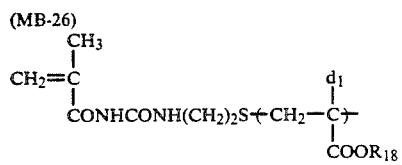

The monomer which is copolymerized with the above described macromonomer (MB) is represented by the above described general formula (V).

In the general formula (V), $e_1$ and $e_2$, which may be the same or different, each has the same meaning as $c_1$ or $c_2$ in the general formula (III) described above; $X_2$ has the same meaning as $X_1$ in the general formula (IVa); and $Q_2$ has the same meaning as $Q_1$ in the general formula (IVa).

Furthermore, the, resin (B) for use in the present invention may be formed of other monomer(s) as other copolymerizable component(s) together with the above described macromonomer (MB) and the monomer represented by the general formula (V).

Examples of such other monomers include vinyl compounds having an acidic group, α-olefins, acrylonitrile, methacrylonitrile, acrylamides, methacrylamides, styrenes, naphthalene compounds having a vinyl group (e.g., vinylnaphthalene and 1-isopropenylnaphthalene), and heterocyclic compounds having a vinyl group (e.g., vinylpyridine, vinylpyrrolidone, vinylthiophene, vinyltetrahydrofuran, vinyl-1,3-dioxolane, vinylimidazole, vinylthiazole, and vinyloxazoline).

In the resin (B), the ratio of copolymer component composed of the macromonomer (MB) as a recurring unit to the copolymer component composed of the monomer represented by the general formula (V) as a recurring unit is 1 to 80/99 to 20 by weight, and preferably 5 to 60/95 to 40 by weight.

The above described vinyl compounds having an acidic group are described, for example, in Kobunshi (Macromolecule) Data Handbook Kisohen (Foundation), edited by Kobunshi Gakkai, Baifukan (1986).

Specific examples of the vinyl compound include acrylic acid, α- and/or β-substituted acrylic acids (e.g., α-acetoxyacrylic acid, α-acetoxymethylacrylic acid, α-(2-amino)ethylacrylic acid, α-chloroacrylic acid, α-bromoacrylic acid, α-fluoroacrylic acid, α-tributylsilylacrylic acid, α-cyanoacrylic acid, β-chloroacrylic acid, β-bromoacrylic acid, α-chloro-β-methoxyacrylic acid, and α,β-dichloroacrylic acid), methacrylic acid, itaconic acid, itaconic acid half esters, itaconic acid half acids, crotonic acid, 2-alkenylcarboxylic acids (e.g., 2-pentenoic acid, 2-methyl-2-hexenoic acid, 2-octenoic acid, 4-methyl-2-hexenoic acid, and 4-ethyl-2-octenoic acid), maleic acid, maleic acid half esters, maleic acid half amides, vinylbenzenecarboxylic acid, vinylbenzenesulfonic acid, vinylsulfonic acid, vinylphosphonic acid, half ester derivatives of the vinyl group or allyl group of dicarboxylic acids, and the ester derivatives or amide derivatives of the above described carboxylic acid or sulfonic acid having an acidic group in the substituent thereof.

When the resin (B) contains the vinyl compound having an acidic group as the copolymer component corresponding to the recurring unit, it is preferred that the content of the copolymer component having the acidic group is not more than 10% by weight of the copolymer.

If the content of the acidic group-containing component exceeds 10% by weight, the interaction of the binder resin with inorganic photoconductive particles becomes remarkable to reduce the surface smoothness of the photoconductive layer, which results in deteriorating the electrophotographic characteristics (in particular, charging property and dark charge retention characteristics) of the photoconductive layer.

Furthermore, the resin (B') which can be used in a preferred embodiment of the present invention is a polymer formed from of at least one kind of the recurring unit represented by the general formula (V) and at least one kind of the recurring unit represented by the macromonomer (MB) and having at least one acidic group selected from —PO$_3$H$_2$, —SO$_3$H, —COOH, —OH, —SH,

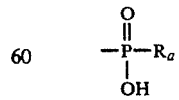

(wherein R$_a$ represents a hydrocarbon group or —OR$_a'$ (wherein R$_a'$ represents a hydrocarbon group)), and a cyclic acid anhydride-containing group, bonded to only one terminal of the main chain of the polymer.

Specific examples of R$_a$ or R$_a'$ are the same as those illustrated above as the specific examples of R.

In the resin (B'), the above described acidic group is bonded to one terminal of the polymer main chain directly or via an appropriate linkage group.

The linkage group is composed of an appropriate combination of the atomic groups such as a carbon-carbon bond (single bond and double bond), a carbon-hetero atom bond (examples of the hetero atom are oxygen, sulfur, nitrogen, and silicon), and a hetero atom-hetero atom bond.

Specific examples of the linkage group include a linkage group singly composed of an atomic group selected from

(wherein $h^5$ and $h^6$ each has the same meaning as $h^1$ or $h^2$ defined above),

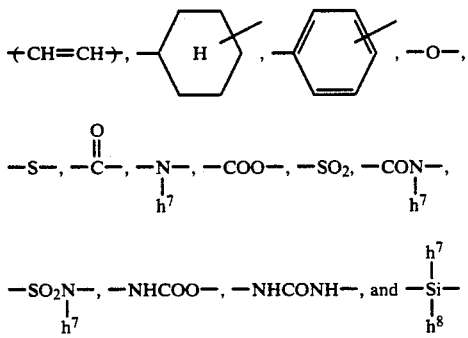

(wherein $h^7$ and $h^8$ each has the same meaning as $h^3$ or $h^4$ defined above) and a linkage group composed of an appropriate combination of these atomic groups.

In the resin (B'), the content of the acidic group bonded to one terminal of the polymer main chain is preferably from 0.1 to 15% by weight, and more preferably from 0.5 to 10% by weight of the resin (B'). If the content thereof is less than 0.1% by weight, the effect of improving the film strength is reduced. On the other hand, if the content thereof exceeds 15% by weight, photoconductive particles are not uniformly dispersed in the binder resin at the preparation of the dispersion thereof to cause aggregation, whereby the preparation of uniform coated layer becomes difficult.

The resin (B') having the specific acidic group at only one terminal of the polymer main chain can be easily produced by a synthesis method, for example, an ion polymerization method, wherein various reagents are reacted to one terminal of a living polymer obtained by a conventionally known anion polymerization or cation polymerization, a radical polymerization method, wherein the radical polymerization is carried out using a polymerization initiator and/or a chain transfer agent each having the specific acidic group in the molecule, or a method wherein a reactive group of a polymer bonded to the terminal thereof obtained by the above described ion polymerization or radical polymerization is converted into the specific acidic group by a macromolecular reaction.

Specific methods of producing the resin (B') are described, for example, in P. Dreyfuss & R. P. Quirk, *Encycl. Polym. Sci. Eng.*, 7, 551(1987), Yoshiki Nakajo & Yuya Yamashita, *Senryo to Yakuhin* (Dyes and Chemicals), 30, 232(1985), and Akira Ueda & Susumu Nagai, *Kagku to Kogyo* (Science and Industry). 60, 57(1986) and the literatures cited therein.

The ratio of the amount of the resin (A) (including the resin (A')) and the amount of the resin (B) (including the resin (B')) for use in the present invention varies depending upon the kind, particle size, and surface conditions of the inorganic photoconductive substance used, but the ratio of resin (A)/resin (B) is 5 to 80/95 to 20, and preferably 10 to 60/90 to 40 by weight.

Now, the resin (BX) which contains the specific acid group-containing component in the monofunctional macromonomer (MBX) will be described in detail below.

The weight average molecular weight of the resin (BX) is preferably from $5 \times 10^4$ to $1 \times 10^6$, and more preferably from $8 \times 10^4$ to $5 \times 10^5$. The content of the monofunctional macromonomer (MBX) in the resin (BX) is preferably from 1 to 70% by weight, and the content of the monomer represented by the general formula (V) therein is preferably from 30 to 99% by weight.

The glass transition point of the resin (BX) is preferably from 0° C. to 110° C., and more preferably from 20° C. to 90° C.

If the molecular weight of the resin (BX) is less than $5 \times 10^4$ a sufficient film strength may not be maintained. On the other hand, if the molecular weight thereof is larger than $1 \times 10^6$, the dispersibility of the photoconductive substance is reduced, the smoothness of the photoconductive layer is deteriorated, and image quality of duplicated images (particularly reproducibility of fine lines and letters) is degraded. Further, background stains are increased in case of using it as an offset master.

Further, if the content of the monofunctional macromonomer (MBX) is less than 1.0% by weight in the resin (BX), electrophotographic characteristics (particularly dark decay retention rate and photosensitivity) may be reduced and the fluctuations of electrophotographic characteristics of the photoconductive layer, particularly that containing a spectral sensitizing dye for the sensitization in the range of from near-infrared to infrared become larger under severe conditions. The reason therefor is considered to be that the construction of the polymer becomes similar to that of a conventional homopolymer or random copolymer resulting from the slight amount of macromonomer constituting the graft portion present therein On the other hand, the content of the macromonomer (MBX) is more than 70% by weight, the copolymerizability of the macromonomer with other monomers corresponding to other copolymerizable components may become insufficient, and the sufficient electrophotographic characteristics can not be obtained as the binder resin.

By incorporating the polymer component containing the specific acidic group into the macromonomer (MB), not only more improved electrophotographic characteristics (in particular, dark decay retention characteristics and photosensitivity), but also more improved film strength of the photoconductive layer of the electrophotographic light-sensitive material can be achieved Also, when it is used as an offset printing plate precursor, printing durability is more improved.

The monofunctional macromonomer (MBX) which is a copolymerizable component for forming the graft type copolymer resin (BX) for use in the present invention is described hereinafter in greater detail.

The monofunctional macromonomer (MBX) is a macromonomer having a weight average molecular weight of not more than $2 \times 10^4$, comprising at least one polymer component corresponding to a repeating unit represented by the general formula (IVa) or (IVb) described above and at least one polymer component having at least one specific acidic group (i.e., —COOH, —PO$_3$H$_2$, —SO$_3$H, —OH,

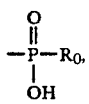

—CHO and/or a cyclic acid anhydride-containing group), and having a polymerizable double bond group bonded to only one terminal of the main chain thereof.

The monofunctional macromonomer (MBX) used in the present invention may have two or more polymer components represented by the general formula (IVa) and/or the polymer components represented by the general formula (IVb).

Furthermore, when $X_1$ in the general formula (IVa) is —COO—, it is preferred that the proportion of the polymer component represented by the general formula (IVa) is at least 30% by weight of the whole polymer components in the macromonomer (MBX).

As the polymerizable component having the acidic group (—COOH, —PO$_3$H$_2$, —SO$_3$H, —OH,

—CHO or a cyclic acid anhydride-containing group), which is copolymerized with the copolymerizable component corresponding to the polymer component represented by the general formula (IVa) or (IVb) in the macromonomer (MBX), any vinyl compounds having the above described acidic group capable of being copolymerized, with the copolymerizable component corresponding to the polymer components represented by the general formula (IVa) or (IVb) can be used.

Examples of these vinyl compounds are described, for example, in Kobunshi Data Handbook (Kisohen), edited by Kobunshi Gakkai, Baifukan (1986).

Specific examples thereof include acrylic acid, an α- and/or β-substituted acrylic acid (e.g., α-acetoxy compound, α-acetoxymethyl compound, α-aminomethyl compound, α-chloro compound, α-bromo compound, α-fluoro compound, α-tributylsilyl compound, α-cyano compound, β-chloro compound, β-bromo compound, α-chloro-β-methoxy compound, and α,β-dichloro compound), methacrylic acid, itaconic acid, itaconic acid half esters, itaconic acid half amides, crotonic acid, 2-alkenylcarboxylic acids (e.g., 2-pentenoic acid, 2-methyl-2-hexenoic acid, 2-octenoic acid, 4-methyl-2-hexenoic acid, and 4-ethyl-2-octenoic acid), maleic acid, maleic acid half esters, maleic acid half amides, vinylbenzenecarboxylic acid, vinylbenzenesulfonic acid, vinylsulfonic acid, vinylphosphonic acid, half ester derivatives of the vinyl group or allyl group of dicarboxylic acids, and compounds having the acidic group in the substituent of ester derivatives or amido derivatives of these carboxylic acids or sulfonic acids.

In

$R_0$ represents a hydrocarbon group or —OR$_0'$ and R$_0'$ represents a hydrocarbon group. Examples of these hydrocarbon groups are same as those described for R above.

With respect to the cyclic acid anhydride containing group, those described for the resin (A) above are also applied.

The —OH group include, in addition to the phenolic hydroxy group described for the resin (A) above, a hydroxyl group of alcohols containing a vinyl or allyl group (e.g., allyl alcohol), a hydroxyl group of (meth)acrylates containing —OH group in an ester substituent thereof, and a hydroxyl group of (meth)acrylamides containing —OH group in an N-substituent thereof.

Specific examples of the polymerizable component having the acidic group described above are set forth below, but the present invention should not be construed as being limited thereto. In the following formulae, $Q_1$ represents —H, —CH$_3$, —Cl, —Br, —CN, —CH$_2$COOCH$_3$, or —CH$_2$COOH; $Q_2$ represents —H or —CH$_3$; j represents an integer of from 2 to 18; k represents an integer of from 2 to 5; h represents an integer of from 1 to 4; and g represents an integer of from 1 to 12.

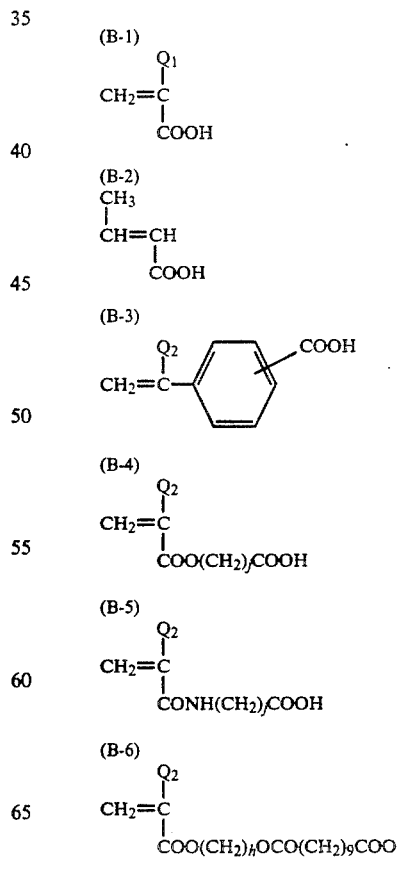

-continued
(B-7)
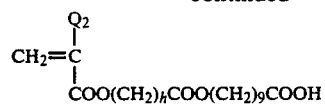
(B-8)
(B-9)
(B-10)
(B-11)
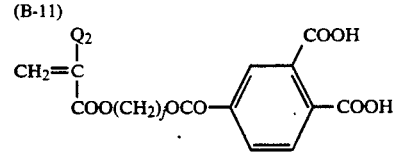
(B-12)
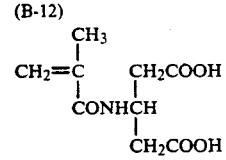
(B-13)
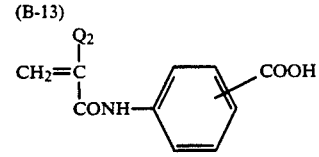
(B-14)
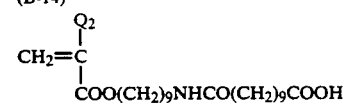
(B-15)
$CH_2=CH-CH_2OCO(CH_2)_9COOH$
(B-16)
$CH_2=CH(CH_2)_n COOH$
(B-17)
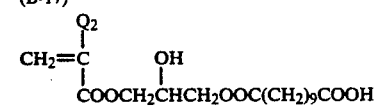
(B-18)
(B-19)
-continued
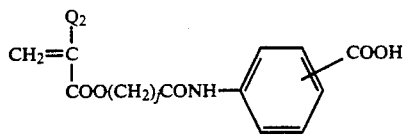
(B-20)
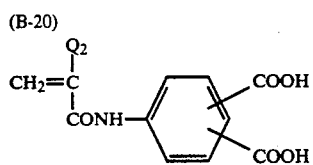
(B-21)
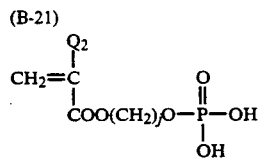
(B-22)
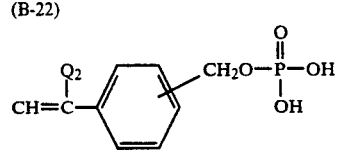
(B-23)
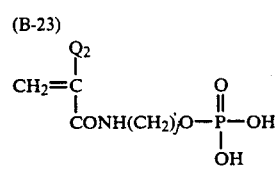
(B-24)
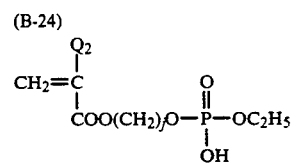
(B-25)
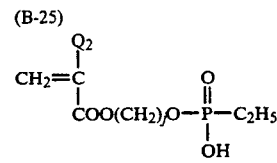
(B-26)
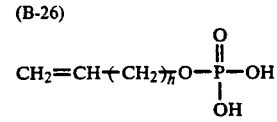
(B-27)
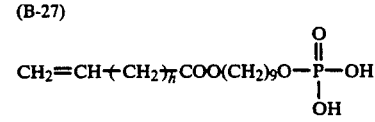
(B-28)
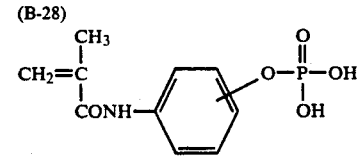
(B-29)

-continued
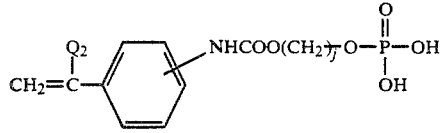
(B-30)
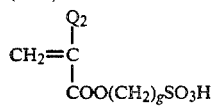
(B-31)
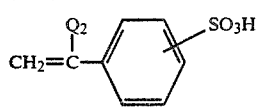
(B-32)
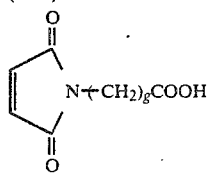
(B-33)
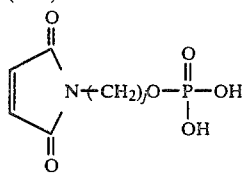
(B-34)
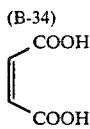
(B-35)
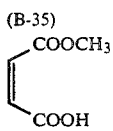
(B-36)
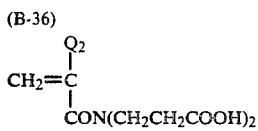
(B-37)
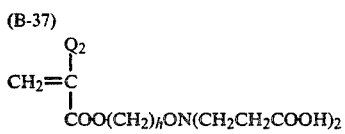
(B-38)
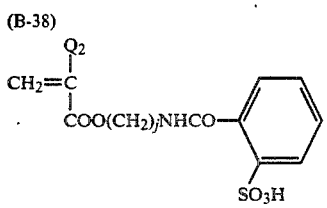
(B-39)
-continued
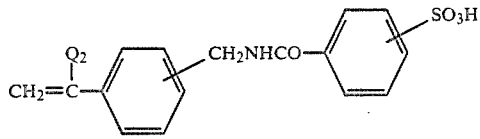
(B-40)
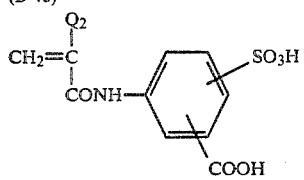
(B-41)
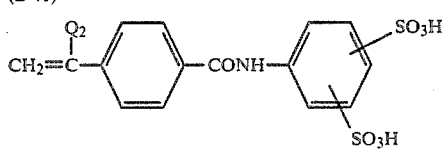
(B-42)
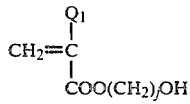
(B-43)
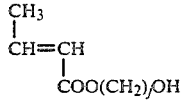
(B-44)
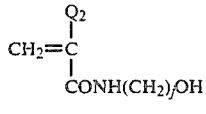
(B-45)
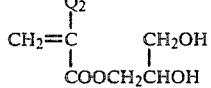
(B-46)
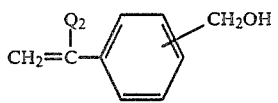
(B-47)
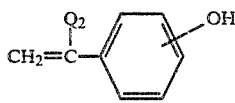
(B-48)
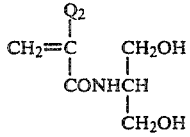
(B-49)
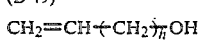
(B-50)

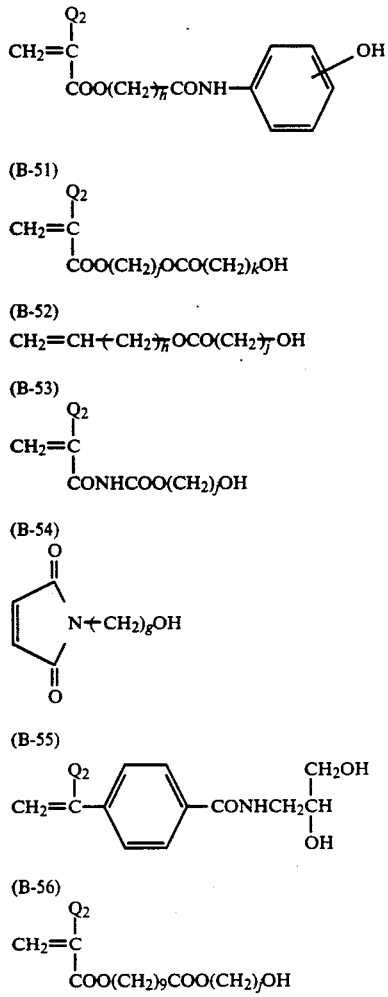

(B-51)

(B-52)

(B-53)

(B-54)

(B-55)

(B-56)

The content of the above described polymerizable component having the acidic group used in forming the macromonomer (MBX) is preferably from 0.5 to 50 parts by weight, and more preferably from 1 to 40 parts by weight per 100 parts by weight of the total polymer components.

When the monofunctional macromonomer composed of a random copolymer having the acidic group exists in the resin (BX) as a copolymer component, the total content of the acidic group-containing component contained in the total graft portions in the resin (BX) is preferably from 0.1 to 10 parts by weight per 100 parts by weight of the total polymer components in the resin (BX). When the resin (BX) has the acidic group selected from —COOH, —SO$_3$H, and —PO$_3$H$_2$, the total content of the acidic group in the graft portions of the resin (BX) is more preferably from 0.1 to 5 parts by weight.

The macromonomer (MBX) may further be formed of other polymerizable component(s) in addition to the above described polymerizable components.

As such a polymerizable component, a monomer corresponding to other polymerizable recurring unit, for example, acrylonitrile, methacrylonitrile, acrylamides, methacrylamides, styrene, styrene derivatives (e.g., vinyltoluene, chlorostyrene, dichlorostyrene, bromostyrene, hydroxymethylstyrene, and N,N-dimethylaminomethylstyrene), and heterocyclic vinyl compounds (e.g., vinylpyridine, vinylimidazole, vinylpyrrolidone, vinylthiophene, vinylpyrazole, vinyldioxane and vinyloxazine) may be employed.

When the macromonomer (MBX) is formed of other monomers described above, the content of the monomer is preferably from 1 to 20 parts by weight per 100 parts by weight of the total polymerizable components used in forming the macromonomer.

The macromonomer (MBX) for use in the resin (BX) according to the present invention has a chemical structure that the polymerizable double bond group represented by the general formula (III) is bonded directly or through an appropriate linkage group to only one terminal of the main chain of the random polymer composed of at least the repeating unit represented by the general formula (IVa) and/or the repeating unit represented by the general formula (IVb) and the repeating unit having the specific acidic group.

The linkage group bonding the component represented by the general formula (III) to the component represented by the general formula (IVa) or (IVb) or the acidic group-containing component is composed of an appropriate combination of the atomic groups such as a carbon-carbon bond (single bond or double bond), carbon-hetero atom bond (examples of the hetero atom include oxygen, sulfur, nitrogen, and silicon), and a hetero atom-hetero atom bond.

Specific examples of the linkage group include a single linkage group selected from

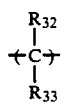

(wherein R$_{32}$ and R$_{33}$ each represents a hydrogen atom, a halogen atom (e.g., fluorine, chlorine, and bromine), a cyano group, a hydroxy group, or an alkyl group (e.g., methyl, ethyl, and propyl),

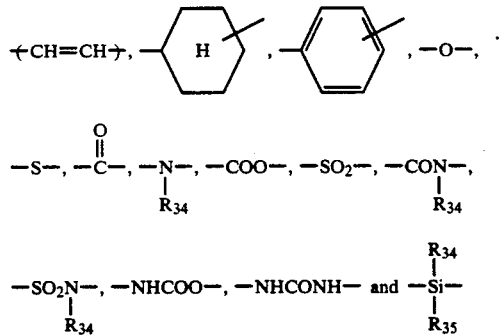

(wherein R$_{34}$ and R$_{35}$ each represents a hydrogen atom or the hydrocarbon group having the same meaning as described above for Q$_1$ in the general formula (IVa)) and a linkage group composed of two or more of these linkage groups.

If the weight average molecular weight of the macromonomer (MBX) exceeds $2 \times 10^4$, the copolymerizability with the monomer represented by the general formula (V) is undesirably reduced. On the other hand, if the weight average molecular weight of the macromonomer is too small, the effect of improving the electrophotographic characteristics of the photoconductive layer becomes smaller. Thus, the weight average molecular weight is preferably not less than $1 \times 10^3$.

The macromonomer (MBX) for use in the present invention can be produced by known synthesis methods.

Specifically, the macromonomer can be synthesized by a radical polymerization method of forming the macromonomer by reacting an oligomer having a reactive group bonded to the terminal thereof and various reagents. The oligomer used above can be obtained by a radical polymerization using a polymerization initiator and/or a chain transfer agent each having a reactive group such as a carboxy group, a carboxy halide group, a hydroxy group, an amino group, a halogen atom, or an epoxy group in the molecule thereof.

Specific methods for producing the macromonomer (MBX) are described, for example, in P. Dreyfuss & R. P. Quirk, *Encycl. Polym. Sci. Eng.*, 7, 551 (1987), P. F. Rempp & E. Franta, *Adv. Polym Sci.*, 58, 1 (1984), Yusuke Kawakami, *Kagaku Kogyo (Chemical Industry)*, 38, 56 (1987), Yuya Yamashita, *Kobunshi (Macromolecule)*, 31, 988 (1982), Shiro Kobayashi, *Kobunshi (Macromolecule)*, 30, 625 (1981), Koichi Ito, *Kobunshi Kako (Macromolecule Processing)*, 35, 262 (1986), Kishiro Higashi & Takashi Tsuda, *Kino Zairyo (Functional Materials)*, 1987, No. 10, 5, and the literatures and patents cited in these references.

However, since the macromonomer (MBX) in the present invention has the above described acidic group as the component of the repeating unit, the following matters should be considered in the synthesis thereof.

In one method, the radical polymerization and the introduction of a terminal reactive group are carried out by the above described method using a monomer having the acidic group as the form of a protected functional group as described, for example, in the following Reaction Scheme (2).

(e.g., hydrolysis reaction, hydrogenolysis reaction, and oxidation-decomposition reaction) for the acidic group ($-SO_3H$, $-PO_3H_2$, $-COOH$,

$-OH$, $-CHO$, and a cyclic acid anhydride-containing group) which is randomly contained in the macromonomer (MBX) for use in the present invention can be carried out by any of conventional methods.

The methods which can be used are specifically described, for example, in J. F. W. McOmie, *Protective Groups in Organic Chemistry*, Plenum Press (1973), T. W. Greene, *Protective Groups in Organic Synthesis*, John Wiley & Sons (1981), Ryohei Oda, *Kobunshi (Macromolecular) Fine Chemical*, Kodansha (1976), Yoshio Iwakura and Keisuke Kurita, *Hannosei Kobunshi (Reactive Macromolecules)*, Kodansha (1977), G. Berner et al, *J. Radiation Curing*, No. 10, 10(1986), JP-A-62-212669, JP-A-62-286064, JP-A-62-210475, JP-A-62-195684, JP-A-62-258476, JP-A-63-260439, JP-A-1-63977 and JP-A-1-70767.

Another method for producing the macromonomer (MBX) comprises synthesizing the oligomer in the same manner as described above and then reacting the oligomer with a reagent having a polymerizable double bond group which reacts with only "specific reactive group" bonded to one terminal thereof by utilizing the difference between the reactivity of the "specific reactive group" and the reactivity of the acidic group contained in the oligomer as shown in the following reaction scheme (3).

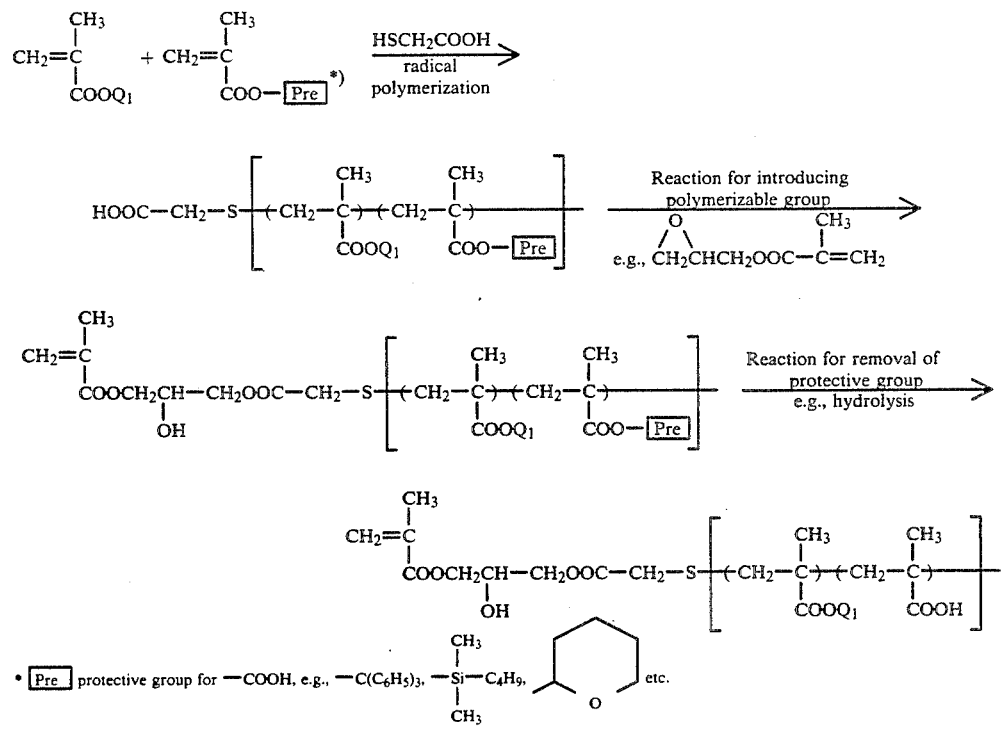

The reaction for introducing the protective group and the reaction for removal of the protective group

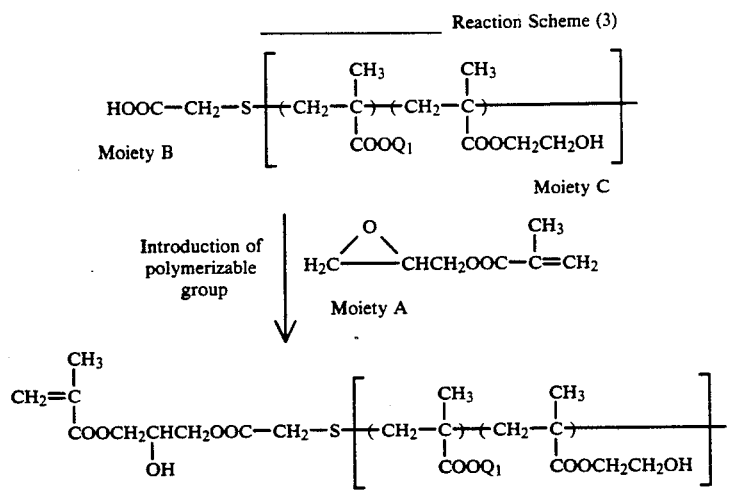

Reaction Scheme (3)

Specific examples of a combination of the specific functional groups (moieties A, B, and C) described, in the reaction scheme (3) are set forth in Table A below but the present invention should not be construed as being limited thereto. It is important to utilize the selectivity of reaction in an ordinary organic chemical reaction and the macromonomer can be formed without protecting the acidic group in the oligomer. In Table A, Moiety A is a functional group in the reagent for introducing a polymerizable group, Moiety B is a specific functional group at the terminal of the oligomer, and Moiety C is an acidic group in the repeating unit of the oligomer.

thiomalic acid, thiosalicylic acid, 2-mercaptopropionic acid, 3-mercaptopropionic acid, 3-mercaptobutyric acid, N-(2-mercaptopropionyl)glycine, 2-mercaptonicotinic acid, 3-[N-(2-mercaptoethyl)carbamoyl]propionic acid, 3-[N-(2-mercaptoethyl)amino]propionic acid, N-(3-mercaptopropionyl)alanine, 2-mercaptoethanesulfonic acid, 3-mercaptopropanesulfonic acid, 4-mercaptobutanesulfonic acid, 2-mercaptoethanol, 3-mercapto-1,2-propanediol, 1-mercapto-2-propanol, 3-mercapto-2-butanol, mercaptophenol, 2-mercaptoethylamine, 2-mercaptoimidazole, and 2-mercapto-3-pyridinol), disulfide compounds which are the oxidation products of these mercapto compounds, and iodi-

TABLE A

| Moiety A | Moiety B | Moiety C |
|---|---|---|
| epoxide (−CH−CH$_2$ with O), thiirane (−CH−CH$_2$ with S), aziridine (−N(CH$_2$CH$_2$)) | −COOH, −NH$_2$ | −OH |
| | −Halogen (Br, I, Cl) | |
| −COCl, −SO$_2$Cl, Acid Anhydride | −OH, −NH$_2$ | −COOH, −SO$_3$H, −PO$_3$H$_2$, $-\overset{O}{\underset{OH}{\overset{\|}{P}}}-R_0$ |
| −COOH, −NHR$_{36}$ (wherein R$_{36}$ is a hydrogen atom or an alkyl group) | −Halogen | −COOH, −SO$_3$H, −PO$_3$H$_2$, −OH, $-\overset{O}{\underset{OH}{\overset{\|}{P}}}-R_0$ |
| −COOH, −NHR$_{36}$ | epoxide (−CH−CH$_2$ with O), thiirane (−CH−CH$_2$ with S), aziridine (−N(CH$_2$CH$_2$)) | −OH |
| −OH, −NHR$_{36}$ | −COCl, −SO$_2$Cl | −COOH, −SO$_3$H, −PO$_3$H$_2$ |

The chain transfer agent which can be used for producing the oligomer includes, for example, mercapto compounds having a substituent capable of being induced into the acidic group later (e.g., thioglycolic acid, nated alkyl compounds having the above described acidic group or substituent (e.g., iodoacetic acid, iodopropionic acid, 2-iodoethanol, 2-iodoethanesulfonic acid, and 3-iodopropanesulfonic acid). In these compounds, the mercapto compounds are preferred.

Also, as the polymerization initiator having a specific reactive group, which can be used for the production of the oligomer, there are, for example, 2,2'-azobis(2-cyanopropanol), 2,2'-azobis(2-cyanopentanol), 4,4'-azobis(4-cyanovaleric acid), 4,4'-azobis(4-cyanovaleric acid chloride), 2,2'-azobis[2-(5-methyl-2-imidazolin-2-yl)propane], 2,2'-azobis[2-(2-imidazolin-2-yl)propane], 2,2'-azobis[2-(3,4,5,6-tetrahydropyrimidin-2-yl)propane], 2,2'-azobis{2-[1 (2-hydroxyethyl)-2-imidazolin-2-yl]propane}, 2,2'-azobis[2-methyl-N-(2-hydroxyethyl)-propionamide] and the derivatives thereof.

The chain transfer agent or the polymerization initiator is used in an amount of from 0.1 to 15 parts by weight, and preferably from 0.5 to 10 parts by weight per 100 parts by weight of the total monomers.

Specific examples of the macromonomer (MBX) for use in the present invention are set forth below, but the present invention should not be construed as being limited thereto.

In the following formulae, $Q_2$ represents —H or —CH$_3$; $Q_3$ represents —H, —CH$_3$, or —CH$_2$COOCH$_3$; $R_{41}$ represents —C$_n$H$_{2n+1}$ (wherein n represents an integer of from 1 to 18),

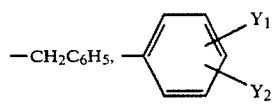

(wherein $Y_1$ and $Y_2$ each represents —H, —Cl, —Br, —CH$_3$, —COCH$_3$, or —COOCH$_3$),

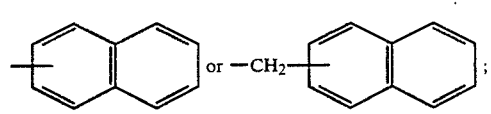

$W_1$ represents —CN, —OCOCH$_3$, —CONH$_2$, or —C$_6$H$_5$; $W_2$ represents —Cl, —Br, —CN, or —OCH$_3$; $\alpha$ represents an integer of from 2 to 18; $\beta$ represents an integer of from 2 to 12; and $\gamma$ represents an integer of from 2 to 4.

(MBX-1)

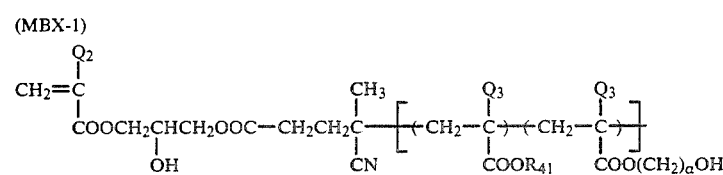

(MBX-2)

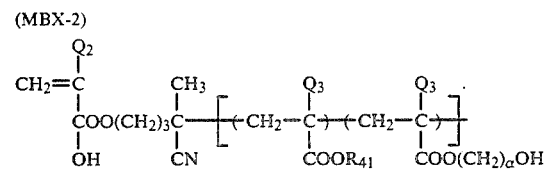

(MBX-3)

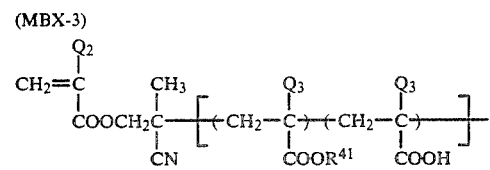

(MBX-4)

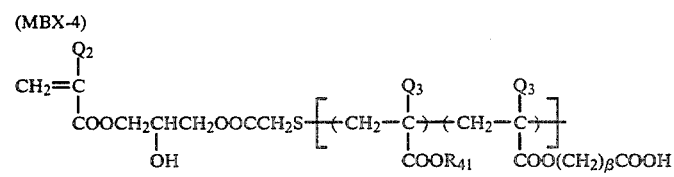

(MBX-5)

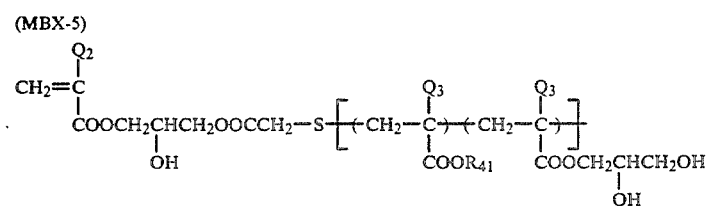

(MBX-6)

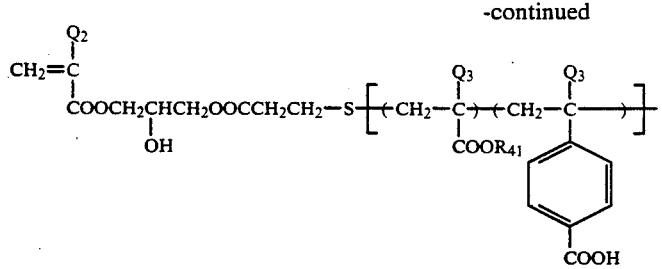
(MBX-7)
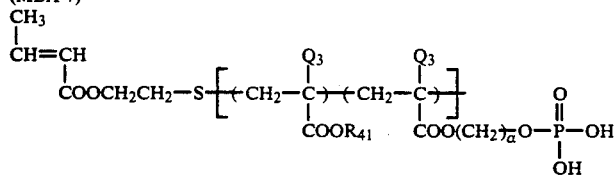
(MBX-8)
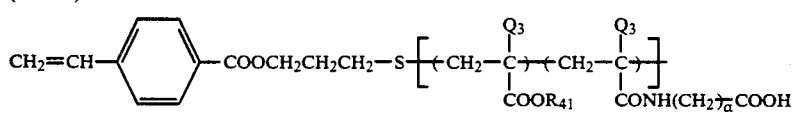
(MBX-9)
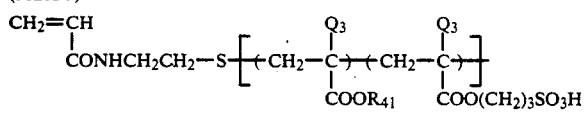
(MBX-10)
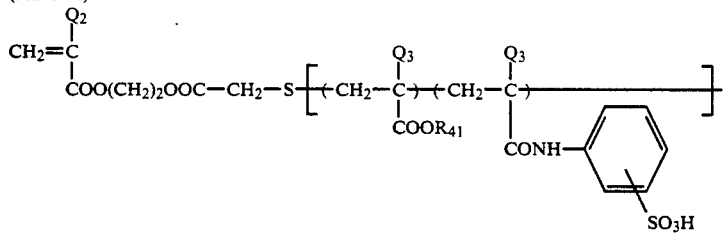
(MBX-11)
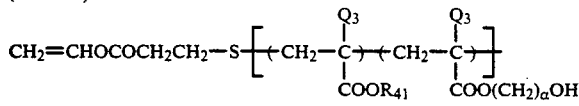
(MBX-12)
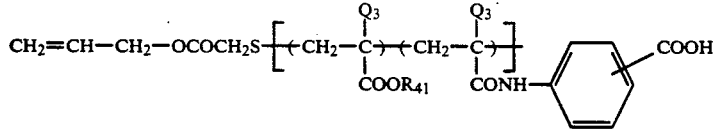
(MBX-13)
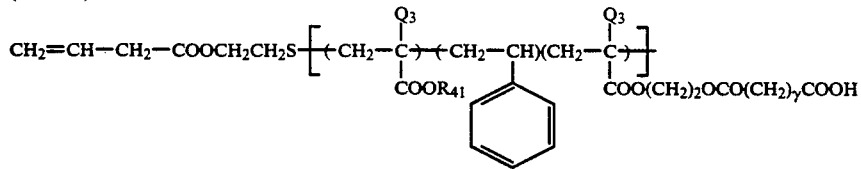
(MBX-14)
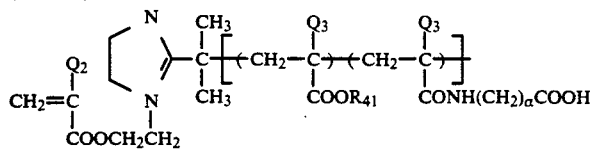

-continued
(MBX-15)
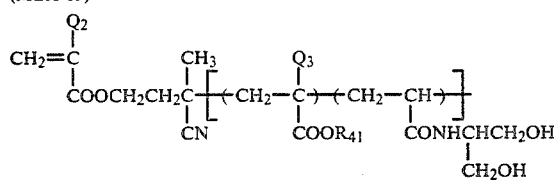
(MBX-16)
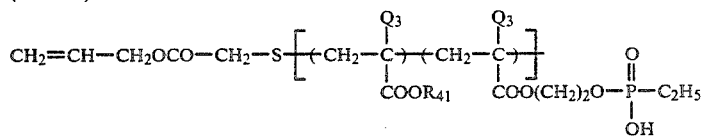
(MBX-17)
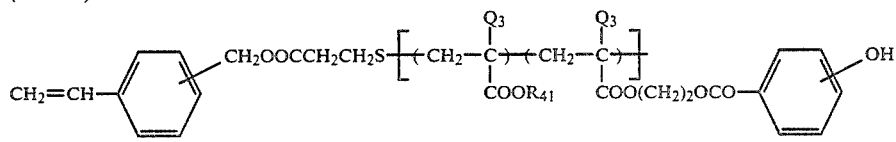
(MBX-18)
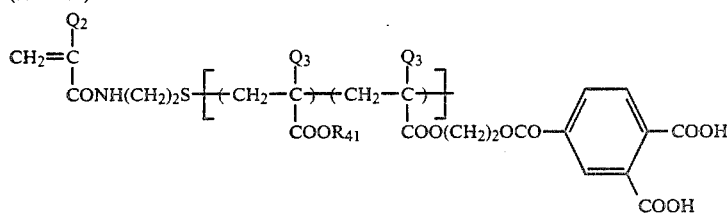
(MBX-19)
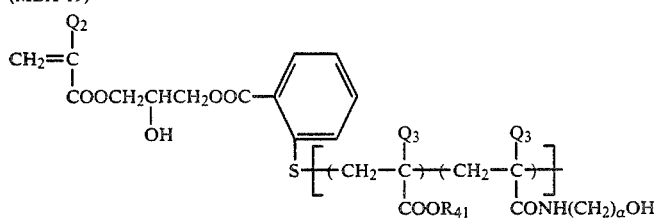
(MBX-20)
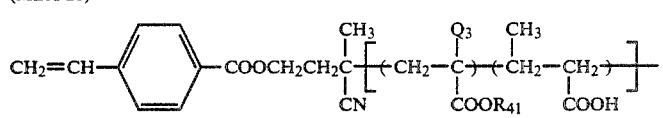
(MBX-21)
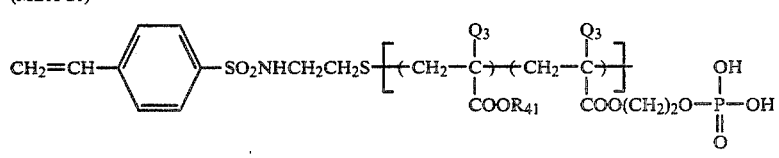
(MBX-22)
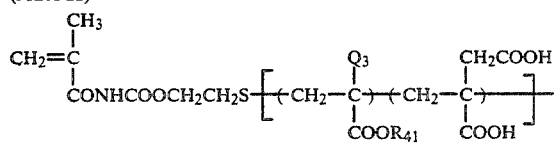
(MBX-23)

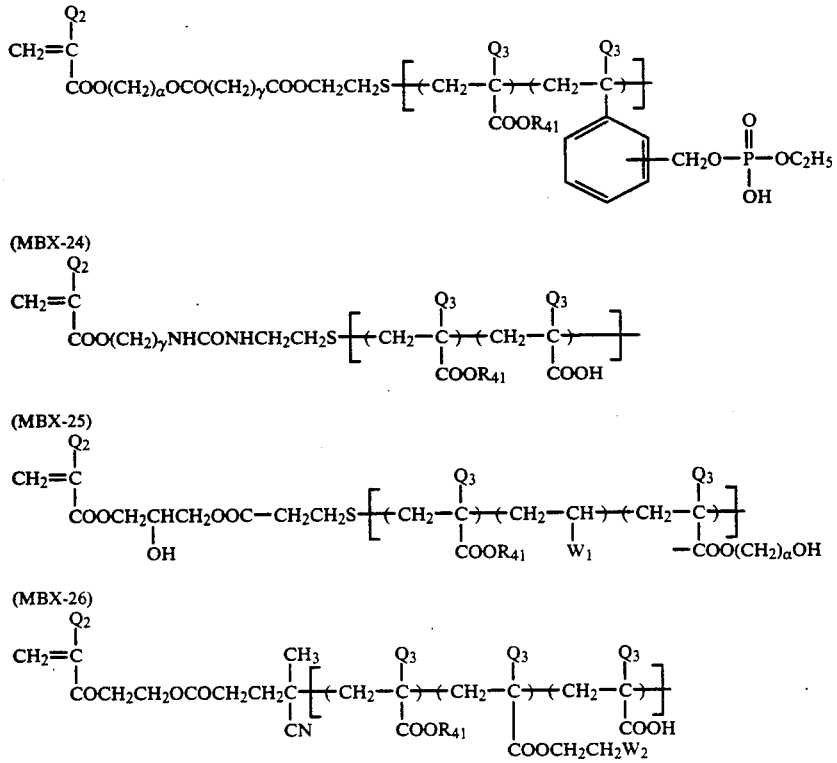

(MBX-24)

(MBX-25)

(MBX-26)

The monomer which is copolymerized with the above described macromonomer (MBX) is represented by the general formula (V) described above.

In the general formula (V), $e_1$ and $e_2$, which may be the same or different, each has the same meaning as $c_1$ or $c_2$ in the general formula (III); and $X_2$ and $Q_2$ have the same meanings as $X_1$ and $Q_1$ in the general formula (IVa), respectively, as described hereinbefore.

In the resin (BX) for use in the present invention, the ratio of the copolymerizable component composed of the macromonomer (MBX) as the repeating unit and the copolymerizable component composed of the monomer represented by the general formula (V) as the repeating unit is preferably from 1 to 70/99 to 30 by weight, and more preferably from 5 to 60/95 to 40 by weight.

Furthermore, the resin (BX) for use in the present invention may contain other monomers as additional copolymerizable components together with the macromonomer (MBX), the monomer represented by the general formula (V), and an optional monomer having the heat- and/or photo-curable functional group described hereinafter.

Examples of such an additional monomer include α-olefins, alkanoic acid vinyl or allyl esters, acrylonitrile, methacrylonitrile, vinyl ethers, acrylamides, methacrylamides, styrenes, and heterocyclic vinyl compounds (e.g., vinylpyrrolidone, vinylpyridine, vinylimidazole, vinylthiophene, vinylimidazolihe, vinylpyrazole, vinyldioxane, vinylquinoline, vinylthiazole, and vinyloxazine).

In this case, the content of the additional monomer should not exceed 20% by weight of the copolymer.

Furthermore, the resin (BX) may be a copolymer (resin (BX')) having at least one acidic group selected from those described above only at one terminal of the main chain of the polymer containing at least one repeating unit corresponding to the monomer represented by the general formula (V) and at least one repeating unit corresponding to the macromonomer (MBX). The resin (BX) may be employed together with the resin (BX'), if desired. The acidic group is bonded to one terminal of the polymer main chain directly or via an appropriate linkage group.

The linkage group is composed of an appropriate combination of an atomic group such as a carbon-carbon bond (single bond or double bond), a carbon-hetero atom bond (examples of the hetero atom include oxygen, sulfur, nitrogen, and silicon), and a hetero atom-hetero atom bond.

Specific examples thereof are linkage groups composed of a single atomic group selected from

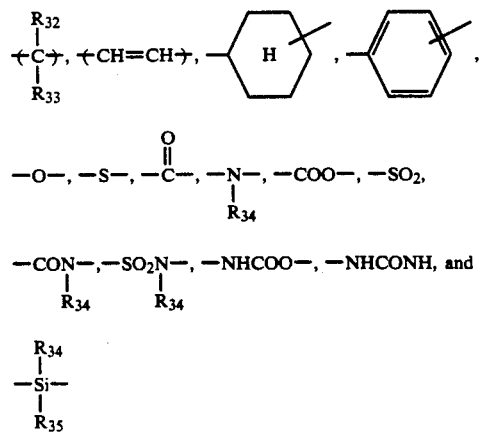

wherein $R_{32}$, $R_{33}$, $R_{34}$, and $R_{35}$ each has the same meaning as defined above) and a linkage group composed of a combination of two or more atomic groups described above.

In the resin (BX'), the content of the acidic group bonded to one terminal of the polymer main chain is preferably from 0.1 to 10% by weight, and more preferably from 0.2 to 5% by weight of the resin (BX').

The resin (BX') having the acidic group at the terminal of the polymer main chain thereof can be obtained by using a polymerization initiator or chain transfer agent having the acidic group or a specific reactive group which can be induced into the acidic group in the molecule at the polymerization reaction of at least the macromonomer (MBX) and the monomer represented by the general formula (V).

Specifically, the resin (BX') can be synthesized in the same manner as the case of producing the oligomer having a reactive group bonded at one terminal thereof as described above in the synthesis of the macromonomer (MBX).

The electrophotographic light-sensitive material according to the present invention may be required to have much greater mechanical strength while maintaining the excellent electrophotographic characteristics. For such a purpose, a method of introducing a heat- and/or photo-curable functional group into the main chain of the graft type copolymer can be utilized.

More specifically, in the present invention the resin (A) and/or the resin (B) and/or the resin (BX) may further contain at least one monomer containing a heat- and/or photo-curable functional group as a copolymerizable component. The heat- and/or photocurable functional group appropriately forms a crosslinkage between the polymers to increase the interaction between the polymers and resulting in improvement of the mechanical strength of layer. Therefore, the resin further containing the heat- and/or photo-curable functional group according to the present invention increase the interaction between the binder resins without damaging the suitable adsorption and coating of the binder resins onto the inorganic photoconductive substance such as zinc oxide particles, and as a result, the film strength of the photoconductive layer is further improved.

The term "heat- and/or photo curable functional group" used in the present invention means a functional group capable of inducing curing of the resin by the action of at least one of heat and light.

Suitable examples of the heat-curable functional group (i.e., functional group capable of performing a heat-curing reaction) include functional groups as described, for example, in Tsuyoshi Endo, *Netsukakosei Kobunshi no Seimitsuka*, C. M. C. (1986), Yuji Harasaki, *Saishin Binder Gijutsu Binran*, Ch. II-I, Sogo Gijutsu Center (1985), Takayuki Ohtsu, *Acryl Jushi no Gosei Sekkei to Shin-Yotokaihatsu*, Chubu Keiei Kaihatsu Center Shuppanbu (1985), and Eizo Ohmori, *Kinosei Acryl Jushi*, Techno System (1985).

Specific examples of the heat-curable functional groups which can be used include —OH, —SH, —NH$_2$, —NHR$_{21}$ (wherein R$_{21}$ represents a hydrocarbon group which has the same meaning as that defined for P$_2$ in the general formula (III) above,

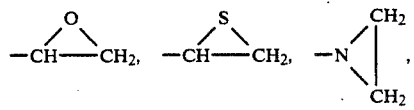

(wherein R$_{22}$ represents a hydrogen atom or alkyl group having from 1 to 8 carbon atoms (e.g., methyl, ethyl, propyl, butyl, hexyl, and octyl), —N=C=O, and

(wherein r$_1$ and r$_2$ each represents a hydrogen atom, a halogen atom (e.g., chlorine, and bromine) or an alkyl group having from 1 to 4 carbon atoms (e.g., methyl, and ethyl)). Also, specific examples of the polymerizable double bond group include

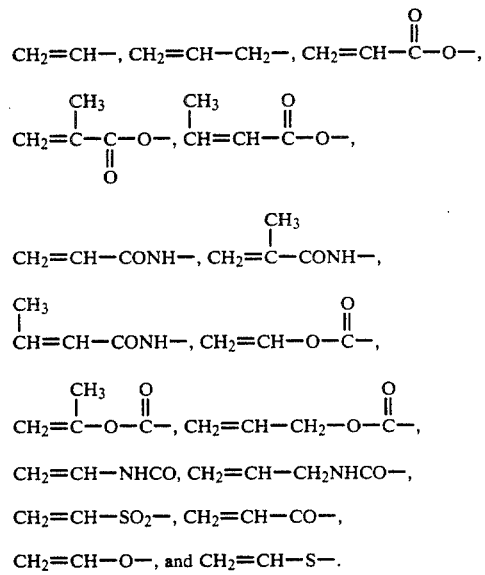

Suitable examples of the photo-curable functional group include functional groups as described, for example, in Takahiro Tsunoda, *Kankosei Jushi*, Insatsu Gakkai Shuppanbu (1972), Gentaro Nagamatsu & Hideo Inui, *Kankosei Kobunshi*, Kodansha (1977), and G. A. Delgenne, *Encyclopedia of Polymer Science and Technology Supplement*, Vol. I (1976).

Specific examples of the photo-curable functional group include an addition polymerizing group such as an allyl ester group or a vinyl ester group, and a dimerizing group such as a cinnamoyl group or a maleimide ring group which may be substituted.

In order to synthesize the resin containing the heat- and/or photo-curable functional group according to the present invention, a monomer containing the heat- and/or photo-curable functional group is employed as a copolymerizable component.

Where the resin according to the present invention contains the heat-curable functional group described above, a reaction accelerator may be used, if desired, in order to accelerate a crosslinking reaction in the light-sensitive layer. Examples of reaction accelerators which can be employed in the reaction system for forming a chemical bond between functional groups include an organic acid (e.g., acetic acid, propionic acid, butyric acid, benzenesulfonic acid, and p-toluenesulfonic acid), and a crosslinking agent.

Specific examples of crosslinking agents are described, for example, in Shinzo Yamashita and Tosuke Kaneko (ed.), *Kakyozai Handbook*, Taiseisha (1981), including commonly employed crosslinking agents, such as organosilanes, polyurethanes, and polyisocyanates, and curing agents, such as epoxy resins and melamine resins.

Where the crosslinking reaction is a polymerization reaction system, polymerization initiators (e.g., peroxides and azobis series polymerization initiators, and preferably azobis series polymerization initiators) and monomers having a polyfunctional polymerizable group (e.g., vinyl methacrylate, allyl methacrylate, ethylene glycol diacrylate, polyethylene glycol diacrylate, divinylsuccinic acid esters, divinyladipic acid esters, diallylsuccinic acid esters, 2-methylvinyl methacrylate, and divinylbenzene) can be used as the reaction accelerator.

When the binder resin containing a heat curable functional group is employed in the present invention, the photoconductive substance-binder resin dispersed system is subjected to heat-curing treatment. The heat-curing treatment can be carried out by drying the photoconductive coating under conditions more severe than those generally employed for the preparation of conventional photoconductive layer. For example, the heat-curing can be achieved by treating the coating at a temperature of from 60° to 120° C. for 5 to 120 minutes. In this case, the treatment can be performed under milder conditions using the above described reaction accelerator.

The ratio of the amount of the resin (A) (including the resin (A')) to the amount of the resin (BX) (including the resin (BX')) for use in the present invention varies depending on the kind, particle size, and surface conditions of the inorganic photoconductive substance used. In general, however, the weight ratio of resin (A)/resin (BX) is 5 to 60/95 to 40, preferably 10 to 40/90 to 60.

In addition to the resin (A) (including the resin (A')) and the resin (B) (including the resin (B'), the resin (BX) and the resin (BX')), the resin binder according to the present invention may further comprise other resins. Suitable examples of such resins include alkyd resins, polybutyral resins, polyolefins, ethylenevinyl acetate copolymers, styrene resins, ethylenebutadiene resins, acrylate-butadiene resins, and vinyl alkanoate resins.

The proportion of these other resins should not exceed 30% by weight based on the total binder. If the proportion exceeds 30% by weight, the effects of the present invention, particularly the improvement in electrostatic characteristics, would be lost.

The inorganic photoconductive substance which can be used in the present invention includes zinc oxide, titanium oxide, zinc sulfide, cadmium sulfide, cadmium carbonate, zinc selenide, cadmium selenide, tellurium selenide and lead sulfide. Among them zinc oxide is preferred.

The total amount of the binder resin used for the inorganic photoconductive substance is from 10 to 100 parts by weight, and preferably from 15 to 50 parts by weight, per 100 parts by weight of the photoconductive substance.

In the present invention, various kinds of dyes can be used, if desired, for the photoconductive layer as spectral sensitizers. Examples of these dyes are carbonium dyes, diphenylmethane dyes, triphenylmethane dyes, xanthene dyes, phthalein dyes, polymethine dyes (e.g., oxonol dyes, merocyanine dyes, cyanine dyes, rhodacyanine dyes, and styryl dyes), and phthalocyanine dyes (which may contain metals) described in Harumi Miyamoto and Hidehiko Takei, *Imaging*, 1973, (No. 8), 12, C. J. Young et al, *RCA Review*, 15, 469 (1954), Kohei Kiyota, *Journal of Electric Communication Society of Japan*, J 63 C (No. 2), 97 (1980), Yuji Harasaki et al, *Kogyo Kagaku Zasshi*, 66, 78 and 188 (1963), and Tadaaki Tani, *Journal of the Society of Photographic Science and Technology of Japan*, 35, 208 (1972).

Specific examples of suitable carbonium dyes, triphenylmethane dyes, xanthene dyes, and phthalein dyes are described, for example, in JP-B-51-452, JP-A-50-90334, JP-A-50-114227, JP-A-53-39130, JP-A-53-82353, U.S. Pat. Nos. 3,052,540 and 4,054,450 and JP-A-57-16456.

Also, polymethine dyes such as oxonol dyes, merocyanine dyes, cyanine dyes, and rhodacyanine dyes which can be used include those described, for example, in F. M. Hammer, *The Cyanine Dyes and Related Compounds*, and, more specifically, the dyes described, for example, in U.S. Pat. Nos. 3,047,384, 3,110,591, 3,212,008, 3,125,447, 3,128,179, 3,132,942, and 3,622,317, British Patents 1,226,892, 1,309,274, and 1,405,898, JP—B-48-7814 and JP—B-55-18892.

Furthermore, polymethine dyes capable of spectrally sensitizing in the wavelength region of from near infrared to infrared longer than 700 nm are those described, for example, in JP-A-47-840, JP-A-47-44180, JP-B-51-41061 JP-A-49-5034, JP-A-49-45122, JP-A-57-46245, JP-A-56-35141, JP A-57-157254, JP A-61-26044, JP-A-61-27551, U.S. Pat. Nos. 3,619,154 and 4,175,956, and *Research Disclosure*, 216, 117 to 118 (1982).

The light-sensitive material of the present invention is excellent in that, even when various sensitizing dyes are used for the photoconductive layer, the performance thereof is not liable to vary by such sensitizing dyes.

Further, if desired, the photoconductive layers may further contain various additives commonly employed in electrophotographic light-sensitive layer, such as chemical sensitizers. Examples of such additives include electron-acceptive compounds (e.g., halogen, benzoquinone, chloranil, acid anhydrides, and organic carboxylic acids) as described, for example, in *Imaging*, 1973, (No. 8), page 12, and polyarylalkane compounds, hindered phenol compounds, and p-phenylenediamine compounds as described in Hiroshi Kokado et al, *Recent Photoconductive Materials and Development and Practical Use of Light-sensitive Materials*, Chapters 4 to 6, Nippon Kagaku Joho K. K. (1986).

There is no particular restriction on the amount of these additives, but the amount thereof is usually from 0.0001 to 2.0 parts by weight per 100 parts by weight of the photoconductive substance.

The thickness of the photoconductive layer is from 1 $\mu$m to 100 $\mu$m, and preferably from 10 $\mu$m to 50 $\mu$m.

Also, when the photoconductive layer is used as a charge generating layer of a double layer type electrophotographic light-sensitive material having the charge generating layer and a charge transporting layer, the thickness of the charge generating layer is from 0.01 $\mu$m to 1 $\mu$m, and preferably from 0.05 $\mu$m to 0.5 $\mu$m.

If desired, an insulating layer is provided on the photoconductive layer for the main purpose of the protection of the photoconductive layer and the improvement of the durability and the dark decay characteristics of the photoconductive layer. In this case, the thickness of the insulating layer is relatively thin. However, when the light-sensitive material is used for a specific electrophotographic process, the insulating layer having a relatively large thickness is provided.

In the latter case, the thickness of the insulating layer is from 5 μm to 70 μm, and particularly from 10 μm to 50 μm.

As the charge transporting materials for the double layer type light-sensitive material, there are polyvinylcarbazole, oxazole dyes, pyrazoline dyes, and triphenylmethane dyes. The thickness of the charge transporting layer is from 5 μm to 40 μm, and preferably from 10 μm to 30 μm.

Resins which can be used for the insulating layer and the charge transporting layer typically include thermoplastic and thermosetting resins such as polystyrene resins, polyester resins, cellulose resins, polyether resins, vinyl chloride resins, vinyl acetate resins, vinyl chloride-vinyl acetate copolymer resins, polyacryl resins, polyolefin resins, urethane resins, epoxy resins, melamine resins, and silicone resins.

The photoconductive layer according to the present invention can be provided on a conventional support. In general, the support for the electrophotographic light-sensitive material is preferably electroconductive. As the electroconductive support, there are base materials such as metals, paper, and plastic sheets rendered electroconductive by the impregnation of a low resistant substance, the base materials the back surface of which (the surface opposite to the surface of providing a photoconductive layer) is rendered electroconductive and having coated with one or more layer for preventing the occurrence of curling of the support, the above-described support having formed on the surface a water-resistant adhesive layer, the above-described support having formed on the surface at least one precoat, and a support formed by laminating on paper a plastic film rendered electroconductive by vapor depositing thereon aluminum.

More specifically, the electroconductive base materials or conductivity-imparting materials as described, for example, in Yukio Sakamoto, *Denshi Shashin* (*Electrophotography*), 14 (No. 1), 2-11 (1975), Hiroyuki Moriga, *Introduction for Chemistry of Specific Paper*, Kobunshi Kankokai, 1975, M. . Hoover, *J. Macromol. Sci. Chem.*, A-4 (6), 1327-1417 (1970) can be used.

In accordance with the present invention, an electrophotographic light-sensitive material which exhibits excellent electrostatic characteristics and mechanical strength even under severe conditions can be obtained. The electrophotographic light-sensitive material according to the present invention is also advantageously employed in the scanning exposure system using a semiconductor laser beam.

The present invention will now be illustrated in greater detail with reference to the following examples, but it should be understood that the present invention is not to be construed as being limited thereto.

SYNTHESIS EXAMPLE MA-1

Synthesis of Macromonomer (MA-1)

A mixed solution of 30 g of triphenylmethyl methacrylate, and 100 g of toluene was sufficiently degassed in a nitrogen stream and cooled to −20° C. Then, 1.0 g of 1,1-diphenylbutyl lithium was added to the mixture, and the reaction was conducted for 10 hours. Separately, a mixed solution of 70 g of ethyl methacrylate and 100 g of toluene was sufficiently degassed in a nitrogen stream and the resulting mixed solution was added to the above described mixture, and then reaction was further conducted for 10 hours. The reaction mixture was adjusted to 0° C., and carbon dioxide gas was passed through the mixture at a flow rate of 60 ml/min for 30 minutes, then the polymerization reaction was terminated.

The temperature of the reaction solution obtained was raised to 25° C. under stirring, 6 g of 2-hydroxyethyl methacrylate was added thereto, then a mixed solution of 12 g of dicyclohexylcarbodiimide, 1.0 g of 4—N,N-dimethylaminopyridine and 20 g of methylene chloride was added dropwise thereto over a period of 30 minutes, and the mixture was stirred for 3 hours.

After removing the insoluble substances from the reaction mixture by filtration, 10 ml of an ethanol solution of 30 % by weight hydrogen chloride was added to the filtrate and the mixture was stirred for one hour. Then, the solvent of the reaction mixture was distilled off under reduced pressure until the whole volume was reduced to a half, and the mixture was reprecipitated from one liter of petroleum ether.

The precipitates thus formed were collected and dried under reduced pressure to obtain 56 g of Macromonomer (MA-1) shown below having a weight average molecular weight (hereinafter simply referred to as Mw) of $6.5 \times 10^3$.

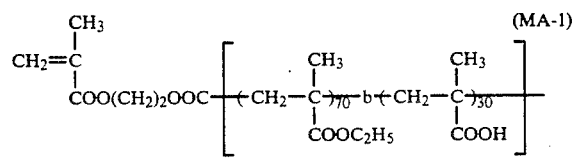

SYNTHESIS EXAMPLE MA-2

Synthesis of Macromonomer (MA-2)

A mixed solution of 5 g of benzyl methacrylate, 0.1 g of (tetraphenyl porphynato) aluminum methyl, and 60 g of methylene chloride was raised to a temperature of 30° C. in a nitrogen stream. The mixture was irradiated with light from a xenon lamp of 300 W at a distance of 25 cm through a glass filter to conduct a reaction for 12 hours. To the mixture was further added 45 g of butyl methacrylate, after similarly light-irradiating for 8 hours, 10 g of 4-bromomethylstyrene was added to the reaction mixture followed by stirring for 30 minutes, then the reaction was terminated. Then, Pd—C was added to the reaction mixture, and a catalytic reduction reaction was conducted for one hour at 25° C.

After removing the insoluble substances from the reaction mixture by filtration, the reaction mixture was reprecipitated from 500 ml of petroleum ether and the precipitates thus formed were collected and dried to obtain 33 g of Macromonomer (MA-2) shown below having an Mw of $7 \times 10^3$.

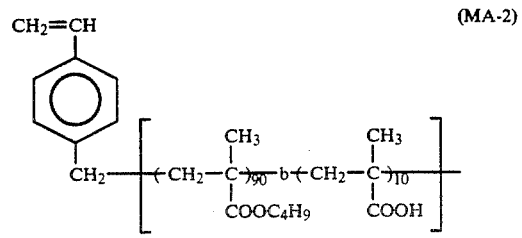

SYNTHESIS EXAMPLE MA-3

Synthesis of Macromonomer (MA-3)

A mixed solution of 20 g of 4-vinylphenyloxytrimethylsilane and 100 g of toluene was sufficiently degassed in a nitrogen stream and cooled to 0° C. Then, 2 g of 1,1-diphenyl-3-methylpentyl lithium was added to the mixture followed by stirring for 6 hours. Separately, a mixed solution of 80 g of 2-chloro-6-methylphenyl methacrylate and 100 g of toluene was sufficiently degassed in a nitrogen stream and the resulting mixed solution was added to the above described mixture, and then reaction was further conducted for 8 hours. After introducing ethylene oxide in a flow rate of 30 ml/min into the reaction mixture for 30 minutes with vigorously stirring, the mixture was cooled to a temperature of 15° C., and 12 g of methacrylic chloride was added dropwise thereto over a period of 30 minutes, followed by stirring for 3 hours.

Then, to the reaction mixture was added 10 ml of an ethanol solution of 30% by weight hydrogen chloride and, after stirring the mixture for one hour at 25° C., the mixture was reprecipitated from one liter of petroleum ether. The precipitates thus formed were collected, washed twice with 300 ml of diethyl ether and dried to obtain 55 g of Macromonomer (MA-3) shown below having an Mw of $7.8 \times 10^3$.

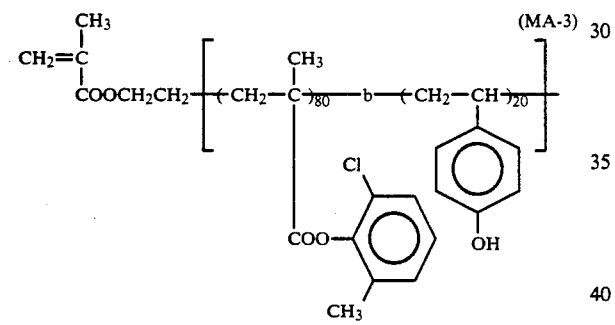

SYNTHESIS EXAMPLE MA-4

Synthesis of Macromonomer (MA-4)

A mixed solution of 40 g of triphenylmethyl methacrylate and 100 g of toluene was sufficiently degassed in a nitrogen stream and cooled to $-20°$ C. Then, 2 g of sec-butyl lithium was added to the mixture, and the reaction was conducted for 10 hours. Separately, a mixed solution of 60 g of styrene and 100 g of toluene was sufficiently degassed in a nitrogen stream and the resulting mixed solution was added to the above described mixture, and then reaction was further conducted for 12 hours. The reaction mixture was adjusted to 0° C., 11 g of benzyl bromide was added thereto, and the reaction was conducted for one hour, followed by reacting at 25° C. for 2 hours.

Then, to the reaction mixture was added 10 ml of an ethanol solution of 30% by weight hydrogen chloride, followed by stirring for 2 hours. After removing the insoluble substances from the reaction mixture by filtration, the mixture was reprecipitated from one liter of n-hexane. The precipitates thus formed were collected and dried under reduced pressure to obtain 58 g of Macromonomer (MA-4) shown below having an Mw of $4.5 \times 10^3$.

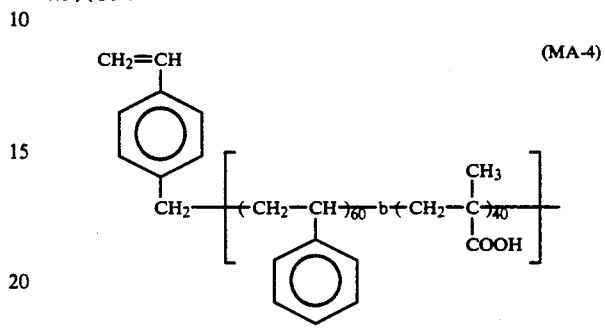

SYNTHESIS EXAMPLE MA-5

Synthesis of Macromonomer (MA-5)

A mixed solution of 70 g of phenyl methacrylate and 4.8 g of benzyl N-hydroxyethyl N-ethyldithiocarbamate was placed in a vessel in a nitrogen stream followed by closing the vessel and heated to 60° C. The mixture was irradiated with light from a high-pressure mercury lamp for 400 W at a distance of 10 cm through a glass filter for 10 hours to conduct a photopolymerization.

Then, 30 g of acrylic acid and 180 g of methyl ethyl ketone were added to the mixture and, after replacing the gas in the vessel with nitrogen, the mixture was light-irradiated again for 10 hours.

To the reaction mixture was added dropwise 12 g of 2-isocyanatoethyl methacrylate at 30° C. over a period of one hour and the mixture was stirred for 2 hours. The reaction mixture was reprecipitated from 1.5 liters of hexane, and the precipitates thus formed were collected and dried to obtain 68 g of Macromonomer (MA-5) shown below having an Mw of $6.0 \times 10^3$.

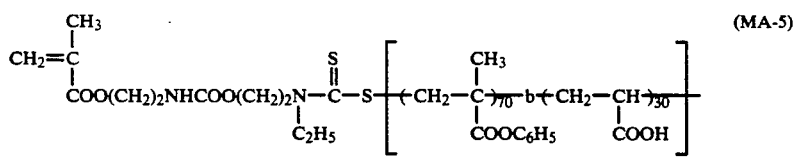

SYNTHESIS EXAMPLE A-1

Synthesis of Resin (A-1)

A mixed solution of 80 g of ethyl methacrylate, g of Macromonomer (MA-1) and 150 g of toluene was heated at 95° C. in a nitrogen stream, and 6 g of 2,2'-azobis(isobutyronitrile) (hereinafter simply referred to as AIBN) was added thereto to effect reaction for 3 hours. Then, 2 g of AIBN was further added thereto, followed by reacting for 2 hours, and thereafter 2 g of AIBN was added thereto, followed by reacting for 2 hours. The resulting copolymer shown below had an Mw of $9 \times 10^3$.

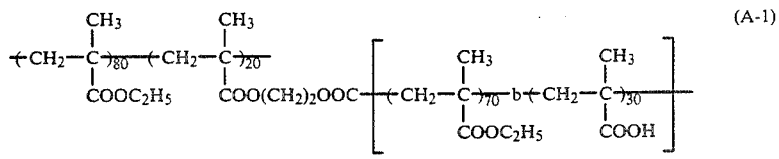
(A-1)

SYNTHESIS EXAMPLE A-2

Synthesis of Resin (A-2)

A mixed solution of 70 g of 2-chlorophenyl methacrylate, 30 g of Macromonomer (MA-2), 2 g of n-dodecylmercaptan and 100 g of toluene was heated at 80° C. in a nitrogen stream, and 3 g of 2,2′-azobis-(isovaleronitrile) (hereinafter simply referred to as AIVN) was added thereto to effect reaction for 3 hours. Then, 1 g of AIVN was further added, followed by reacting for 2 hours, and thereafter 1 g of AIBN was added thereto, followed by heating to 90° C. and reacting for 3 hours. The resulting copolymer shown below had an Mw of $7.6 \times 10^3$.

(A-2)

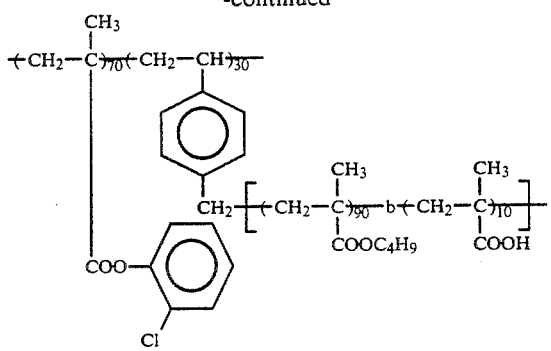

SYNTHESIS EXAMPLES A-3 TO A-18

Synthesis of Resins (A-3) to (A-18)

Resins (A) shown in Table 1 below were synthesized under the same polymerization conditions as described in Synthesis Example A-1 except for using the monomers shown in Table 1 below in place of the ethyl methacrylate, respectively. The Mw of each resin was in the range of from $5 \times 10^3$ to $9 \times 10^3$.

TABLE 1

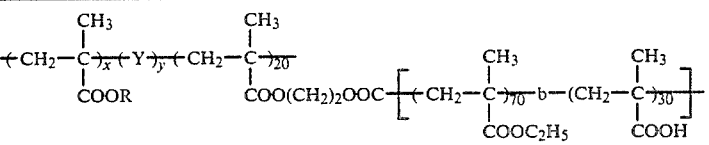

x + y + 20 = 100 (weight ratio)

| Synthesis Example No. | Resin (A) | —R— | —Y— | x/y |
|---|---|---|---|---|
| A-3 | (A-3) | —C$_4$H$_9$ | — | 80/0 |
| A-4 | (A-4) | —CH$_2$C$_6$H$_5$ | — | 80/0 |
| A-5 | (A-5) | —C$_6$H$_5$ | — | 80/0 |
| A-6 | (A-6) | —C$_4$H$_9$ | —CH$_2$—CH(C$_6$H$_5$)— | 65/15 |
| A-7 | (A-7) | —CH$_2$C$_6$H$_5$ | —CH$_2$—CH(COOCH$_3$)— | 70/10 |
| A-8 | (A-8) | —C$_6$H$_4$Cl (2-chlorophenyl) | — | 80/0 |

TABLE 1-continued
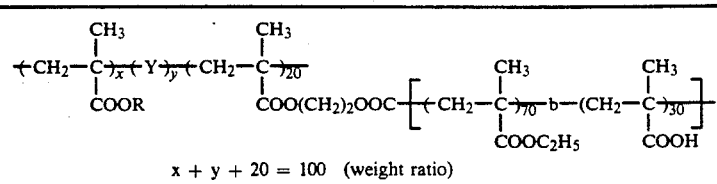
x + y + 20 = 100 (weight ratio)
| Synthesis Example No. | Resin (A) | —R— | —Y— | x/y |
|---|---|---|---|---|
| A-9 | (A-9) | 2-bromophenyl | — | 80/0 |
| A-10 | (A-10) | 2-methylphenyl | — | 80/0 |
| A-11 | (A-11) | 2-chloro-6-methylphenyl | — | 80/0 |
| A-12 | (A-12) | 2-acetylphenyl | — | 80/0 |
| A-13 | (A-13) | naphthyl | —CH$_2$—CH—<br>　　　　COOC$_2$H$_5$ | 70/10 |
| A-14 | (A-14) | —CH$_2$-naphthyl | — | 80/0 |
| A-15 | (A-15) | —CH$_3$ | —CH$_2$—C(CH$_3$)—<br>　　　　COOC$_4$H$_9$ | 40/40 |
| A-16 | (A-16) | —CH$_2$C$_6$H$_5$ | —CH$_2$—C(CH$_3$)—<br>　　　　COO(CH$_2$)$_2$CN | 65/15 |
| A-17 | (A-17) | —C$_6$H$_5$ | —CH$_2$—CH—<br>　　　　CONH$_2$ | 72/8 |

TABLE 1-continued

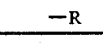

x + y + 20 = 100  (weight ratio)

| Synthesis Example No. | Resin (A) | —R— | —Y— | x/y |
|---|---|---|---|---|
| A-18 | (A-18) | 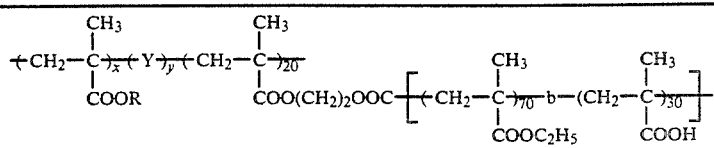 | — | 80/0 |

SYNTHESIS EXAMPLES A-19 TO A-35

Synthesis of Resins (A-19) to (A-35)

Resins (A) shown in Table 2 below were synthesized under the same polymerization conditions as described in Synthesis Example A-2 except for using the macromonomers (MA) shown in Table 2 below in place of Macromonomer (MA-2), respectively. The Mw of each resin was in the range of from $2 \times 10^3$ to $1 \times 10^4$.

TABLE 2

$$\left[ CH_2-\underset{\underset{COO-\underset{Cl}{\underset{|}{\bigcirc}}}{|}}{\overset{CH_3}{\underset{|}{C}}} \right]_{70} \left[ X-\left( CH_2-\overset{a_1}{\underset{|}{C}} \right)_y \left( CH_2-\overset{a_2}{\underset{|}{\underset{R}{C}}} \right)_b \left( Z \right)_z \right]_{30}$$

(weight ratio)

| Synthesis Example No. | Resin (A) | —X— | $a_1/a_2$ | —R | —Z— | y/z |
|---|---|---|---|---|---|---|
| A-19 | (A-19) | —COO(CH$_2$)$_2$OOC— | —H/—CH$_3$ | —COOCH$_3$ | —CH$_2$—CH—<br>              \|<br>             COOH | 70/30 |
| A-20 | (A-20) | —COOCH$_2$CHCH$_2$OOC—<br>         \|<br>        OH | —CH$_3$/—CH$_3$ | —COOCH$_2$C$_6$H$_5$ | —CH$_2$—⌬—COOH | 60/40 |
| A-21 | (A-21) | —CH$_2$—⌬— | —H/—CH$_3$ | —COOC$_6$H$_5$ | CH$_3$<br>\|<br>CH$_3$—C—COO(CH$_2$)$_2$COOH<br>\|<br>—CH$_2$ | 65/35 |
| A-22 | (A-22) | —COO(CH$_2$)$_2$OCO(CH$_2$)$_2$—COO(CH$_2$)$_2$— | —CH$_3$/—CH$_3$ | —COOCH$_2$ | CH$_3$<br>\|<br>—CH$_2$—C—COOH<br>\|<br>CH$_3$ | 80/20 |
| A-23 | (A-23) | —COOCH$_2$CH$_2$— | —CH$_3$/—H | —C$_6$H$_5$ | —CH$_2$—⌬—OH | 50/50 |
| A-24 | (A-24) | —COOCH$_2$CHCH$_2$OOC—<br>         \|<br>        OH | —CH$_3$/—CH$_3$ | —COOC$_2$H$_5$ | CH$_3$<br>\|<br>—CH$_2$—C—COO(CH$_2$)$_3$SO$_3$H<br>\|<br>CH$_3$ | 90/10 |

TABLE 2-continued $$\left[ \left( CH_2-\underset{\underset{COO}{|}}{\overset{CH_3}{\underset{|}{C}}} \right)_{\overline{70}} \left( CH_2-\underset{\underset{Cl}{\bigcirc}}{\overset{a_1}{\underset{|}{C}}} \right)_{\overline{30}} -X \right] - \left[ \left( CH_2-\underset{\underset{R}{|}}{\overset{a_2}{\underset{|}{C}}} \right)_{\overline{y}} -b \left( Z \right)_{\overline{z}} \right]$$

(weight ratio)

| Synthesis Example No. | Resin (A) | —X— | $a_1/a_2$ | —R | —Z— | y/z |
|---|---|---|---|---|---|---|
| A-25 | (A-25) | —CH₂O—⌬— | —H/—CH₃ | —COOC₃H₇ | —CH₂—C(CH₃)—COO(CH₂)₂O—P(=O)(CH₃)(OH) | 80/20 |
| A-26 | (A-26) | —COO(CH₂)₂N(C(=S)—C₂H₅)— | —CH₃/—CH₃ | —COOC₂H₅ | —CH₂—CH—⌬—COOH | 65/35 |
| A-27 | (A-27) | " | —CH₃/—H | —COOC₆H₅ | —CH₂—CH(CH₃)—COOH | 70/30 |
| A-28 | (A-28) | —COO(CH₂)₂NHCOO—(CH₂)₂— | —CH₃/—CH₃ | " | —CH₂—CH—COOH | 75/25 |
| A-29 | (A-29) | —COOCH₂CH₂— | —CH₃/—H | —C₆H₅ | —CH₂—CH—⌬—O—P(=O)(OH)(OH) | 90/10 |

TABLE 2-continued

General structure:

$$\left[\left(CH_2-C(CH_3)\right)_{70}\; COO-C_6H_4(Cl)\right]-\left[\left(CH_2-C(a_1)\right)_{70}-X-\left(CH_2-C(a_2)\right)_y\text{-}b\text{-}(Z)_z\right]_R$$

(weight ratio)

| Synthesis Example No. | Resin (A) | —X— | a₁/a₂ | —R | —Z— | y/z |
|---|---|---|---|---|---|---|
| A-30 | (A-30) | —CONHCOOCH₂CH₂— | —CH₃/—CH₃ | —COOCH₂C₆H₅ | 3,4-dihydroxyphenyl with two COOH groups; linked via —COO(CH₂)₂OCO—C(CH₃)(CH₂—)— | 70/30 |
| A-31 | (A-31) | —Si(CH₃)₂—C₆H₄—(p-CH₃) | —H/—CH₃ | —COOC₄H₉ | —C(COOH)(CH₂COOH)(CH₃)— | 80/20 |
| A-32 | (A-32) | —COO— | —CH₃/—CH₃ | —COOCH₃ | —CH₂—CH(COOH)(OH)— | 70/30 |
| A-33 | (A-33) | —COO(CH₂)₂OOC— | —CH₃/—CH₃ | —COO—C₆H₄(o-CH₃) | —CH₂—CH(—)—C₆H₄—O—P(=O)(OH)₂ | 75/25 |
| A-34 | (A-34) | —O—C₆H₄(p-CH₃) | —H/—H | —C₆H₅ | —CH₂—CH(—)—C₆H₄—COOH | 70/30 |

TABLE 2-continued
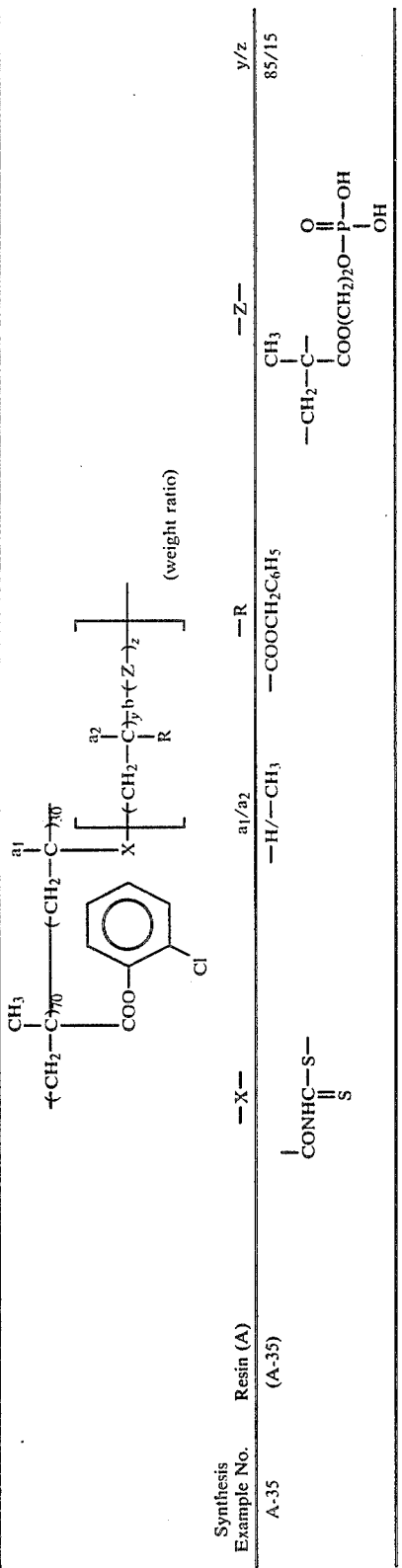
| Synthesis Example No. | Resin (A) | —X— | $a_1/a_2$ | —R | —Z— | y/z |
|---|---|---|---|---|---|---|
| A-35 | (A-35) | —CONHC—S—<br>‖<br>S | —H/—CH$_3$ | —COOCH$_2$C$_6$H$_5$ | —CH$_2$—C(CH$_3$)—<br>COO(CH$_2$)$_2$O—P(=O)(OH)—OH | 85/15 |

SYNTHESIS EXAMPLE MB-1

Synthesis of Macromonomer (MB-1)

A mixed solution of 95 g of methyl methacrylate, 5 g of β-mercaptopropionic acid, and 200 g of toluene was heated to 75° C. with stirring in a nitrogen stream. To the mixture was added 1.0 g of AIBN to conduct a reaction for 8 hours. To the reaction mixture were added 8 g of glycidyl methacrylate, 1.0 g of N,N-dimethyldodecylamine, and 0.5 g of tert-butylhydroquinone, followed by stirring at 100° C. for 12 hours. After cooling, the reaction mixture was reprecipitated from 2 l of methanol to obtain 82 g of Macromonomer (MB-1) having a weight average molecular weight of 7,000 as white powder.

SYNTHESIS EXAMPLE MB-2

Synthesis of Macromonomer (MB-2)

A mixed solution of 95 g of methyl methacrylate, 5 g of thioglycolic acid, and 200 g of toluene was heated to 70° C. with stirring in a nitrogen stream. To the mixture was added 1.5 g of AIBN to conduct a reaction for 8 hours. To the reaction mixture were added 7.5 g of glycidyl methacrylate, 1.0 g of N,N-dimethyldodecylamine, and 0.8 g of tert-butylhydroquinone, followed by stirring at 100° C. for 12 hours. After cooling, the reaction mixture was reprecipitated from 2 l of methanol to obtain 85 g of Macromonomer (MB-2) having a weight average molecular weight of 3,600 as the colorless clear viscous substance.

SYNTHESIS EXAMPLE MB-3

Synthesis of Macromonomer (MB-3)

A mixed solution of 94 g of propyl methacrylate, 6 g of 2-mercaptoethanol, and 200 g of toluene was heated to 70° C. in a nitrogen stream. To the mixture was added 1.2 g of AIBN to conduct a reaction for 8 hours.

The reaction mixture was cooled to 20° C. in a water bath, 10.2 g of triethylamine was added thereto, and 14.5 g of methacryl chloride was added thereto dropwise with stirring at a temperature of 25° C. or less. After the dropwise addition, the stirring was continued for 1 hour. Then, 0.5 g of tert-butylhydroquinone was added, followed by stirring for 4 hours at a temperature of 60° C. After cooling, the reaction mixture was reprecipitated from 2 l of methanol to obtain 79 g of Macromonomer (MB-3) having a weight average molecular weight of 6,500 as the colorless clear viscous substance.

SYNTHESIS EXAMPLE MB-4

Synthesis of Macromonomer (MB-4)

A mixed solution of 95 g of ethyl methacrylate and 200 g of toluene was heated to 70° C. in a nitrogen stream, and 5 g of 2,2-azobis(cyanoheptanol) was added thereto to conduct a reaction for 8 hours.

After cooling, the reaction mixture was cooled to 20° C. in a water bath, and 1.0 g of triethylamine and 21 g of methacrylic anhydride were added thereto, followed by stirring at that temperature for 1 hour and then at 60° C. for 6 hours.

The resulting reaction mixture was cooled and reprecipitated from 2 of methanol to obtain 75 g of Macromonomer (MB-4) having a weight average molecular weight of 9,000 as the colorless clear viscous substance.

SYNTHESIS EXAMPLE MB-5

Synthesis of Macromonomer (MB-5)

A mixed solution of 93 g of benzyl methacrylate, 7 g of 3-mercaptopropionic acid, 170 g of toluene, and 30 g of isopropanol was heated to 70° C. in a nitrogen stream to prepare a uniform solution. To the solution was added 2.0 g of AIBN to conduct a reaction for 8 hours. After cooling, the reaction mixture was reprecipitated from 2 l of methanol, and the solvent was removed by distillation at 50° C. under reduced pressure. The resulting viscous substance was dissolved in 200 g of toluene, and to the solution were added 16 g of glycidyl methacrylate, 1.0 g of N,N-dimethyldodecylamine, and 1.0 g of tert-butylhydroquinone, followed by stirring at 110° C. for 10 hours. The reaction solution was again reprecipitated from 2 l of methanol to obtain Macromonomer (MB-5) having a weight average molecular weight of 5,000 as the light yellow viscous substance.

SYNTHESIS EXAMPLE MB-6

Synthesis of Macromonomer (MB-6)

A mixed solution of 95 g of propyl methacrylate, 5 g of thioglycolic acid, and 200 g of toluene was heated to 70° C. with stirring in a nitrogen stream, and 1.0 g of AIBN was added thereto to conduct a reaction for 8 hours. To the reaction mixture were added 13 g of glycidyl methacrylate, 1.0 g of N,N-dimethyldodecylamine, and 1.0 g of tert-butylhydroquinone, followed by stirring at 110° C. for hours. After cooling, the reaction mixture was reprecipitated from 2 l of methanol to obtain 86 g of Macromonomer (MB-6) having a weight average molecular weight of 5,200 as white powder.

SYNTHESIS EXAMPLE MB-7

Synthesis of Macromonomer (MB-7)

A mixed solution of 40 g of methyl methacrylate, 54 g of ethyl methacrylate, 6 g of 2-mercaptoethylamine, 150 g of toluene, and 50 g of tetrahydrofuran was heated to 75° C. with stirring in a nitrogen stream, and 2.0 g of AIBN was added thereto to conduct a reaction for 8 hours. The reaction mixture was cooled to 20° C. in a water bath, and 23 g of methacrylic anhydride was added thereto dropwise in such a manner that the temperature might not exceed 25° C., followed by stirring at that temperature for 1 hour. To the reaction mixture was added 0.5 g of 2,2'-methyelnebis(6-tert-butyl-p-cresol) was added, followed by stirring at 40° C. for 3 hours. After cooling, the reaction mixture was reprecipitated from 2 l of methanol to obtain 83 g of Macromonomer (MB-7) having a weight average molecular weight of 3,300 as the viscous substance.

SYNTHESIS EXAMPLE MB-8

Synthesis of Macromonomer (MB-8)

A mixed solution of 95 g of 2-chlorophenyl methacrylate, 150 g of toluene, and 150 g of ethanol was heated to 75° C. in a nitrogen stream, and 5 g of 4,4'-azobis(4-cyanovaleric acid)(hereinafter simply referred to as ACV) was added thereto to conduct a reaction for 8 hours. Then, 15 g of glycidyl acrylate, 1.0 g of N,N-dimethyldodecylamine, and 1.0 g of 2,2'-methylenebis(6-tert-butyl-p-cresol) were added thereto, followed by stirring at 100° C. for 15 hours. After cooling, the reaction mixture was reprecipitated from 2 l of methanol to obtain 83 g of Macromonomer (MB-8)

having a weight average molecular weight of 5,400 as the clear viscous substance.

SYNTHESIS EXAMPLES MB-9 TO MB-18

Synthesis of Macromonomers (MB-9) to (MB-18)

Macromonomers (MB-9) to (MB-18) were prepared in the same manner as in Synthesis Example MB-3, except for replacing methacryl chloride with each of acid halides shown in Table 3 below. The weight average molecular weight of each macromonomer was in the range of from 6,000 to 8,000.

TABLE 3

| Synthesis Example No. | Macromonomer (MB) | Acid halide | Amount Used (g) | Yield (g) |
|---|---|---|---|---|
| MB-9 | (MB-9) | $CH_2=CH-COCl$ | 13.5 | 75 |
| MB-10 | (MB-10) | $CH_3\text{-}CH=CH-COCl$ | 14.5 | 80 |
| MB-11 | (MB-11) | $CH_2=CH-C_6H_4-COCl$ | 15.0 | 83 |
| MB-12 | (MB-12) | $CH_2=CH-COO(CH_2)_2COCl$ | 15.5 | 73 |
| MB-13 | (MB-13) | $CH_2=C(CH_3)-COO(CH_2)_2OCO(CH_2)_2COCl$ | 18.0 | 75 |
| MB-14 | (MB-14) | $CH_2=C(CH_3)-CONH(CH_2)_4COCl$ | 18.0 | 80 |
| MB-15 | (MB-15) | $CH_2=CH-COO(CH_2)_2OCO-C_6H_4-COCl$ (ortho) | 20.0 | 81 |
| MB-16 | (MB-16) | $CH_2=C(CH_3)-COOCH_2CH(Br)CH_2OCO(CH_2)_3COCl$ | 20.0 | 78 |
| MB-17 | (MB-17) | $CH_2=CH-CH_2-OCO(CH_2)_2COCl$ | 16.0 | 72 |
| MB-18 | (MB-18) | $CH_2=C(COCl)-CH_2COOCH_3$ | 17.5 | 75 |

SYNTHESIS EXAMPLES MB-19 TO MB-27

Synthesis of Macromonomers (MB-19) to (MB-27)

Macromonomers (MB-19) to (MB-27) were prepared in the same manner as in Synthesis Example MB-2, except for replacing methyl methacrylate with each of monomers shown in Table 4 below.

TABLE 4

| Synthesis Example No. | Macromonomer (MB) | Monomer (Amount: g) | Mw |
|---|---|---|---|
| MB-19 | (MB-19) | Ethyl methacrylate (95) | 4,200 |
| MB-20 | (MB-20) | Methyl methacrylate (60) Butyl methacrylate (35) | 4,800 |
| MB-21 | (MB-21) | Butyl methacrylate (85) 2-Hydroxyethyl methacrylate (10) | 5,000 |
| MB-22 | (MB-22) | Ethyl methacrylate (75) Styrene (20) | 3,300 |
| MB-23 | (MB-23) | Methyl methacrylate (80) Methyl acrylate (15) | 3,700 |
| MB-24 | (MB-24) | Ethyl acrylate (75) Acrylonitrile (20) | 4,500 |
| MB-25 | (MB-25) | Propyl methacrylate (87) N,N-Dimethylaminoethyl methacrylate (8) | 3,300 |
| MB-26 | (MB-26) | Butyl methacrylate (90) N-Vinylpyrrolidone (5) | 4,500 |
| MB-27 | (MB-27) | Methyl methacrylate (89) Dodecyl methacrylate (6) | 4,500 |

SYNTHESIS EXAMPLE B-1

Synthesis of Resin (B-1)

A mixed solution of 70 g of ethyl methacrylate, 30 g of Macromonomer (MB-1), and 150 g of toluene was heated to 70° C. in a nitrogen gas stream. Then, after adding 0.5 g of AIBN to the reaction mixture, the reaction was carried out for 4 hours and, after further adding thereto 0.3 g of AIBN, the reaction was carried out for 6 hours to obtain the desired Resin (B-1).

The weight average molecular weight of the copolymer was $9.8 \times 10^4$ and the glass transition point thereof was 72° C.

(B-1):

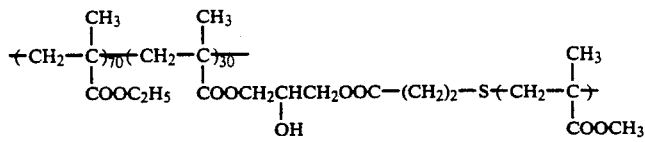

SYNTHESIS EXAMPLES B-2 TO B-15

Synthesis of Resins (B-2) to (B-15)

By following the similar procedure to Synthesis Example B-1, each of the resins (B) shown in Table 5 below was produced. The weight average molecular weight of each resin was in the range of from $8 \times 10^4$ to $1.5 \times 10^5$.

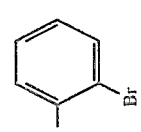

TABLE 5-continued $$+CH_2-C_{p}^{CH_3}+X_{q}+CH_2-C_{CH_3}^{CH_3}+_{10}+Z_{r}$$
$$COO-R_1 \quad CO-Y+CH_2-C_{\pi}^{CH_3}$$
$$COOR_2$$

| Synthesis Example No. | Resin (B) | $R_1$ | p | $+X+$ | q | Y | $R_2$ | Z | r |
|---|---|---|---|---|---|---|---|---|---|
| B-10 | (B-10) | —CH$_3$ | 49.5 | $+CH_2-CH+$<br>C$_6$H$_5$ | 10 | —NHCH$_2$CH$_2$—S— | —C$_4$H$_9$ | $+CH_2-C+$<br>CH$_3$<br>COOH | 0.5 |
| B-11 | (B-11) | CH$_3$<br>(2-methyl-6-chlorophenyl) | 57 | — | 0 | OH<br>—CH$_2$CHCH$_2$OOC—CH$_2$—C—CN<br>CH$_3$ | —CH$_2$C$_6$H$_5$ | $+CH_2-C+$<br>CH$_3$<br>COOCH$_2$CH$_2$OH | 3 |
| B-12 | (B-12) | —C$_3$H$_7$ | 45 | $+CH_2-C+$<br>CH$_3$<br>COOCH$_2$CH$_2$CN | 15 | " | —C$_2$H$_5$ | — | 0 |
| B-13 | (B-13) | —C$_2$H$_5$ | 40 | $+CH_2-C+$<br>CH$_3$<br>COO—C$_6$H$_5$ | 15 | —OCH$_2$—C—CN<br>CH$_3$ | —C$_3$H$_7$ | $+CH_2-C+$<br>CH$_3$<br>CONH$_2$ | 5 |
| B-14 | (B-14) | —CH$_3$ | 49.5 | $+CH_2-C+$<br>COOCH$_3$<br>CH$_2$COOCH$_3$ | 10 | —OCH$_2$CH$_2$—C—CN<br>CH$_3$ | —C$_4$H$_9$ | $+CH_2-CH+$<br>CONHCH$_2$C—CH$_2$SO$_3$H<br>CH$_3$<br>CH$_3$ | 0.5 |
| B-15 | (B-15) | —C$_3$H$_7$ | 50 | $+CH_2-CH+$<br>C$_6$H$_5$ | 10 | —OCH$_2$CHCH$_2$OOC—CH$_2$CH$_2$—S—<br>OH | (2,6-dichlorophenyl) | — | 0 |

SYNTHESIS EXAMPLE B-16

Synthesis of Resin (B-16)

A mixed solution of 70 g of ethyl methacrylate, g of Macromonomer (MB-2), 150 g of toluene and 50 g of isopropanol was heated to 70° C. in a nitrogen gas stream and, after adding 0.8 g of ACV to the reaction mixture, the reaction was carried out for 10 hours to obtain the desired Resin (B-16). The weight average molecular weight of the copolymer was $9.8 \times 10^4$ and the glass transition point thereof was 72° C.

SYNTHESIS EXAMPLES B-17 TO B-24

Synthesis of Resins (B-17) to (B-24)

By following the same procedure as Synthesis Example B-16, each of Resins (B-17) to (B-24) was produced.

The weight average molecular weight of each resin was in the range of from $9 \times 10^4$ to $1.2 \times 10^5$.

TABLE 6

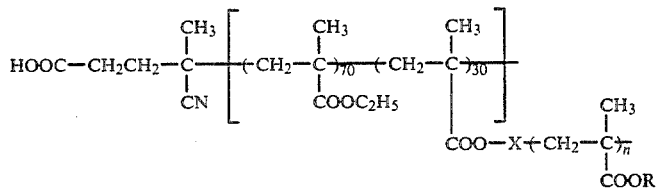

| Synthesis Example No. | Resin (B) | —X— | —R |
|---|---|---|---|
| B-17 | (B-17) | —CH₂CH₂—S— | —C₄H₉ |
| B-18 | (B-18) | —CH₂CH₂CH₂C(CH₃)(CN)— | —C₂H₅ |
| B-19 | (B-19) | —CH₂CH₂—S— | —CH₂C₆H₅ |
| B-20 | (B-20) | —CH₂CH(OH)CH₂OOC—CH₂—S— | —C₃H₇ |
| B-21 | (B-21) | —CH₂CH(OH)CH₂OOC—CH₂—S— | —C₆H₄Cl |
| B-22 | (B-22) | " | —C₄H₉ |
| B-23 | (B-23) | " | —CH₂C₆H₅ |
| B-24 | (B-24) | " | —C₆H₅ |

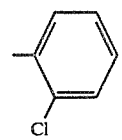

SYNTHESIS EXAMPLES B-25 TO B-31

Synthesis of Resins (B-25) to (B-31)

By following the same procedure as Synthesis Example B-16 except that each of the azobis compounds shown in Table 7 below was used in place of ACV, each of Resins (B-25) to (B-31) was produced.

(B-16):

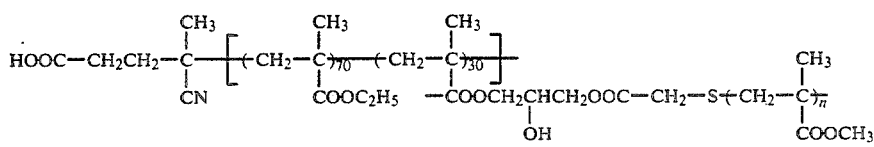

TABLE 7

$$W_2-\left[-(CH_2-\underset{\underset{COOC_2H_5}{|}}{\overset{\overset{CH_3}{|}}{C}})_{70}-(CH_2-\underset{|}{\overset{\overset{CH_3}{|}}{C}})_{30}-\right]-COOCH_2\underset{\underset{OH}{|}}{CH}CH_2OOC-CH_2-S+CH_2-\underset{\underset{COOCH_3}{|}}{\overset{\overset{CH_3}{|}}{C}}\overline{)_n}$$

| Synthesis Example No. | Resin (B) | Azobis Compound | W₂— | Mw |
|---|---|---|---|---|
| B-25 | (B-25) | 2,2'-Azobis(2-cyanopropanol) | $HOCH_2-\underset{\underset{CN}{|}}{\overset{\overset{CH_3}{|}}{C}}-$ | $10.5 \times 10^4$ |
| B-26 | (B-26) | 2,2'-Azobis(2-cyanobuthanol) | $HOCH_2CH_2CH_2\underset{\underset{CN}{|}}{\overset{\overset{CH_3}{|}}{C}}-$ | $10 \times 10^4$ |
| B-27 | (B-27) | 2,2'-Azobis{2-methyl-N-[1,1-bis-(hydroxymethyl)-2-hydroxyethyl]-propionamide} | $HOH_2C-\underset{\underset{CH_2OH}{|}}{\overset{\overset{CH_2OH}{|}}{C}}-NHCO-\underset{\underset{CH_3}{|}}{\overset{\overset{CH_3}{|}}{C}}-$ | $9 \times 10^4$ |
| B-28 | (B-28) | 2,2'-Azobis[2-methyl-N-(2-hydroxy-ethyl)propionamide] | $HOCH_2CH_2-NHCO-\underset{\underset{CH_3}{|}}{\overset{\overset{CH_3}{|}}{C}}-$ | $9.5 \times 10^4$ |
| B-29 | (B-29) | 2,2'-Azobis{2-methyl-N-[1,1-bis-(hydroxymethyl)ethyl]propionamide} | $CH_3-\underset{\underset{CH_2OH}{|}}{\overset{\overset{CH_2OH}{|}}{C}}-NHCO-\underset{\underset{CH_3}{|}}{\overset{\overset{CH_3}{|}}{C}}-$ | $8.5 \times 10^4$ |
| B-30 | (B-30) | 2,2'-Azobis[2-(5-hydroxy-3,4,5,6-tetrahydropyrimidin-2-yl)propane] | (hydroxypropyl-tetrahydropyrimidinyl-dimethyl group) | $8.0 \times 10^4$ |
| B-31 | (B-31) | 2,2'-Azobis{2-[1-(2-hydroxyethyl)-2-imidazolin-2-yl]propane} | (N-hydroxyethyl-imidazolinyl-dimethyl group) | $7.5 \times 10^4$ |

SYNTHESIS EXAMPLE B-32

Synthesis of Resin (B-32)

A mixed solution of 80 g of butyl methacrylate, 20 g of Macromonomer (MB-8), 1.0 g of thioglycolic acid, 100 g of toluene, and 50 g of isopropanol was heated to 80° C. in a nitrogen gas stream and, after adding 0.5 g of 1,1-azobis(cyclohexane-1-carbonitrile) (hereinafter simply referred to as ACHN) to the reaction mixture, the mixture was stirred for 4 hours. Then, after further adding thereto 0.3 g of ACHN, the mixture was stirred for 4 hours to obtain the desired Resin (B-32). The weight average molecular weight of the copolymer was and the glass transition point thereof was 41° C.

(B-32):

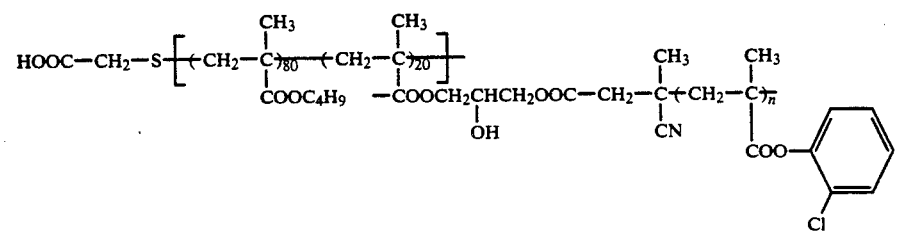

SYNTHESIS EXAMPLES B-33 TO B-39

Synthesis of Resins (B-33) to (B-39)

By following the same procedure as Synthesis Example B-32 except that each of the compounds shown in Table 8 below was used in place of thioglycolic acid, each of Resins (B-33) to (B-39) was produced.

SYNTHESIS EXAMPLES B-40 TO B-48

Synthesis of Resins (B-40) to (B-48)

By following the similar procedure to Synthesis Example B-26, each of the copolymers shown in Table 9 below was produced.

The weight average molecular weight of each resin was in the range of from $9.5 \times 10^4$ to $1.2 \times 10^5$.

TABLE 8

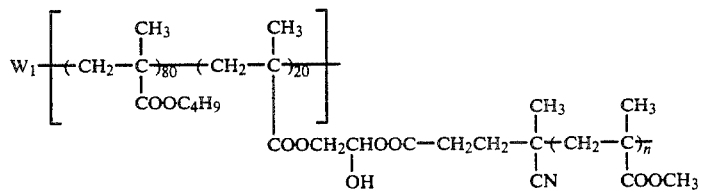

| Synthesis Example No. | Resin (B) | Mercaptan Compound | $W_1-$ | Mw |
|---|---|---|---|---|
| B-33 | (B-33) | 3-Mercaptopropionic acid | $HOOC-CH_2CH_2-S-$ | $8.5 \times 10^4$ |
| B-34 | (B-34) | 2-Mercaptosuccinic acid | $HOOC-HC-S-$ <br> $\mid$ <br> $HOOC-CH_2$ | $10 \times 10^4$ |
| B-35 | (B-35) | Thiosalicylic acid | (2-carboxyphenyl)-S– | $9 \times 10^4$ |
| B-36 | (B-36) | 2-Mercaptoethanesulfonic acid pyridine salt | pyridinium $NHO_3S-CH_2CH_2-S-$ | $8 \times 10^4$ |
| B-37 | (B-37) | $HSCH_2CH_2CONHCH_2COOH$ | $HOOCH_2CNHCOCH_2CH_2-S-$ | $9.5 \times 10^4$ |
| B-38 | (B-38) | 2-Mercaptoethanol | $HO-CH_2CH_2-S-$ | $9 \times 10^4$ |
| B-39 | (B-39) | $HSCH_2CH_2COOCH_2CH_2-O-\overset{O}{\underset{OH}{P}}-OH$ | $HO-\overset{O}{\underset{OH}{P}}-OCH_2CH_2COOCH_2CH_2-S-$ | $10.5 \times 10^4$ |

TABLE 9

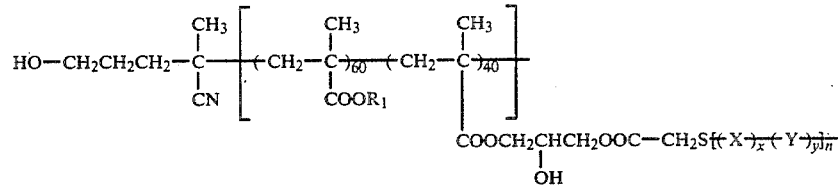

| Synthesis Example No. | Resin (B) | $R_1$ | X | x | Y | y |
|---|---|---|---|---|---|---|
| B-40 | (B-40) | $-C_2H_5$ | $-(CH_2-CH)-$ phenyl | 20 | $-(CH_2-C(CH_3))-$ <br> $\mid$ <br> $COOC_2H_5$ | 80 |
| B-41 | (B-41) | $-C_2H_5$ | $-(CH_2-CH)-$ phenyl | 40 | $-(CH_2-CH)-$ <br> $\mid$ <br> $CN$ | 60 |

TABLE 9-continued $$\text{HO-CH}_2\text{CH}_2\text{CH}_2-\underset{\underset{CN}{|}}{\overset{\overset{CH_3}{|}}{C}}-[(\text{CH}_2-\underset{\underset{COOR_1}{|}}{\overset{\overset{CH_3}{|}}{C}})_{60}-(\text{CH}_2-\underset{\underset{\text{COOCH}_2\text{CHCH}_2\text{OOC-CH}_2\text{S}[(X)_x(Y)_y]_n}{|}\;\underset{\text{OH}}{}}{\overset{\overset{CH_3}{|}}{C}})_{40}]$$

| Synthesis Example No. | Resin (B) | $R_1$ | X | x | Y | y |
|---|---|---|---|---|---|---|
| B-42 | (B-42) | —$C_2H_5$ | $\text{+CH}_2-\underset{\underset{\text{COOCH}_3}{|}}{\overset{\overset{CH_3}{|}}{C}}\text{+}$ | 90 | $\text{+CH}_2-\underset{\underset{\text{COOCH}_3}{|}}{\text{CH+}}$ | 10 |
| B-43 | (B-43) | —$C_3H_7$ | +CH$_2$—CH+ (1-naphthyl) | 100 | — | 0 |
| B-44 | (B-44) | —$C_3H_7$ | $\text{+CH}_2-\underset{\underset{\text{COOCH}_2\text{CH}_2\text{CN}}{|}}{\overset{\overset{CH_3}{|}}{C}}\text{+}$ | 50 | $\text{+CH}_2-\underset{\underset{\text{COOC}_4\text{H}_9}{|}}{\overset{\overset{CH_3}{|}}{C}}\text{+}$ | 50 |
| B-45 | (B-45) | —$C_2H_5$ | $\text{+CH}_2-\underset{\underset{\text{COOC}_3\text{H}_7}{|}}{\overset{\overset{CH_3}{|}}{C}}\text{+}$ | 85 | $\text{+CH}_2-\underset{\underset{\text{COOCH}_2\text{CH}_2\text{N}(CH_3)_2}{|}}{\overset{\overset{CH_3}{|}}{C}}\text{+}$ | 15 |
| B-46 | (B-46) | —$C_2H_5$ | $\text{+CH}_2-\underset{\underset{\text{COOC}_2\text{H}_5}{|}}{\overset{\overset{CH_3}{|}}{C}}\text{+}$ | 90 | +CH$_2$—CH+ (p-CH$_2$N(CH$_3$)$_2$-phenyl) | 10 |
| B-47 | (B-47) | —$C_3H_7$ | $\text{+CH}_2-\underset{\underset{\text{COOC}_2\text{H}_5}{|}}{\overset{\overset{CH_3}{|}}{C}}\text{+}$ | 90 | $\text{+CH}_2-\underset{\underset{\text{COOCH}_2\text{CH}_2\text{SO}_2\text{CH}_3}{|}}{\overset{\overset{CH_3}{|}}{C}}\text{+}$ | 10 |
| B-48 | (B-48) | —$C_2H_5$ | $\text{+CH}_2-\underset{\underset{\text{COOC}_3\text{H}_7}{|}}{\overset{\overset{CH_3}{|}}{C}}\text{+}$ | 75 | $\text{+CH}_2-\underset{\underset{\text{CONH}_2}{|}}{\overset{\overset{CH_3}{|}}{C}}\text{+}$ | 25 |

SYNTHESIS EXAMPLES B-49 TO B-56

Synthesis of Resins (B-49) to (B-56)

By following the similar procedure Synthesis Example B-16, each of the resins shown in Table 10 below was produced.

The weight average molecular weight of each resin was in the range of from $9.5 \times 10^4$ to $1.1 \times 10^5$.

TABLE 10

$$HOOC-CH_2CH_2-\underset{CN}{\underset{|}{\overset{CH_3}{\overset{|}{C}}}}-[(X)_x(\overset{a_1}{\underset{|}{CH}}-\overset{a_2}{\underset{|}{C}})_y]-W-COOCH_2CH_2S+CH_2-\underset{COOC_3H_7}{\underset{|}{\overset{CH_3}{\overset{|}{C}}}}\frac{}{n}$$

| Synthesis Example No. | Resin (B) | —X— | $a_1$ | $a_2$ | —W— | x/y (weight ratio) |
|---|---|---|---|---|---|---|
| B-49 | (B-49) | —CH$_2$—C(CH$_3$)(COOC$_2$H$_5$)— | H | H | — | 80/20 |
| B-50 | (B-50) | " | CH$_3$ | H | — | 70/30 |
| B-51 | (B-51) | —CH$_2$—CH(C$_6$H$_5$)— | H | H | —C$_6$H$_4$— | 60/40 |
| B-52 | (B-52) | —CH$_2$—C(CH$_3$)(COOC$_2$H$_5$)— | H | H | —COOCH$_2$CH$_2$— | 80/20 |
| B-53 | (B-53) | —CH$_2$—C(CH$_3$)(COOC$_2$H$_5$)— | H | CH$_3$ | —COO(CH$_2$)$_2$OCO(CH$_2$)$_2$— | 80/20 |
| B-54 | (B-54) | —CH$_2$—C(CH$_3$)(COOCH$_2$C$_6$H$_5$)— | H | CH$_3$ | —CONH(CH$_2$)$_4$— | 80/20 |
| B-55 | (B-55) | —CH$_2$—C(CH$_3$)(COOCH$_3$)— | H | H | —COO(CH$_2$)$_2$OCO-(o-C$_6$H$_4$CH$_3$) | 50/50 |
| B-56 | (B-56) | —CH$_2$—CH(C$_6$H$_5$)— | H | H | —CH$_2$OCO(CH$_2$)$_2$— | 80/20 |

SYNTHESIS EXAMPLE MBX-1

Synthesis of Macromonomer (MBX 1)

A mixed solution of 90 g of ethyl methacrylate, 10 g of 2-hydroxyethyl methacrylate, 5 g of thioglycolic acid and 200 g of toluene was heated to 75° C. with stirring in a nitrogen gas stream and, after adding thereto 1.0 g of AIBN, the reaction was carried out for 8 hours. Then, to the reaction mixture were added 8 g of glycidyl methacrylate, 1.0 g of N,N-dimethyldodecylamine and 0.5 g of tert-butylhydroquninone, and the resulting mixture was stirred for 12 hours at 100° C. After cooling, the reaction mixture was reprecipitated from 2 liters of n-hexane to obtain 82 g of the desired macromonomer as white powder. The weight average molecular weight of the macromonomer obtained was $3.8 \times 10^3$.

(MBX-1)

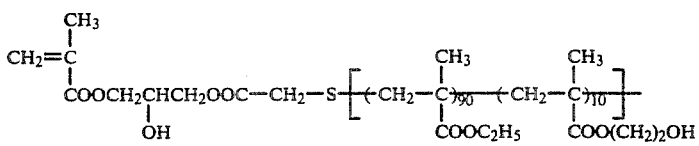

SYNTHESIS EXAMPLE MBX-2

Synthesis of Macromonomer (MBX-2)

A mixed solution of 90 g of butyl methacrylate, 10 g of methacrylic acid, 4 g of 2-mercaptoethanol, and 200 g of tetrahydrofuran was heated to 70° C. in a nitrogen gas stream and, after adding thereto 1.2 g of AIBN, the reaction was carried out for 8 hours.

Then, after cooling the reaction mixture in a water bath to 20° C., 10.2 g of triethylamine was added to the reaction mixture and then 14.5 g of methacrylic chloride was added dropwise to the mixture with stirring at a temperature below 25° C. Thereafter, the resulting mixture was further stirred for one hour. Then, after adding thereto 0.5 g of tert-butylhydroquinone, the mixture was heated to 60° C. and stirred for 4 hours. After cooling, the reaction mixture was added dropwise to one liter of water with stirring over a period of about 10 minutes, and the mixture was stirred for one hour. Then, the mixture was allowed to stand and water was removed by decantation. The mixture was washed twice with water and, after dissolving it in 100 ml of tetrahydrofuran, the solution was reprecipitated from 2 liter of petroleum ether. The precipitates thus formed were collected by decantation and dried under reduced pressure to obtain 65 g of the desired macromonomer as the viscous product. The weight average molecular weight of the product was $5.6 \times 10^3$.

the reaction mixture was added dropwise to one liter of water with stirring over a period of about 10 minutes followed by stirring for one hour. The mixture was allowed to stand, and water was removed by decantation. The product was washed twice with water, dissolved in 100 ml of tetrahydrofuran and the solution was reprecipitated from 2 liters of petroleum ether. The precipitates formed were collected by decantation and dried under reduced pressure to obtain 70 g of the desired macromonomer as the viscous product. The weight average molecular weight of the product was $7.4 \times 10^3$.

(MBX-3)

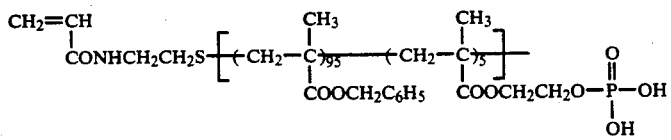

(MBX-2)

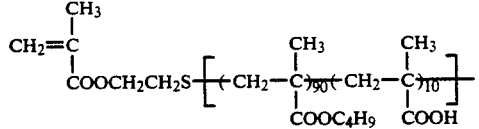

SYNTHESIS EXAMPLE MBX 3

Synthesis of Macromonomer (MBX-3)

A mixed solution of 95 g of benzyl methacrylate, 5 g of 2-phosphonoethyl methacrylate, 4 g of 2-aminoethylmercaptan, and 200 g of tetrahydrofuran was heated to 70° C. with stirring in a nitrogen gas stream.

Then, after adding 1.5 g of AIBN to the reaction mixture, the reaction was carried out for 4 hours and, after further adding thereto 0.5 g of AIBN, the reaction was carried out for 4 hours. Then, the reaction mixture was cooled to 20° C. and, after adding thereto 10 g of acrylic anhydride, the mixture was stirred for one hour at a temperature of from 20° C. to 25° C. Then, 1.0 g of tert-butylhydroquinone was added to the reaction mixture, and the resulting mixture was stirred for 4 hours at a temperature of from 50° C. to 60° C. After cooling,

SYNTHESIS EXAMPLE MBX-4

Synthesis of Macromonomer (MBX-4)

A mixed solution of 95 g of 2-chlorophenyl methacrylate, 5 g of Monomer (I) having the structure shown below, 4 g of thioglycolic acid and 200 g of toluene was heated to 70° C. in a nitrogen gas stream.

Monomer (I):

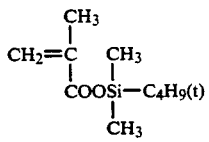

Then, 1.5 g of AIBN was added to the reaction mixture, and the reaction was carried out for 5 hours. After further adding thereto 0.5 g of AIBN, the reaction was carried out for 4 hours. Then, after adding thereto 12.4 g of glycidyl methacrylate, 1.0 g of N,N-dimethyldodecylamine, and 1.5 g of tert-butylhydroquinone, the reaction was carried out for 8 hours at 110° C. After cooling, the reaction mixture was added to a mixture of 3 g of p-toluenesulfonic acid and 100 ml of an aqueous solution of 90% by volume tetrahydrofuran, and the mixture was stirred for one hour at a temperature of from 30° C. to 35° C. The reaction mixture obtained was reprecipitated from 2 liters of a mixture of water and ethanol (⅓ by volume ratio), and the precipitates thus formed were collected by decantation and dissolved in 200 ml of tetrahydrofuran. The solution was reprecipitated from 2 liters of n-hexane to obtain 58 g of the desired macromonomer as powder. The weight average molecular weight of the product was $7.6 \times 10^3$.

(MBX-4)

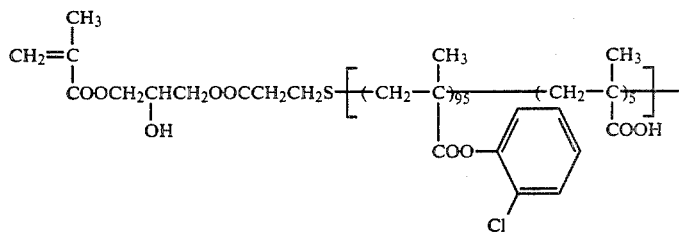

SYNTHESIS EXAMPLE MBX-5

Synthesis of Macromonomer (MBX-5)

A mixed solution of 95 g of 2,6-dichlorophenyl methacrylate, 5 g of 3-(2'-nitrobenzyloxysulfonyl)propyl methacrylate, 150 g of toluene and 50 g of isopropyl alcohol was heated to 80° C. in a nitrogen gas stream. Then, after adding 5.0 g of ACV to the reaction mixture, the reaction was carried out for 5 hours and, after further adding thereto 1.0 g of ACV, the reaction was carried out for 4 hours. After cooling, the reaction mixture was reprecipitated from 2 liters of methanol and the powder thus formed was collected and dried under reduced pressure.

A mixture of 50 g of the powder obtained in the above step, 14 g of glycidyl methacrylate, 0.6 g of N,N,-dimethyldodecylamine, 1.0 g of tert-butylhydroquinone, and 100 g of toluene was stirred for 10 hours at 110° C. After cooling to room temperature, the reaction mixture was irradiated with a high pressure mercury lamp of 80 watts with stirring for one hour. Thereafter, the reaction mixture was reprecipitated from one liter of methanol, and the powder formed was collected by filtration and dried under reduced pressure to obtain 34 g of the desired macromonomer. The weight average molecular weight of the product was $7.3 \times 10^3$.

SYNTHESIS EXAMPLE BX-1

Synthesis of Resin (BX-1)

A mixed solution of 80 g of benzyl methacrylate, 20 g of Macromonomer (MBX-2) obtained in Synthesis Example MBX-2, and 100 g of toluene was heated to 75° C. in a nitrogen gas stream. After adding 0.8 g of 1,1'-azobis(cyclohexane-1-carbocyanide) (hereinafter simply referred to as ABCC) to the reaction mixture, the reaction was carried out for 4 hours and, after further adding thereto 0.5 g of AIBN, the reaction was carried out for 3 hours to obtain the desired resin. The weight average molecular weight of the copolymer was $1.0 \times 10^5$.

(BX-1)

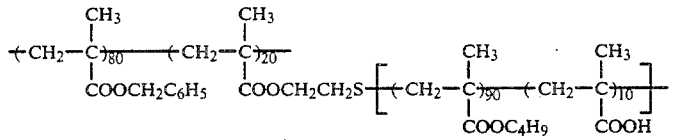

SYNTHESIS EXAMPLE BX-2

Synthesis of Resin (BX-2)

A mixed solution of 70 g of 2-chlorophenyl methacrylate, 30 g of Macromonomer (MBX-1) obtained in Synthesis Example MBX-1, 0.7 g of thioglycolic acid, and 50 g of toluene was heated to 80° C. in a nitrogen gas stream and, after adding thereto 0.5 g of ABCC, the reaction was carried out for 5 hours. Then, 0.3 g of ABCC was added to the reaction mixture, and the reaction was carried out for 3 hours and after further adding 0.2 g of ABCC, the reaction was further carried out for (MBX-5)

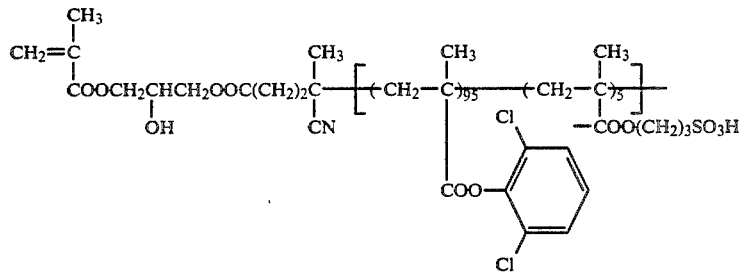

3 hours to obtain the desired resin. The weight average molecular weight of the copolymer was $9.2 \times 10^4$.

(BX-2)

-continued

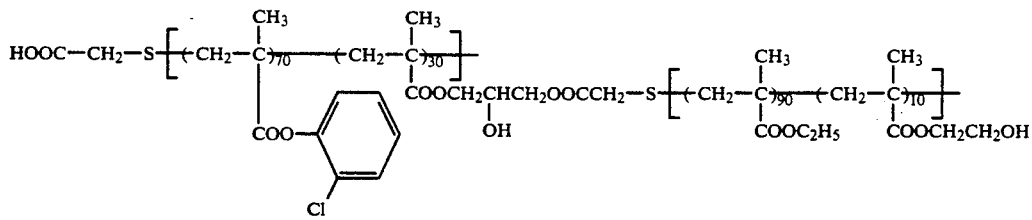

SYNTHESIS EXAMPLE BX-3

(BX-3)

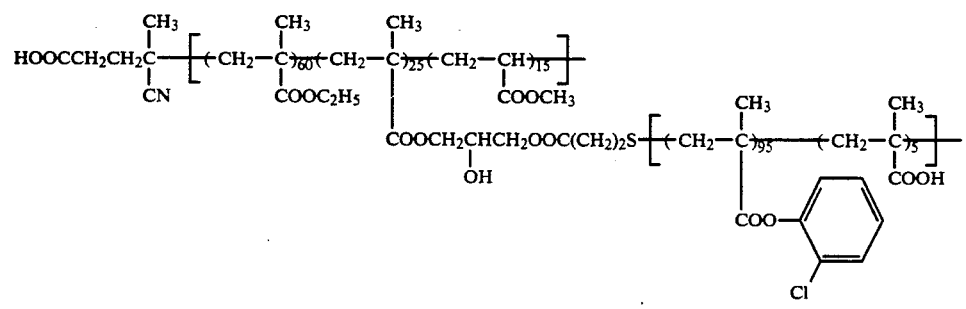

Synthesis of Resin (BX-3)

A mixed solution of 60 g of ethyl methacrylate, g of Macromonomer (MBX-4) obtained in Synthesis Example MBX-4, 15 g of methyl acrylate, and 150 g of toluene was heated to 75° C. in a nitrogen gas stream. Then, 0.5 of ACV was added to the reaction mixture, and the reaction was carried out for 5 hours and, after further adding thereto 0.3 g of ACV, the reaction was carried out for 4 hours to obtain the desired resin. The weight average molecular weight of the copolymer was $1.1 \times 10^5$.

SYNTHESIS EXAMPLES BX-4 TO BX-11

Synthesis of Resins (BX-4) to (BX-11)

Resins (BX) shown in Table 11 below were synthesized in the same manner as described in Synthesis Example BX-1 except for using the corresponding methacrylates and macromonomers shown in Table 11 below, respectively. The weight average molecular weight of each resin was in the range of from $9.5 \times 10^4$ to $1.2 \times 10^5$.

TABLE 11

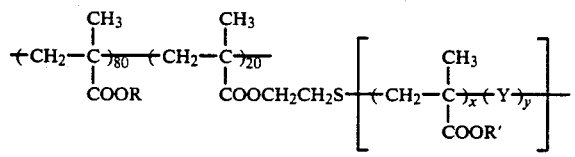

| Synthesis Example No. | Resin (BX) | R | R' | x/y (weight ratio) | —Y— |
|---|---|---|---|---|---|
| BX-4 | (BX-4) | —$C_2H_5$ | ⟨phenyl⟩ | 95/5 | —$CH_2$—$CH$—<br>\|<br>$COOH$ |
| BX-5 | (BX-5) | —$C_3H_7$ | —$CH_2$—⟨phenyl⟩ | 93/7 | $CH_3$<br>\|<br>—$CH_2$—$C$—<br>\|<br>$COO(CH_2)_2OCO(CH_2)_3COOH$ |
| BX-6 | (BX-6) | —$C_4H_9$ | ⟨naphthyl⟩ | 96/4 | $CH_3$<br>\|<br>—$CH_2$—$C$—<br>\|<br>$COO(CH_2)_2O$—$\overset{O}{\underset{OH}{P}}$—$OH$ |

TABLE 11-continued $$+CH_2-\underset{\underset{COOR}{|}}{\overset{\overset{CH_3}{|}}{C}}\rightarrow_{80}+CH_2-\underset{\underset{COOCH_2CH_2S}{|}}{\overset{\overset{CH_3}{|}}{C}}\rightarrow_{20}\left[+CH_2-\underset{\underset{COOR'}{|}}{\overset{\overset{CH_3}{|}}{C}}\rightarrow_x+Y\rightarrow_y\right]$$

| Synthesis Example No. | Resin (BX) | R | R' | x/y (weight ratio) | —Y— |
|---|---|---|---|---|---|
| BX-7 | (BX-7) | (2-chlorophenyl) | —CH₃ | 95/5 | $-CH_2-\underset{\underset{COOCH_2CH_2COOH}{|}}{CH}-$ |
| BX-8 | (BX-8) | —CH₂—(phenyl) | —C₂H₅ | 94/6 | $-CH_2-\underset{\underset{(p-COOH-phenyl)}{|}}{CH}-$ |
| BX-9 | (BX-9) | (3-methylphenyl) | —C₄H₉ | 96/4 | $-CH_2-\underset{\underset{COO(CH_2)_3SO_3H}{|}}{\overset{\overset{CH_3}{|}}{C}}-$ |
| BX-10 | (BX-10) | —CH₃ | (3-chlorophenyl) | 96/4 | $-CH_2-\underset{\underset{CH_2COOH}{|}}{\overset{\overset{COOH}{|}}{C}}-$ |
| BX-11 | (BX-11) | —CH₃ | —C₂H₅ | 92/8 | $-CH_2-\underset{\underset{COO(CH_2)_2-P(=O)(OH)-OCH_3}{|}}{\overset{\overset{CH_3}{|}}{C}}-$ |

SYNTHESIS EXAMPLES BX-12 TO BX-19

Synthesis of Resins (BX-12) to (BX-19)

Resins (BX) shown in Table 12 below were synthesized in the same manner as described in Synthesis Example BX-2, except for using the methacrylates, macromonomers and mercapto compounds as shown in Table 12 below, respectively. The weight average molecular weight of each resin was in the range of from $9 \times 10^4$ to $1.1 \times 10^5$.

TABLE 12

$$W_1+\left[+CH_2-\underset{\underset{COOR}{|}}{\overset{\overset{CH_3}{|}}{C}}\rightarrow_{70}+CH_2-\overset{\overset{CH_3}{|}}{C}\rightarrow_{30}\right]\underset{\underset{OH}{|}}{COOCH_2CHCH_2OOC(CH_2)_2S}+\left[+CH_2-\underset{\underset{COOR'}{|}}{\overset{\overset{CH_3}{|}}{C}}\rightarrow_x+Y\rightarrow_y\right]$$

| Synthesis Example No. | Resin (BX) | W₁— | R | R' | x/y (weight ratio) | —Y— |
|---|---|---|---|---|---|---|
| BX-12 | (BX-12) | HOOC—H₂C—S— | (2-chlorophenyl) | —C₂H₅ | 90/10 | $-CH_2-\underset{\underset{COO(CH_2)_2OH}{|}}{\overset{\overset{CH_3}{|}}{C}}-$ |

TABLE 12-continued

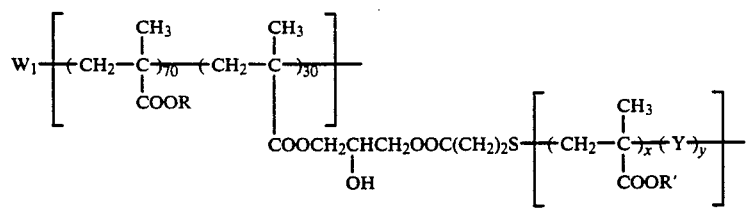

| Synthesis Example No. | Resin (BX) | W₁— | R | R' | x/y (weight ratio) | —Y— |
|---|---|---|---|---|---|---|
| BX-13 | (BX-13) | HOOC—CH₂<br>HOOC—CHS— | 2-Cl, 3-CH₃ phenyl | 2-CH₃ phenyl | 85/15 | —CH₂—C(CH₃)—<br>COO(CH₂)₆OH |
| BX-14 | (BX-14) | 2-COOH phenyl-S— | 3-Br phenyl | —CH₂—phenyl | 90/10 | —CH₂—C(CH₃)—<br>CONHCHCH₂OH<br>CH₂OH |
| BX-15 | (BX-15) | HO—P(=O)(OH)—OCH₂CH₂S— | —C₂H₅ | 2-Cl phenyl | 92/8 | —CH₂—C(CH₃)—<br>COOCH₂CHCH₂OH<br>OH |
| BX-16 | (BX-16) | HO₃SCH₂CH₂S— | 2-naphthyl | —C₄H₉ | 93/7 | —CH₂—C(CH₃)—<br>COO(CH₂)₂OCO(CH₂)₂COOH |
| BX-17 | (BX-17) | HOCH₂CH₂—S— | 2-Cl phenyl | —C₂H₅ | 92/8 | —CH₂—C(CH₃)—<br>COO(CH₂)₂O—P(=O)(OH)—OH |
| BX-18 | (BX-18) | HOOC—(CH₂)₂S— | 2-COCH₃ phenyl | —C₃H₇ | 95/5 | —CH₂—C(CH₃)—<br>COO(CH₂)₃SO₃H |
| BX-19 | (BX-19) | H₅C₂O—P(=O)(OH)—OCH₂CH₂S— | —CH₂—(3-CH₃)phenyl | —CH₂—phenyl | 80/20 | —CH₂—C(CH₃)—<br>CONH(CH₂)₁₀—OH |

SYNTHESIS EXAMPLES BX-20 TO BX-27

Synthesis of Resins (BX-20) to (BX-27)

Resins (BX) shown in Table 13 below were synthesized in the same manner as described in Synthesis Example BX-3, except for using the methacrylates, macromonomers and azobis compounds as shown in Table 13 below, respectively. The weight average molecular weight of each resin was in the range of from $9.5 \times 10^4$ to $1.5 \times 10^5$.

TABLE 13

$$\left[ W_2 \!\!-\!\! \left( CH_2\!-\!\underset{\underset{COOR}{|}}{\overset{\overset{CH_3}{|}}{C}} \right)_{\!x}\!\!\left( CH_2\!-\!\underset{\underset{COO-Z-\left[\left(CH_2-\underset{\underset{COOR'}{|}}{\overset{\overset{CH_3}{|}}{C}}\right)_{\!x'}(Y)_{y'}\right]}{|}}{\overset{\overset{CH_3}{|}}{C}} \right)_{\!y} \right]$$

| Synthesis Example No. | Resin (BX) | W₂— | R | x/y (weight ratio) | —Z— | R' | —Y— | x'/y' (weight ratio) |
|---|---|---|---|---|---|---|---|---|
| BX-20 | (BX-20) | $\underset{HOOC(CH_2)_2}{\overset{CH_3}{\underset{|}{\overset{|}{C}}}}\!\!-\!\!CN$ | —C₂H₅ | 70/30 | $-CH_2-CHOH-CH_2OOCH_2S-$ | ⟨o-Cl-C₆H₄⟩ | $-CH_2-\underset{\underset{COOCH_2CH_2OH}{|}}{\overset{\overset{CH_3}{|}}{C}}-$ | 90/10 |
| BX-21 | (BX-21) | " | —C₃H₇ | 75/25 | " | —CH₂C₆H₅ | $-CH_2-CH-\!\!\underset{CONH(CH_2)_6OH}{|}$ | 85/15 |
| BX-22 | (BX-22) | $\underset{HOCH_2}{\overset{CH_3}{\underset{|}{\overset{|}{C}}}}\!\!-\!\!CN$ | —C₂H₅ | 90/10 | $-(CH_2)_2OOC(CH_2)_2S-$ | ⟨2,3-substituted (CH₃, Cl)-C₆H₃⟩ | $-CH_2-\underset{\underset{COOH}{|}}{\overset{\overset{CH_3}{|}}{C}}-$ | 90/10 |
| BX-23 | (BX-23) | $\underset{HO(CH_2)_3}{\overset{CH_3}{\underset{|}{\overset{|}{C}}}}\!\!-\!\!CN$ | —CH₂C₆H₅ | 85/15 | $-(CH_2)_2S-$ | —C₂H₅ | $-CH_2-CH-\!\!\underset{COO(CH_2)_2COOH}{|}$ | 92/8 |
| BX-24 | (BX-24) | $\underset{HO(CH_2)_2NHCO}{\overset{CH_3}{\underset{|}{\overset{|}{C}}}}\!\!-\!\!\underset{CH_3}{\overset{|}{C}}$ | ⟨o-CH₃-C₆H₄⟩ | 88/12 | $-(CH_2)_2S-$ | —C₄H₉ | $-CH_2-CH-\!\!\langle p\text{-}C_6H_4\text{-}COOH\rangle$ | 90/10 |

TABLE 13-continued $$\left[ W_2 + CH_2-\underset{COOR}{\overset{CH_3}{\underset{|}{C}}})_x + CH_2-\underset{COOR'}{\overset{CH_3}{\underset{|}{C}}})_y \right] COO-Z + CH_2-\underset{COOR'}{\overset{CH_3}{\underset{|}{C}}})_{x'} + Y)_{y'}$$

| Synthesis Example No. | Resin (BX) | W₂— | R | x/y (weight ratio) | —Z— | R' | —Y— | x'/y' (weight ratio) |
|---|---|---|---|---|---|---|---|---|
| BX-25 | (BX-25) | ![structure with N=C(CH₃)₂, N-H, ring with OH] | —C₂H₅ | 85/15 | | o-chlorophenyl (tolyl with Cl) | —CH₂—C(CH₃)(—)—COO(CH₂)₂OP(=O)(OH)—OH | 95/5 |
| BX-26 | (BX-26) | ![structure with N=C(CH₃)₂, N-(CH₂)₂OH, ring] | —C₃H₇ | 80/20 | —(CH₂)₂—OCO(CH₂)₂C(CH₃)₂—CN | naphthyl | —CH₂—C(CH₃)(—)—COOCH₂CHCH₂OH with OH | 90/10 |
| BX-27 | (BX-27) | HOOC(CH₂)₂—C(CH₃)(CN)— | —CH₂C₆H₅ | 85/15 | —CH₂—CH(OH)—CH₂OOCCH₂S— | 2,6-dichlorophenyl | —CH₂—C(CH₃)(—)—COOCH₂CHCH₂Cl with OH | 90/10 |

EXAMPLE 1

A mixture of 6 g (solid basis, hereinafter the same) of Resin (A-2), 34 g (solid basis, hereinafter the same) of Resin (B-1), 200 g of zinc oxide, 0.018 g of Cyanine Dye (I) shown below, and 300 g of toluene was dispersed in a ball mill for 4 hours to prepare a coating composition for a light-sensitive layer. The coating composition was coated on paper, which has been subjected to electrically conductive treatment, by a wire bar at a dry coverage of 25 g/m², followed by drying at 110° C. for 30 seconds. The coated material was then allowed to stand in a dark place at 20° C. and 65% RH (relative humidity) for 24 hours to prepare an electrophotographic light-sensitive material.

Cyanine Dye (I):

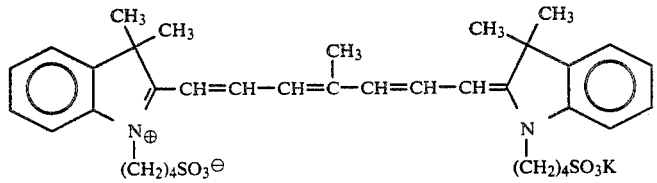

COMPARATIVE EXAMPLE A

An electrophotographic light-sensitive material was prepared in the same manner as in Example 1, except for using 6 g of Resin (R-1) shown below and 34 g of poly(Ethylmethacrylate) having an Mw of $2.4 \times 10^5$ (Resin (R-2)) in place of the resins used in Example 1.

(R-1)

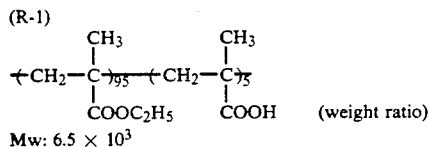

(weight ratio)

Mw: $6.5 \times 10^3$

COMPARATIVE EXAMPLE B

An electrophotographic light-sensitive material was prepared in the same manner as in Example 1, except for using 6 g of Resin (R-3) shown below and 34 g of Resin (R-2) in place of the resins used in Example 1.

(R-3)

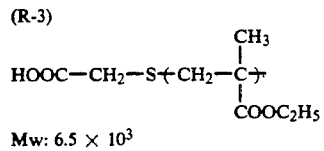

Mw: $6.5 \times 10^3$

COMPARATIVE EXAMPLE C

An electrophotographic light-sensitive material was prepared in the same manner as in Example 1, except for using 6 g of Resin (R-3) and 34 g of Resin (R-4) shown below in place of the resins used in Example 1.

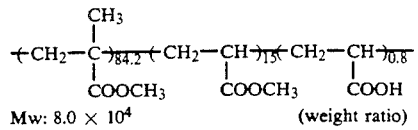

Mw: $8.0 \times 10^4$ (weight ratio)

Each of the light-sensitive materials obtained in Example 1 and Comparative Examples A, B and C was evaluated for film properties in terms of surface smoothness and mechanical strength; electrostatic characteristics; image forming performance; oil-desensitivity when used as an offset master plate precursor (expressed in terms of contact angle of the layer with water after oil-desensitization treatment); and printing suitability (expressed in terms of background stains and printing durability) according to the following test methods. The results obtained are shown in Table 14 below.

1) Smoothness of Photoconductive Layer:

The smoothness (sec/cc) was measured using a Beck's smoothness tester (manufactured by Kumagaya Riko K. K.) under an air volume condition of 1 cc.

2) Mechanical Strength of Photoconductive Layer:

The surface of the light-sensitive material was repeatedly (1000 times) rubbed with emery paper (#1000) under a load of 60 g/cm² using a Heidon 14 Model surface testing machine (manufactured by Shinto Kagaku K. K.). After dusting, the abrasion loss of the photoconductive layer was measured to obtain film retention (%).

3) Electrostatic Characteristics:

The sample was charged with a corona discharge to a voltage of −6 kV for 20 seconds in a dark room at 20° C. and 65% RH using a paper analyzer ("Paper Analyzer SP-428" manufactured by Kawaguchi Denki K. K.) Ten seconds after the corona discharge, the surface potential $V_{10}$ was measured. The sample was allowed to stand in the dark for an additional 180 seconds, and the potential $V_{190}$ was measured. The dark decay retention rate (DRR; %), i.e., percent retention of potential after dark decay for 180 seconds, was calculated from the following equation:

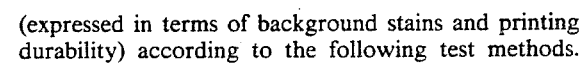

Separately, the sample was charged to −500 V with a corona discharge and then exposed to monochromatic light having a wavelength of 785 nm, and the time required for decay of the surface potential $V_{10}$ to one-tenth was measured to obtain an exposure amount $E_{1/10}$ (erg/cm²).

Further, the sample was charged to −500 V with a corona discharge in the same manner as described for the measurement of $E_{1/10}$, then exposed to monochromatic light having a wavelength of 785 nm, and the time required for decay of the surface potential $V_{10}$ to one-hundredth was measured to obtain an exposure amount $E_{1/100}$ (erg/cm$^2$).

The measurements were conducted under conditions of 20° C. and 65% RH (hereinafter referred to as Condition I) or 30° C. and 80%. RH (hereinafter referred to as Condition II).

4) Image Forming Performance:

After the samples were allowed to stand for one day under Condition I or II, each sample was charged to −5 kV and exposed to light emitted from a gallium-aluminum-arsenic semi-conductor laser (oscillation wavelength: 785 nm; output: 2.8 mW) at an exposure amount of 50 erg/cm$^2$ (on the surface of the photoconductive layer) at a pitch of 25 μm and a scanning speed of 330 m/sec. The thus formed electrostatic latent image was developed with a liquid developer ("ELP-T" produced by Fuji Photo Film Co., Ltd.), followed by fixing. The duplicated image obtained was visually evaluated for fog and image quality.

5) Contact Angle With Water:

The sample was passed once through an etching processor using an oil-desensitizing solution ("ELP-EX" produced by Fuji Photo Film Co., Ltd.) diluted to a two-fold volume with distilled water to render the surface of the photoconductive layer oil-desensitive. On the thus oil-desensitized surface was placed a drop of 2 μl of distilled water, and the contact angle formed between the surface and water was measured using a goniometer.

6) Printing Durability:

The sample was processed in the same manner as described in 4) above to form toner images, and the surface of the photoconductive layer was subjected to oil-desensitization treatment under the same conditions as in 5) above. The resulting lithographic printing plate was mounted on an offset printing machine ("Oliver Model 52", manufactured by Sakurai Seisakusho K. K.), and printing was carried out on paper. The number of prints obtained until background stains in the non-image areas appeared or the quality of the image areas was deteriorated was taken as the printing durability. The larger the number of the prints, the higher the printing durability.

TABLE 14

|  |  | Example 1 | Comparative Example A | Comparative Example B | Comparative Example C |
|---|---|---|---|---|---|
| Surface Smoothness[1] (sec/cc) | | 200 | 210 | 200 | 205 |
| Film strength[2] (%) | | 98 | 80 | 82 | 95 |
| Electrostatic[3] Characteristics: | | | | | |
| $V_{10}$ (−V): | Condition I | 650 | 435 | 490 | 505 |
| | Condition II | 640 | 380 | 445 | 460 |
| DRR (%): | Condition I | 87 | 60 | 68 | 70 |
| | Condition II | 85 | 50 | 60 | 65 |
| $E_{1/10}$ (erg/cm$^2$): | Condition I | 19 | 69 | 57 | 44 |
| | Condition II | 18 | 56 | 50 | 43 |
| $E_{1/100}$ (erg/cm$^2$): | Condition I | 33 | 115 | 93 | 80 |
| | Condition II | 38 | 120 | 90 | 82 |
| Image-Forming Performance[4]: | | | | | |
| | Condition I | Very Good | Poor (reduced Dmax, background fog) | No Good (scratches of fine lines or letters, slight background fog) | No Good (scratches of fine lines or letters) |
| | Condition II | Very Good | Very Poor (reduced Dmax, background fog) | Poor (reduced Dmax, background fog) | No Good (slight reduced Dmax, background fog) |
| Contact Angle[5] With Water (°) | | 10 or less | 10 or less | 10 or less | 10 or less |
| Printing Durability[6]: | | 10,000 or more | Background stains from the start of printing | Background stains from the start of printing | Background stains from the start of printing |

As can be seen from the results shown in Table 14, the light-sensitive material according to the present invention had good surface smoothness, film strength and electrostatic characteristics. The duplicated image obtained was clear and free from background fog in the non-image area. These results appear to be due to the sufficient adsorption of the binder resin onto the photoconductive substance and sufficient covering of the surface of the particles with the binder resin. For the same reason, when it was used as an offset master plate precursor, oil-desensitization of the offset master plate precursor with an oil-desensitizing solution was sufficient to render the non-image areas satisfactorily hydrophilic, as shown by a small contact angle of 10° C. or less with water. On practical printing using the resulting master plate, no background stains were observed in the prints.

The samples of Comparative Examples A and B exhibited poor electrostatic characteristics as compared with the light-sensitive material according to the present invention. The sample of Comparative Example C had improved film strength and almost satisfactory value on the electrostatic characteristics of $V_{10}$, DRR and $E_{1/10}$. However, with respect to $E_{1/100}$, the value obtained was more than twice of the value of the light-sensitive material according to the present invention.

The value of $E_{1/100}$ indicates an electrical potential remaining in the non-image areas after exposure at the practice of image formation. The smaller this value, the less the background fog in the non-image areas. More specifically, it is requested that the remaining potential is decreased to −10 V or less. Therefore, an amount of exposure necessary to make the remaining potential below ×10 V is an important factor. In the scanning exposure system using a semiconductor laser beam, it is quite important to make the remaining potential below −10 V by a small exposure amount in view of a design for an optical system of a duplicator (such as cost of the device, and accuracy of the optical system).

When the sample of Comparative Example A was actually imagewise exposed by a device of a small amount of exposure, satisfactory duplicated image was not obtained due to the low value of DRR. In the case of the sample of Comparative Example B, the noticeable degradation of duplicated image, that is, the decrease in image density and occurrence of scratches of fine lines or letters in the image areas and background fog in the non-image areas were observed under high temperature and high humidity conditions. In the case of the sample of Comparative Example C, the occurrence of background fog and scratches of fine lines in the image areas were observed under high temperature and high humidity conditions, while almost satisfactory images were obtained under the normal temperature and humidity condition.

Furthermore, when these samples were employed as offset master plate precursors, the samples of Comparative Examples A, B and C exhibited the background stains in the non-image area from the start of printing under the printing conditions under which the sample according to the present invention provided more than 10,000 prints of good quality. This is because the background fog of the non-image area in the samples of Comparative Examples could not be removed by the oil-desensitizing treatment.

From all these considerations, it is thus clear that an electrophotographic light-sensitive material satisfying both requirements of electrostatic characteristics and printing suitability can be obtained only using the binder resin according to the present invention.

EXAMPLES 2 TO 17

An electrophotographic light-sensitive material was prepared in the same manner as described in Example 1, except for replacing Resin (A-2) and Resin (B-1) with each of Resins (A) and (B) shown in Table 15 below, respectively.

The performance properties of the resulting light-sensitive materials were evaluated in the same manner as described in Example 1. The results obtained are shown in Table 15 below. The electrostatic characteristics in Table 15 are those determined under Condition II (30° C. and 80% RH).

TABLE 15

| Example No. | Resin (A) | Resin (B) | $V_{10}$ (−V) | DRR (%) | $E_{1/10}$ (erg/cm$^2$) | $E_{1/100}$ (erg/cm$^2$) |
|---|---|---|---|---|---|---|
| 2 | A-1 | B-16 | 450 | 73 | 33 | 60 |
| 3 | A-4 | B-21 | 545 | 78 | 27 | 50 |
| 4 | A-5 | B-19 | 550 | 80 | 21 | 42 |
| 5 | A-7 | B-17 | 530 | 75 | 26 | 48 |
| 6 | A-8 | B-24 | 625 | 84 | 18 | 35 |
| 7 | A-9 | B-27 | 550 | 82 | 20 | 38 |
| 8 | A-10 | B-30 | 545 | 81 | 23 | 41 |
| 9 | A-11 | B-32 | 630 | 85 | 17 | 33 |
| 10 | A-13 | B-34 | 570 | 84 | 19 | 34 |
| 11 | A-18 | B-35 | 610 | 85 | 18 | 32 |
| 12 | A-19 | B-36 | 630 | 83 | 20 | 35 |
| 13 | A-20 | B-37 | 635 | 85 | 17 | 30 |
| 14 | A-23 | B-39 | 570 | 78 | 30 | 48 |
| 15 | A-24 | B-51 | 610 | 82 | 25 | 39 |
| 16 | A-25 | B-54 | 605 | 82 | 27 | 40 |
| 17 | A-29 | B-9 | 610 | 80 | 28 | 44 |

Further, when these electrophotographic light-sensitive materials were employed as offset master plate precursors under the same printing condition as described in Example 1, more than 10,000 good prints were obtained respectively.

It can be seen from the results described above that each of the light-sensitive materials according to the present invention is satisfactory in all aspects of the surface smoothness and film strength of the photoconductive layer, electrostatic characteristics, and printing suitability.

Further, it can be seen that the electrostatic characteristics are further improved by the use of the resin (A').

EXAMPLES 18 TO 33

An electrophotographic light-sensitive material was prepared in the same manner as described in Example 1, except for replacing 6 g of Resin (A-2) with 7.6 g each of Resins (A) shown in Table 16 below, replacing 34 g of Resin (B-1) with 34 g each of Resins (B) shown in Table 16 below, and replacing 0.018 g of Cyanine Dye (I) with 0.019 g of Cyanine Dye (II) shown below.

TABLE 16

Cyanine Dye (II):

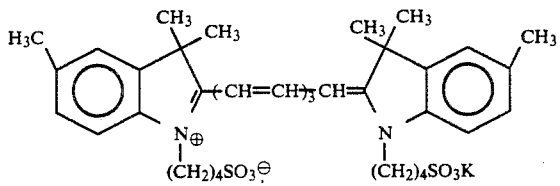

| Example No. | Resin (A) | Resin (B) |
|---|---|---|
| 18 | A-12 | B-2 |
| 19 | A-14 | B-5 |
| 20 | A-16 | B-28 |
| 21 | A-21 | B-33 |
| 22 | A-22 | B-48 |
| 23 | A-26 | B-49 |
| 24 | A-27 | B-51 |
| 25 | A-28 | B-53 |
| 26 | A-29 | B-54 |
| 27 | A-30 | B-55 |
| 28 | A-31 | B-11 |
| 29 | A-32 | B-56 |
| 30 | A-33 | B-6 |
| 31 | A-34 | B-12 |
| 32 | A-35 | B-19 |
| 33 | A-26 | B-23 |

As the results of the evaluation as described in Example 1, it can be seen that each of the light-sensitive materials according to the present invention is excellent in charging properties, dark charge retention rate, and photosensitivity, and provides a clear duplicated image free from background fog even when processed under severe conditions of high temperature and high humidity (30° C. and 80% RH). Further, when these materials were employed as offset master plate precursors, more than 10,000 prints of a clear image free from background stains were obtained respectively.

EXAMPLES 34 AND 35

A mixture of 6.5 g of Resin (A-15) (Example 34) or Resin (A-20) (Example 35), 33.5 g of Resin (B-16), 200 g of zinc oxide, 0.02 g of uranine, 0.04 g of Rose Bengale, 0.03 g of bromophenol blue, 0.20 g of phthalic anhydride, and 300 g of toluene was dispersed in a ball mill for 4 hours to prepare a coating composition for a light-sensitive layer. The coating composition was coated on paper, which had been subjected to electrically conductive treatment, by a wire bar at a dry coverage of 20 g/m², and dried for one minute at 110° C. Then, the coated material was allowed to stand in a dark place for 24 hours under the conditions of 20° C. and 65% RH to prepare each electrophotographic light-sensitive material.

COMPARATIVE EXAMPLE D

An electrophotographic light-sensitive material was prepared in the same manner as in Example 34, except for replacing 6.5 g of Resin (A-15) with 6.5 g of Resin (R-3), and replacing 33.5 g of Resin (B-16) with 33.5 g of Resin (R-4).

Each of the light-sensitive materials obtained in Examples 34 and 35 and Comparative Example D was evaluated in the same manner as in Example 1, except that the electrostatic characteristics and image forming performance were evaluated according to the following test methods.

7) Electrostatic Characteristics $E_{1/10}$ and $E_{1/100}$

The surface of the photoconductive layer was charged to $-400$ V with corona discharge, then irradiated by visible light of the illuminance of 2.0 lux, the time required for decay of the surface potential ($V_{10}$) to 1/10 or 1/100 thereof, and the exposure amount $E_{1/10}$ or $E_{1/100}$ (lux.sec) was calculated therefrom.

8) Image Forming Performance:

The electrophotographic light-sensitive material was allowed to stand for one day under the environmental conditions of 20° C. and 65% RH (Condition I) or 30° C. and 80% RH (Condition II), the light-sensitive material was subjected to plate making by a full-automatic plate making machine (ELP-404V made by Fuji Photo Film Co., Ltd.) using ELP-T as a toner. The duplicated image thus obtained was visually evaluated for fog and image quality. The original used for the duplication was composed of cuttings of other originals pasted up thereon.

The results obtained are shown in Table 17 below.

From the results shown in Table 17 above, it can be seen that each light-sensitive material exhibits almost same properties with respect to the surface smoothness and mechanical strength of the photoconductive layer. However, on the electrostatic characteristics, the sample of Comparative Example D has the particularly large value of $E_{1/100}$. On the contrary, the electrostatic characteristics of the light-sensitive material according to the present invention are good. Further, those of Example 35 using the resin (A') having the specific substituent are very good. The value of $E_{1/100}$ is particularly small.

With respect to image-forming performance, the edge mark of cuttings pasted up was observed as background fog in the non-image areas in the sample of Comparative Example D. On the contrary, the samples according to the present invention provided clear duplicated images free from background fog.

Further, each of these samples was subjected to the oil-desensitizing treatment to prepare an offset printing plate and printing was conducted. The samples according to the present invention provided 10,000 prints of clear image without background stains. However, with the sample of Comparative Example D, the above described edge mark of cuttings pasted up was not removed with the oil-desensitizing treatment and the background stains occurred from the start of printing.

As can be seen from the above results, only the light-sensitive material according to the present invention can provide the excellent performance.

EXAMPLES 36 TO 49

An electrophotographic light-sensitive material was prepared in the same manner as described in Example 34, except for replacing 6.5 g Resin (A-15) with 6.5 g of each of Resins (A) shown in Table 18 below, and replacing 33.5 g of Resin (B-16) with 33.5 g of each of Resins (B) shown in Table 18 below.

TABLE 17

| | | Example 34 | Example 35 | Comparative Example D |
|---|---|---|---|---|
| Binder Resin | | (A-15)/(B-16) | (A-20)/(B-16) | (R-3)/(R-4) |
| Surface Smoothness (sec/cc) | | 200 | 205 | 200 |
| Film Strength (%) | | 97 | 98 | 95 |
| Electrostatic[7] Characteristics: | | | | |
| $V_{10}$ ($-V$): | Condition I | 540 | 630 | 540 |
| | Condition II | 530 | 620 | 525 |
| DRR (%): | Condition I | 95 | 98 | 90 |
| | Condition II | 96 | 97 | 87 |
| $E_{1/10}$ (lux · sec): | Condition I | 10.3 | 8.9 | 16.0 |
| | Condition II | 10.9 | 9.1 | 18.5 |
| $E_{1/100}$ (lux · sec): | Condition I | 21 | 18 | 33 |
| | Condition II | 22 | 19 | 39 |
| Image-Forming Performance[8]: | | | | |
| | Condition I | Good | Very Good | Poor (edge mark of cutting) |
| | Condition II | Good | Very Good | Poor (sever edge mark of cutting) |
| Contact Angle With Water (°) | | 10 or less | 10 or less | 10 or less |
| Printing Durability: | | 10,000 | 10,000 | Background stains due to edge mark of cutting from the start of printing |

TABLE 18

| Example No. | Resin (A) | Resin (B) |
|---|---|---|
| 36 | A-2 | B-1 |
| 37 | A-4 | B-4 |
| 38 | A-7 | B-5 |
| 39 | A-8 | B-9 |
| 40 | A-11 | B-13 |
| 41 | A-13 | B-16 |
| 42 | A-16 | B-19 |
| 43 | A-24 | B-20 |

Cyanine Dye (III):

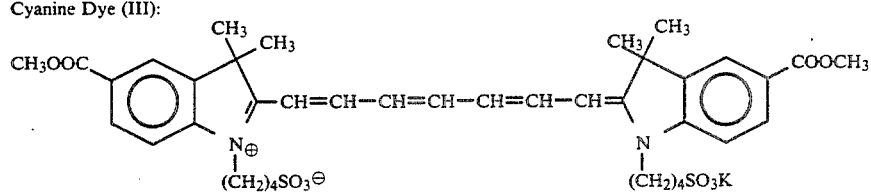

| 44 | A-25 | B-23 |
| 45 | A-26 | B-26 |
| 46 | A-29 | B-29 |
| 47 | A-31 | B-32 |
| 48 | A-20 | B-39 |
| 49 | A-22 | B-55 |

As the results of the evaluation as described in Example 24, it can be seen that each of the light-sensitive materials according to the present invention is excellent in charging properties, dark charge retention rate, and photosensitivity, and provides a clear duplicated image free from background fog and scratches of fine lines even when processed under severe conditions of high temperature and high humidity (30° and 80% RH). Further, when these materials were employed as offset master plate precursors, 10,000 prints of a clear image free from background stains were obtained respectively.

EXAMPLES 50 AND 51

A mixture of 6.5 g of Resin (A-14) (Example 50) or Resin (A-15) (Example 51), 33.5 g of Resin (B-2), 200 g of zinc oxide, 0.02 g of uranine, 0.04 g of Rose Bengal, 0.03 g of bromophenol blue, 0.20 g of phthalic anhydride and 300 g of toluene was dispersed in a ball mill for 3 hours. Then, to the dispersion was added 0.6 g of glutaric acid (Example 50) or 0.5 g of 1,6-hexanediol (Example 51), and the mixture was dispersed in a ball mill for 10 minutes.

The dispersion was coated on paper, which had been subjected to an electroconductive treatment, by a wire bar in a dry coverage of 20 g/m², dried for one minute at 110° C., and then heated for 1.5 hours at 120° C. Then, the coated material was allowed to stand in a dark place for 24 hours under the conditions of 20° C. and 65% RH to prepare an electrophotographic light-sensitive material.

The resulting light-sensitive materials were evaluated for the electrostatic characteristics and image forming performance in the same manner as in Example 34 and found to have satisfactory performance.

Also, when each of the light-sensitive materials was used as an offset master plate, more than 10,000 good prints could be obtained.

EXAMPLE 52

A mixture of 6 g of Resin (A-2), 34 g of Resin (BX-3), 200 g of zinc oxide, 0.018 g of Cyanine Dye (III) shown below, and 300 g of toluene was dispersed in a ball mill for 4 hours to prepare a coating composition for a light-sensitive layer. The coating composition was coated on paper, which had been subjected to electrically conductive treatment, by a wire bar at a dry coverage of 25 gm/2, followed by drying at 110° C. for 30 seconds. The coated material was then allowed to stand in a dark place at 20° C. and 65% RH (relative humidity) for 24 hours to prepare an electrophotographic light-sensitive material.

COMPARATIVE EXAMPLE E

An electrophotographic light-sensitive material was prepared in the same manner as in Example 52, except for using 6 g of Resin (R-1) and 34 g of Resin (R-2) in place of the resins used in Example 52.

COMPARATIVE EXAMPLE F

An electrophotographic light-sensitive material was prepared in the same manner as in Example 52, except for using 6 g of Resin (R-3) and 34 g of Resin (R-2) in place of the resins used in Example 52.

COMPARATIVE EXAMPLE G

An electrophotographic light-sensitive material was prepared in the same manner as in Example 52, except for using 6 g of Resin (R-3) and 34 g of Resin (R-4) in place of the resins used in Example 52.

Each of the light-sensitive materials obtained in Example 52 and Comparative Examples E, F and G was evaluated for film properties in terms of surface smoothness and mechanical strength; electrostatic characteristics; image forming performance; oil-desensitivity when used as an offset master plate precursor (expressed in terms of contact angle of the layer with water after oil-desensitization treatment); and printing suitability (expressed in terms of background stains and printing durability) according to the following test methods. The results obtained are shown in Table 19 below.

1) Smoothness of Photoconductive Layer:

The smoothness (sec/cc) was measured using a Beck's smoothness tester (manufactured by Kumagaya Riko K. K.) under an air volume condition of 1 cc.

2) Mechanical Strength of Photoconductive Layer:

The surface of the light-sensitive material was repeatedly (500 times) rubbed with emery paper (#1000) under a load of 70 g/cm² using a Heidon 14 Model surface testing machine (manufactured by Shinto Kagaku K. K.). After dusting, the abrasion loss of the photoconductive layer was measured to obtain film retention (%).

3) Electrostatic Characteristics:

The sample was charged with a corona discharge to a voltage of −6 kV for 20 seconds in a dark room at 20° C. and 65% RH using a paper analyzer ("Paper Analyzer SP-428" manufactured by Kawaguchi Denki K. K.) Ten seconds after the corona discharge, the surface potential $V_{10}$ was measured. The sample was allowed to stand in the dark for an additional 120 seconds, and the potential $V_{130}$ was measured. The dark decay retention rate (DRR; %), i.e., percent retention of potential after dark decay for 120 seconds, was calculated from the following equation:

$$DRR (\%) = (V_{130}/V_{10}) \times 100$$

Separately, the sample was charged to $-500$ V with a corona discharge and then exposed to monochromatic light having a wavelength of 785 nm, and the time required for decay of the surface potential $V_{10}$ to one-tenth was measured to obtain an exposure amount $E_{1/10}$ (erg/cm$^2$).

Further, the sample was charged to $-500$ V with a corona discharge in the same manner as described for the measurement of $E_{1/10}$, then exposed to monochromatic light having a wavelength of 785 nm, and the time required for decay of the surface potential $V_{10}$ to one-hundredth was L measured to obtain an exposure amount $E_{1/100}$ (erg/cm$^2$).

The measurements were conducted under conditions of 20° C. and 65% RH (hereinafter referred to as Condition I) or 30° C. and 80% RH (hereinafter referred to as Condition II).

4) Image Forming Performance:

After the samples were allowed to stand for one day under Condition I or II, each sample was charged to $-5$ kV and exposed to light emitted from a gallium-aluminum-arsenic semi-conductor laser (oscillation wavelength: 785 nm; output: 2.8 mW) at an exposure amount of 50 erg/cm$^2$ (on the surface of the photoconductive layer) at a pitch of 25 μm and a scanning speed of 300 m/sec. The thus formed electrostatic latent image was developed with a liquid developer ("ELP-T" produced by Fuji Photo Film Co., Ltd.), followed by fixing. The duplicated image obtained was visually evaluated for fog and image quality.

5) Contact Angle With Water:

The sample was passed once through an etching processor using an oil-desensitizing solution ("ELP-EX" produced by Fuji Photo Film Co., Ltd.) diluted to a two-fold volume with distilled water to render the surface of the photoconductive layer oil-desensitive. On the thus oil-desensitized surface was placed a drop of 2 μl of distilled water, and the contact angle formed between the surface and water was measured using a goniometer.

6) Printing Durability:

The sample was processed in the same manner as described in 4) above to form toner images, and the surface of the photoconductive layer was subjected to oil-desensitization treatment under the same conditions as in 5) above. The resulting lithographic printing plate was mounted on an offset printing machine ("Oliver Model 52", manufactured by Sakurai Seisakusho K. K.), and printing was carried out on paper. The number of prints obtained until background stains in the non-image areas appeared or the quality of the image areas was deteriorated was taken as the printing durability. The larger the number of the prints, the higher the printing durability.

TABLE 19

| | | Example 52 | Comparative Example E | Comparative Example F | Comparative Example G |
|---|---|---|---|---|---|
| Surface Smoothness[1] (sec/cc) | | 430 | 410 | 430 | 420 |
| Film strength[2] (%) | | 97 | 75 | 82 | 86 |
| Electrostatic[3] Characteristics: | | | | | |
| $V_{10}$ ($-$V): | Condition I | 680 | 405 | 470 | 515 |
| | Condition II | 665 | 360 | 445 | 490 |
| DRR (%): | Condition I | 89 | 58 | 65 | 73 |
| | Condition II | 86 | 45 | 58 | 60 |
| $E_{1/10}$ (erg/cm$^2$): | Condition I | 17 | 70 | 60 | 58 |
| | Condition II | 19 | 48 | 54 | 50 |
| $E_{1/100}$ (erg/cm$^2$): | Condition I | 28 | 120 | 98 | 88 |
| | Condition II | 33 | 130 | 100 | 95 |
| Image-Forming Performance[4]: | | | | | |
| | Condition I | Very Good | Poor (reduced Dmax, background fog) | No Good (scratches of fine lines or letters, slight background fog) | No Good (scratches of fine lines or letters) |
| | Condition II | Very Good | Very Poor (reduced Dmax, background fog) | Poor (reduced Dmax, background fog) | No Good (slight reduced Dmax, background fog) |
| Contact Angle[5] With Water (°) | | 10 or less | 10 or less | 10 or less | 10 or less |
| Printing Durability[6]: | | 10,000 or more | Background stains from the start of printing | Background stains from the start of printing | Background stains from the start of printing |

As can be seen from the results shown in Table 19, the light-sensitive material according to the present invention had good surface smoothness, film strength and electrostatic characteristics. The duplicated image obtained was clear and free from background fog in the non-image area. These results appear to be due to the sufficient adsorption of the binder resin onto the photoconductive substance and sufficient covering of the surface of the particles with the binder resin. For the same reason, when it was used as an offset master plate precursor, oil-desensitization of the offset master plate precursor with an oil-desensitizing solution was sufficient to render the non-image areas satisfactorily hydrophilic, as shown by a small contact angle of 10° C. or less with water. On practical printing using the resulting master plate, no background stains were observed in the prints.

The samples of Comparative Examples E and F exhibited poor electrostatic characteristics as compared with the light-sensitive material according to the present invention. The sample of Comparative Example G had improved film strength and almost satisfactory value on the electrostatic characteristics of $V_{10}$, DRR and $E_{1/10}$. However, with respect to $E_{1/100}$, the value obtained was more than twice of the value of the light-sensitive material according to the present invention.

The value of $E_{1/100}$ indicates an electrical potential remaining in the non-image areas after exposure at the practice of image formation. The smaller this value, the less the background fog in the non-image areas. More specifically, it is requested that the remaining potential is decreased to $-10$ V or less. Therefore, an amount of exposure necessary to make the remaining potential below $-10$ V is an important factor. In the scanning exposure system using a semiconductor laser beam, it is quite important to make the remaining potential below $-10$ V by a small exposure amount in view of a design for an optical system of a duplicator (such as cost of the device, and accuracy of the optical system).

When the sample of Comparative Example E was actually imagewise exposed by a device of a small amount of exposure, satisfactory duplicated image was not obtained due to the low value of DRR. In the case of the sample of Comparative Example F, the noticeable degradation of duplicated image, that is, the decrease in image density and occurrence of scratches of fine lines or letters in the image areas and background fog in the non-image areas were observed under high temperature and high humidity conditions. In the case of the sample of Comparative Example G, the occurrence of background fog and scratches of fine lines in the image areas were observed under high temperature and high humidity conditions, while almost satisfactory images were obtained under the normal temperature and humidity condition.

Furthermore, when these samples were employed as offset master plate precursors, the samples of Comparative Examples E, F and G exhibited the background stains in the non-image area from the start of printing under the printing conditions under which the sample according to the present invention provided more than 10,000 prints of good quality. This is because the background fog of the non image area in the samples of Comparative Examples could not be removed by the oil-desensitizing treatment.

From all these considerations, it is thus clear that an electrophotographic light-sensitive material satisfying both requirements of electrostatic characteristics and printing suitability can be obtained only using the binder resin according to the present invention.

EXAMPLES 53 TO 68

An electrophotographic light-sensitive material was prepared in the same manner as described in Example 52, except for replacing Resin (A-2) and Resin (BX-3) with each of Resins (A) and (BX) shown in Table 20 below, respectively.

The performance properties of the resulting light-sensitive materials were evaluated in the same manner as described in Example 52. The results obtained are shown in Table 20 below. The electrostatic characteristics in Table 20 are those determined under Condition II (30° C. and 80% RH).

TABLE 20

| Example No. | Resin (A) | Resin (BX) | $V_{10}$ (−V) | DRR (%) | $E_{1/10}$ (erg/cm$^2$) | $E_{1/100}$ (erg/cm$^2$) |
|---|---|---|---|---|---|---|
| 53 | A-1 | B-2 | 520 | 78 | 45 | 65 |
| 54 | A-4 | B-3 | 550 | 78 | 40 | 60 |
| 55 | A-5 | B-5 | 550 | 79 | 38 | 58 |
| 56 | A-7 | B-6 | 540 | 75 | 45 | 62 |
| 57 | A-8 | B-9 | 630 | 85 | 25 | 40 |
| 58 | A-9 | B-10 | 580 | 82 | 28 | 43 |
| 59 | A-10 | B-11 | 550 | 80 | 30 | 45 |
| 60 | A-11 | B-13 | 650 | 86 | 25 | 38 |
| 61 | A-13 | B-14 | 580 | 82 | 28 | 40 |
| 62 | A-18 | B-15 | 660 | 85 | 23 | 38 |
| 63 | A-19 | B-20 | 630 | 81 | 29 | 42 |
| 64 | A-21 | B-21 | 640 | 83 | 26 | 43 |
| 65 | A-23 | B-23 | 595 | 82 | 30 | 46 |
| 66 | A-24 | B-25 | 610 | 83 | 29 | 40 |
| 67 | A-25 | B-27 | 580 | 80 | 31 | 48 |
| 68 | A-31 | B-24 | 615 | 82 | 30 | 46 |

Further, when these electrophotographic light-sensitive materials were employed as offset master plate precursors under the same printing condition as described in Example 52, more than 10,000 good prints were obtained respectively.

It can be seen from the results described above that each of the light-sensitive materials according to the present invention is satisfactory in all aspects of the surface smoothness and film strength of the photoconductive layer, electrostatic characteristics, and printing suitability.

Further, it can be seen that the electrostatic characteristics are further improved by the use of the resin (A').

EXAMPLES 69 TO 84

An electrophotographic light-sensitive material was prepared in the same manner as described in Example 52, except for replacing Resin (A-2) with 6 g each of Resins (A) shown in Table 21 below, replacing Resin (BX-3) with 34 g each of Resins (BX) shown in Table 21 below, and replacing 0.018 g of Cyanine Dye (III) with 0.019 g of Cyanine Dye (IV) shown below.

TABLE 21

Cyanine Dye (IV):

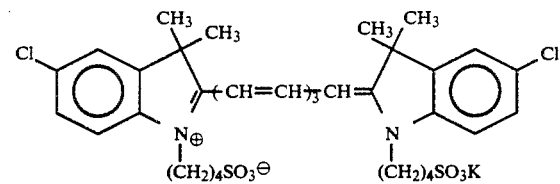

| Example No. | Resin (A) | Resin (BX) |
|---|---|---|
| 69 | A-6 | BX-3 |
| 70 | A-7 | BX-4 |
| 71 | A-8 | BX-5 |
| 72 | A-9 | BX-6 |
| 73 | A-10 | BX-9 |
| 74 | A-11 | BX-10 |
| 75 | A-12 | BX-11 |
| 76 | A-18 | BX-12 |
| 77 | A-21 | BX-15 |
| 78 | A-22 | BX-16 |
| 79 | A-23 | BX-19 |
| 80 | A-25 | BX-20 |
| 81 | A-26 | BX-21 |
| 82 | A-30 | BX-23 |
| 83 | A-31 | BX-25 |
| 84 | A-35 | BX-27 |

As the results of the evaluation as described in Example 52, it can be seen that each of the light-sensitive materials according to the present invention is excellent in charging properties, dark charge retention rate, and photosensitivity, and provides a clear duplicated image free from background fog even when processed under severe conditions of high temperature and high humidity (30° C. and 80% RH). Further, when these materials were employed as offset master plate precursors, more than 10,000 prints of a clear image free from background stains were obtained respectively.

EXAMPLES 85 AND 86

A mixture of 6.5 g of Resin (A-15) (Example 85) or Resin (A-26) (Example 86), 33.5 g of Resin (BX-21), 200 g of zinc oxide, 0.02 g of uranine, 0.035 g of Methine Dye (V) shown below, 0.02 g of Methine Dye (VI) shown below, 0.20 g of phthalic anhydride, and 300 g of toluene was dispersed by a homogenizer (manufactured by Nippon Seiki K. K.) at $1 \times 10^4$ r.p.m. for 15 minutes to prepare a coating composition for a light-sensitive layer. The coating composition was coated on paper, which had been subjected to electrically conductive treatment, by a wire bar at a dry coverage of 25 g/m$^2$, and dried for one minute at 110° C. Then, the coated material was allowed to stand in a dark place for 24 hours under the conditions of 20° C. and 65% RH to prepare each electrophotographic light-sensitive material.

Methine Dye (V):

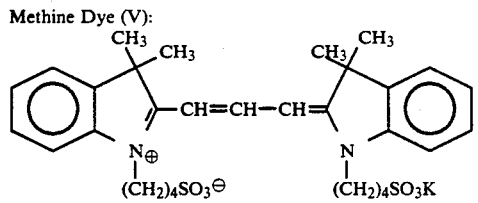

Methine Dye (VI):

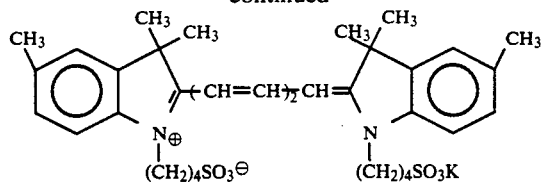

COMPARATIVE EXAMPLE H

An electrophotographic light-sensitive material was prepared in the same manner as in Example 85, except for replacing 6.5 g of Resin (A-15) with 6.5 g of Resin (R-3), and replacing 33.5 g of Resin (BX-21) with 33.5 g of Resin (R-4).

Each of the light-sensitive materials obtained in Examples 85 and 86 and Comparative Example H was evaluated in the same manner as in Example 52, except that the electrostatic characteristics and image forming performance were evaluated according to the following test methods.

7) Electrostatic Characteristics $E_{1/10}$ and $E_{1/100}$

The Surface of the photoconductive layer was charged to $-400$ V with corona discharge, then irradiated by visible light of the illuminance of 2.0 lux, the time required for decay of the surface potential ($V_{10}$) to 1/10 or 1/100 thereof, and the exposure amount $E_{1/10}$ or $E_{1/100}$ (lux.sec) was calculated therefrom.

8) Image Forming Performance:

The electrophotographic light-sensitive material was allowed to stand for one day under the environmental conditions of 20° C. and 65% RH (Condition I) or 30° C. and 80% RH (Condition II), the light-sensitive material was subjected to plate making by a full-automatic plate making machine (ELP-404 V made by Fuji Photo Film Co., Ltd.) using ELP-T as a toner. The duplicated image thus obtained was visually evaluated for fog and image quality. The original used for the duplication was composed of cuttings of other originals pasted up thereon.

The results obtained are shown in Table 22 below.

TABLE 22

| | | Example 85 | Example 86 | Comparative Example H |
|---|---|---|---|---|
| Binder Resin | | (A-15)/(BX-21) | (A-26)/(BX-21) | (R-3)/(R-4) |
| Surface Smoothness (sec/cc) | | 700 | 750 | 735 |
| Film Strength (%) | | 96 | 95 | 83 |
| Electrostatic[7] Characteristics: | | | | |
| $V_{10}$ (−V): | Condition I | 580 | 670 | 560 |
| | Condition II | 565 | 655 | 540 |
| DRR (%): | Condition I | 90 | 96 | 85 |
| | Condition II | 86 | 93 | 80 |
| $E_{1/10}$ (lux · sec): | Condition I | 9.8 | 7.5 | 13.2 |
| | Condition II | 10.3 | 8.3 | 14.6 |
| $E_{1/100}$ (lux · sec): | Condition I | 15.7 | 11.5 | 25 |
| | Condition II | 16.5 | 13 | 27 |
| Image-Forming Performance[8]: | | | | |
| | Condition I | Good | Very Good | Poor (edge mark of cutting) |
| | Condition II | Good | Very Good | Poor (sever edge mark of cutting) |
| Contact Angle With Water (°) | | 10 or less | 10 or less | 10 or less |
| Printing Durability: | | 10,000 | 10,000 | Background stains due to edge mark of cutting from the |

TABLE 22-continued

|  | Example 85 | Example 86 | Comparative Example H |
|---|---|---|---|
|  |  |  | start of printing |

From the results shown in Table 22 above, it can be seen that each light-sensitive material exhibits almost same properties with respect to the surface smoothness and mechanical strength of the photoconductive layer. However, on the electrostatic characteristics, the sample of Comparative Example H has the particularly large value of $E_{1/100}$. On the contrary, the electrostatic characteristics of the light-sensitive material according to the present invention are good. Further, those of Example 86 using the resin (A') having the specific substituent are very good. The value of $E_{1/100}$ is particularly small.

With respect to image-forming performance, the edge mark of cuttings pasted up was observed as background fog in the non-image areas in the sample of Comparative Example H. On the contrary, the samples according to the present invention provided clear duplicated images free from background fog.

Further, each of these samples was subjected to the oil-desensitizing treatment to prepare an offset printing plate and printing was conducted. The samples according to the present invention provided 10,000 prints of clear image without background stains. However, with the sample of Comparative Example H, the above described edge mark of cuttings pasted up was not removed with the oil-desensitizing treatment and the background stains occurred from the start of printing.

As can be seen from the above results, only the light-sensitive material according to the present invention can provide the excellent performance.

EXAMPLES 87 TO 100

An electrophotographic light-sensitive material was prepared in the same manner as described in Example 85, except for replacing 6.5 g Resin (A-15) with 6.5 g of each of Resins (A) shown in Table 23 below, and replacing 33.5 g of Resin (BX-21) with 33.5 g of each of Resins (BX) shown in Table 23 below.

TABLE 23

| Example No. | Resin (A) | Resin (BX) |
|---|---|---|
| 87 | A-1 | BX-27 |
| 88 | A-2 | BX-6 |
| 89 | A-3 | BX-9 |
| 90 | A-4 | BX-11 |
| 91 | A-5 | BX-12 |
| 92 | A-6 | BX-13 |
| 93 | A-7 | BX-14 |
| 94 | A-14 | BX-15 |
| 95 | A-15 | BX-16 |
| 96 | A-16 | BX-19 |
| 97 | A-17 | BX-21 |
| 98 | A-19 | BX-23 |
| 99 | A-31 | BX-25 |
| 100 | A-35 | BX-27 |

As the results of the evaluation as described in Example 85, it can be seen that each of the light-sensitive materials according to the present invention is excellent in charging properties, dark charge retention rate, and photosensitive, and provides a clear duplicated image free from background fog and scratches of fine lines even when processed under severe conditions of high temperature and high humidity (30° C. and 80% RH). Further, when these materials were employed as offset master plate precursors, 10,000 prints of a clear image free from background stains were obtained respectively.

EXAMPLE 101

A mixture of 6 g of Resin (A-36) shown below and 30 g of Resin (BX-26), 200 g of zinc oxide, 0.02 g of uranine, 0.04 g of Rose Bengal, 0.03 g of bromophenol blue, 0.20 g of phthalic anhydride and 300 g of toluene was dispersed in a ball mill for 3 hours. Then, to the dispersion was added 3.0 g of 1,6-hexenediisocyanate, and the mixture was dispersed in a ball mill for 10 minutes.

The dispersion was coated on paper, which had been subjected to an electroconductive treatment, by a wire bar in a dry coverage of 20 g/m², dried for one minute at 110° C., and then heated for 1.5 hours at 120° C. Then, the coated material was allowed to stand for 24 hours under the condition of 20° C. and 65% RH to prepare an electrophotographic light-sensitive material.

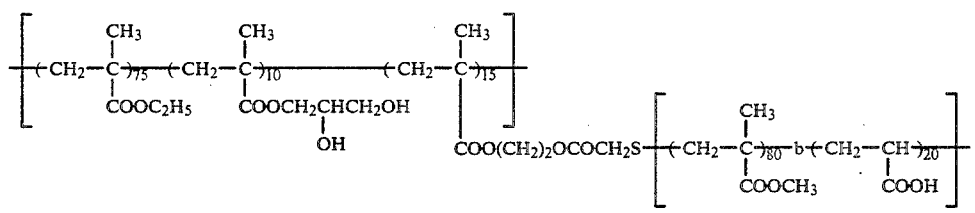

(A-36)

Mw: 1.5 × 10⁴

As the results of the evaluation as described in Example 85, it can be seen that the light-sensitive material according to the present invention is excellent in the electrostatic characteristics and image forming performance. Further, when the material was employed as an offset master plate precursor, more than 10,000 good prints could be obtained.

While the invention has been described in detail and with reference to specific embodiments thereof, it will be apparent to one skilled in the art that various changes and modifications can be made therein without departing from the spirit and scope thereof.

What is claimed is:

1. An electrophotographic light-sensitive material comprising a support having provided thereon a photoconductive layer containing an inorganic photographic substance and a binder resin, said binder resin containing (i) a low molecular weight graft type copolymer resin (A) and (ii) a high molecular weight copolymer resin (B), said resin (A) having a weight average molecular weight of from $1 \times 10^3$ to $2 \times 10^4$, said resin (A) formed from, as a copolymerizable component, at least one monofunctional macromonomer (MA) comprising an AB copolymer containing an A block and a B block, said A block comprising at least one polymer component containing at least one acidic group selected from $-PO_3H_2$, $-COOH$, $-SO_3H$, a phenolic hydroxyl group,

(wherein R represents a hydrocarbon group or $-OR'$ (wherein R' represents a hydrocarbon group)) and a cyclic acid anhydride-containing group, and said B block containing at least one polymer component represented by the general formula (I) described below and having a polymerizable double bond group bonded to one terminal of the main chain of the B block and having the other terminal of the B block connected to the A block;

(I)

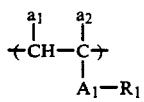

wherein $a_1$ and $a_2$ each represents a hydrogen atom, a halogen atom, a cyano group, a hydrocarbon group, $-COOZ_1$ or $-COOZ_1$ bonded via a hydrocarbon group (wherein $Z_1$ represents a hydrocarbon group); $A_1$ represents $-COO-$, $-OCO-$, $-CH_2)_{l_1}OCO-$, $-CH_2)_{l_2}COO-$ (wherein $l_1$ and $l_2$ each represents an integer of from 1 to 3), $-O-$, $-SO_2-$, $-CO-$,

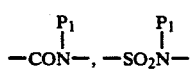

(wherein $P_1$ represents a hydrogen atom or a hydrocarbon group), $-CONHCOO-$, $-CONHCONH-$, or

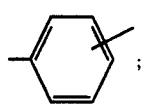

and $R_1$ represents a hydrocarbon group, provided that when $A_1$ represents

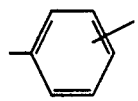

$R_1$ represents a hydrogen atom or a hydrocarbon group; and said copolymer resin (B) having a weight average molecular weight of not less than $3 \times 10^4$, said copolymer resin (B) formed from (i) at least a monofunctional macromonomer (MB) having a weight average molecular weight of not more than $2 \times 10^4$ and (ii) a monomer represented by the general formula (V) described below, said macromonomer (MB) comprising at least a polymer component corresponding to a repeating unit represented by the general formula (IVa) or (IVb) described below, and said macromonomer (MB) having a polymerizable double bond group represented by the general formula (III) described below bonded to only one terminal of the main chain thereof:

(III)

wherein $X_0$ represents $-COO-$, $-OCO-$, $-CH_2OCO-$, $-CH_2COO-$, $-O-$, $-SO_2-$, $-CO-$, $-CONHCOO-$, $-CONHCONH-$, $-CONHSO_2$,

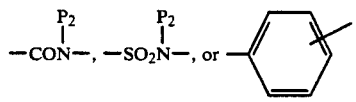

(wherein $P_2$ represents a hydrogen atom or a hydrocarbon group), and $c_1$ and $c_2$, which may be the same or different, each represents a hydrogen atom, a halogen atom, a cyano group, a hydrocarbon group, $-COO-Z_3$ or $-COO-Z_3$ bonded via a hydrocarbon group (wherein $Z_3$ represents a hydrocarbon group which may be substituted):

(IVa)

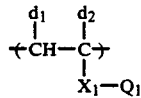

(IVb)

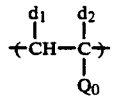

wherein $X_1$ has the same meaning as $X_0$ in the general formula (III); $Q_1$ represents an aliphatic group having from 1 to 18 carbon atoms or an aromatic group having from 6 to 12 carbon atoms; $d_1$ and $d_2$, which may be the same or different, each has the same meaning as $c_1$ or $c_2$ in the general formula (III); and $Q_0$ represents —CN, —CONH$_2$, or

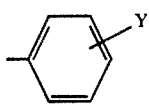

(wherein Y represents a hydrogen atom, a halogen atom, a hydrocarbon group, an alkoxy group or —COOZ$_4$ (wherein Z$_4$ represents an alkyl group, an aralkyl group, or an aryl group)):

(V)

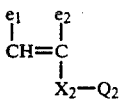

wherein $X_2$ has the same meaning as $X_1$ in the general formula (IVa); $Q_2$ has the same meaning as $Q_1$ in the general formula (IVa); and $e_1$ and $e_2$, which may be the same or different, each has the same meaning as $c_1$ or $c_2$ in the general formula (III).

2. An electrophotographic light-sensitive material as claimed in claim 1, wherein the graft type copolymer (Resin (A)) contains, as a component copolymerizable with the macromonomer (MA), at least one monomer represented by the following general formula (II):

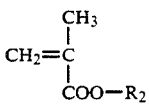

wherein R$_2$ represents a hydrocarbon group.

3. An electrophotographic light-sensitive material as claimed in claim 2, wherein the graft type copolymer (Resin (A)) contains, as a component copolymerizable with the macromonomer (MA), at least one monomer represented by the following general formula (IIa) or (IIb):

(IIa)

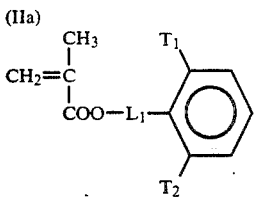

(IIb)

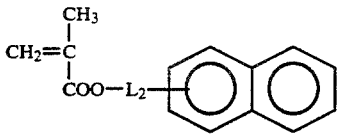

wherein T$_1$ and T$_2$ each, independently, represents a hydrogen atom, a hydrocarbon group having from 1 to 10 carbon atoms, a chlorine atom, a bromine atom, —COZ$_5$ or —COOZ$_5$ (wherein Z$_5$ represents a hydrocarbon group having from 1 to 10 carbon atoms); and L$_1$ and L$_2$ each represents a single bond or a linkage group having from to 4 linking atoms, each connecting —COO— and the benzene ring.

4. An electrophotographic light-sensitive material as claimed in claim 1, wherein the weight ratio of A block/B block in the macromonomer (MA) is 1 to 70/90 to 30.

5. An electrophotographic light-sensitive material as claimed in claim 1, wherein the content of the macromonomer (MA) in the resin (A) is from 1 to 60% by weight of the resin (A).

6. An electrophotographic light-sensitive material as claimed in claim 1, wherein the resin (B) is further formed from a polymerizable component containing at least one acidic group selected from —COOH, —PO$_3$H$_2$, —SO$_3$H, —COOH, —OH,

(wherein R$_0$ represents a hydrocarbon group or —OR$_0'$, wherein R$_0'$ represents a hydrocarbon group), —CHO and a cyclic acid anhydride containing group, as a component constituting the macromonomer (MB).

7. An electrophotographic light-sensitive material as claimed in claim 6, wherein the content of the polymer component containing the acidic group in the macromonomer (MB) is from 0.5 to 50 parts by weight per 100 parts by weight of the total copolymer components.

8. An electrophotographic light-sensitive material as claimed in claim 1, wherein the ratio of copolymerizable component composed of the macromonomer (MB) as a recurring unit to the copolymerizable component composed of the monomer represented by the general formula (V) as a recurring unit is from 1 to 80 to from 99 to 20 by weight.

9. An electrophotographic light-sensitive material as claimed in claim 8, wherein the resin (B) has at least one acidic group selected from —PO$_3$H$_2$, —SO$_3$H, —COOH, —OH, —SH, and

(wherein R$_a$ represents a hydrocarbon group or —OR$_a'$ (wherein R$_a'$ represents a hydrocarbon group) bonded to only one terminal of the main chain of the polymer.

10. An electrophotographic light-sensitive material as claimed in claim 1, wherein the resin (B) has at least one acidic group selected from —PO$_3$H$_2$, —SO$_3$H, —COOH, —OH, —SH, and

(wherein R$_a$ represents a hydrocarbon group or —OR$_a'$ (wherein R$_a'$ represents a hydrocarbon group) bonded to only one terminal of the main chain of the polymer.

11. An electrophotographic light-sensitive material as claimed in claim 1, wherein the weight ratio of the resin (A)/the resin (B) is 5 to 80/95 to 20.

* * * * *